(12) United States Patent
Ryoo et al.

(10) Patent No.: US 10,542,490 B2
(45) Date of Patent: Jan. 21, 2020

(54) METHOD AND APPARATUS FOR CONTROLLING COMMUNICATION OF A PORTABLE TERMINAL IN A WIRELESS COMMUNICATION SYSTEM

(71) Applicant: Samsung Electronics Co., Ltd., Suwon-si, Gyeonggi-do (KR)

(72) Inventors: Sunheui Ryoo, Yongin-si (KR); Jungsoo Jung, Seongnam-si (KR); Jung-Min Moon, Suwon-si (KR); Seung-Hoon Park, Seoul (KR); Byounghoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 15/142,647

(22) Filed: Apr. 29, 2016

(65) Prior Publication Data

US 2016/0323823 A1 Nov. 3, 2016

(30) Foreign Application Priority Data

Apr. 29, 2015 (KR) .......................... 10-2015-0060647
Jun. 29, 2015 (KR) .......................... 10-2015-0092378

(51) Int. Cl.
*H04W 52/02* (2009.01)
*H04W 16/14* (2009.01)
(Continued)

(52) U.S. Cl.
CPC ......... *H04W 52/0216* (2013.01); *H04W 4/08* (2013.01); *H04W 16/14* (2013.01);
(Continued)

(58) Field of Classification Search
None
See application file for complete search history.

(56) References Cited

U.S. PATENT DOCUMENTS 7,155,518 B2   12/2006   Forslöw
7,327,734 B2    2/2008   Yi et al.
(Continued)

FOREIGN PATENT DOCUMENTS

JP    2005-184824 A    7/2005
JP    2010-87876 A     4/2010
(Continued)

OTHER PUBLICATIONS

U.S. Appl. No. 61/992,240 dated May 13, 2014, "PDCP Reordering at Split Bearer Reconfiguration", p. 1-33.*
(Continued)

*Primary Examiner* — Gregory B Sefcheck
(74) *Attorney, Agent, or Firm* — Jefferson IP Law, LLP

(57) ABSTRACT

The present disclosure relates to a $5^{th}$ Generation (5G) or pre-5G communication system supporting a higher data transfer rate after a $4^{th}$ Generation (4G) communication system such as Long Term Evolution (LTE). In particular, a method and an apparatus for controlling communication of a terminal in a wireless communication system are provided. The method includes receiving information regarding an operation of a second system by using a first communication module configured to support a first system and controlling an activation state of a second communication module configured to support the second system, based on the information regarding the operation of the second system.

20 Claims, 50 Drawing Sheets

(51) Int. Cl.
*H04W 4/08* (2009.01)
*H04W 28/02* (2009.01)
*H04W 48/16* (2009.01)
*H04W 48/12* (2009.01)
*H04W 88/06* (2009.01)

(52) U.S. Cl.
CPC ....... *H04W 28/0221* (2013.01); *H04W 48/12* (2013.01); *H04W 52/0212* (2013.01); *H04W 52/0219* (2013.01); *H04W 52/0229* (2013.01); *H04W 52/0235* (2013.01); *H04W 48/16* (2013.01); *H04W 88/06* (2013.01); *Y02D 70/00* (2018.01); *Y02D 70/1262* (2018.01); *Y02D 70/142* (2018.01); *Y02D 70/144* (2018.01); *Y02D 70/166* (2018.01); *Y02D 70/21* (2018.01); *Y02D 70/24* (2018.01)

(56) References Cited

U.S. PATENT DOCUMENTS

| | | | |
|---|---|---|---|
| 7,756,135 B2 | 7/2010 | Yi et al. | |
| 8,228,861 B1 | 7/2012 | Nix | |
| 8,254,981 B2* | 8/2012 | Dwyer | H04W 48/16 455/424 |
| 8,594,671 B2* | 11/2013 | Wu | H04W 24/10 370/331 |
| 8,599,786 B2 | 12/2013 | Backland et al. | |
| 8,693,304 B2* | 4/2014 | Li | H04L 5/0007 370/203 |
| 8,724,550 B2* | 5/2014 | Kone | H04L 5/001 370/328 |
| 8,743,787 B2* | 6/2014 | Bostrom | H04L 5/0051 370/241 |
| 8,774,108 B2* | 7/2014 | Yi | H04W 76/32 370/329 |
| 8,917,605 B2* | 12/2014 | Pelletier | H04W 52/365 370/236 |
| 8,995,352 B2* | 3/2015 | Bostrom | H04L 5/0051 370/241 |
| 9,036,473 B2 | 5/2015 | Himayat et al. | |
| 9,049,698 B2* | 6/2015 | Johansson | H04W 76/027 |
| 9,113,450 B2* | 8/2015 | Pelletier | H04W 74/04 |
| 9,131,363 B2* | 9/2015 | Vujcic | H04B 7/15507 |
| 9,155,006 B2* | 10/2015 | Lee | H04W 36/0005 |
| 9,161,281 B2* | 10/2015 | Vrzic | H04W 36/30 |
| 9,184,886 B2* | 11/2015 | Bontu | H04L 5/001 |
| 9,198,184 B2 | 11/2015 | Yeh et al. | |
| 9,203,566 B2* | 12/2015 | Terry | H04L 5/001 |
| 9,271,281 B2* | 2/2016 | Kuo | H04L 5/001 |
| 9,288,803 B2* | 3/2016 | Jang | H04W 24/02 |
| 9,294,952 B2* | 3/2016 | Siomina | G01S 5/0205 |
| 9,307,528 B2* | 4/2016 | Jang | H04W 24/02 |
| 9,356,744 B2* | 5/2016 | Yu | H04L 5/001 |
| 9,392,515 B2* | 7/2016 | Wang | H04W 28/08 |
| 9,392,600 B2* | 7/2016 | Bostrom | H04L 5/0051 |
| 9,414,384 B2* | 8/2016 | Yu | H04W 72/0453 |
| 9,432,156 B2* | 8/2016 | Kim | H04L 5/003 |
| 9,462,519 B2* | 10/2016 | Kilgour | H04W 36/0083 |
| 9,462,546 B2* | 10/2016 | Ohta | H04W 52/0229 |
| 9,485,060 B2* | 11/2016 | Nayeb Nazar | H04L 1/007 |
| 9,491,793 B2* | 11/2016 | Pelletier | H04W 52/365 |
| 9,497,685 B2* | 11/2016 | Lee | H04W 24/10 |
| 9,526,057 B2* | 12/2016 | Yi | H04W 36/24 |
| 9,537,638 B2* | 1/2017 | Geirhofer | H04L 5/0057 |
| 9,544,932 B2* | 1/2017 | Lee | H04W 56/004 |
| 9,585,048 B2* | 2/2017 | Ozturk | H04W 28/0205 |
| 9,585,188 B2* | 2/2017 | Jang | H04W 76/028 |
| 9,591,631 B2* | 3/2017 | You | H04L 5/001 |
| 9,591,666 B2* | 3/2017 | Folke | H04W 48/20 |
| 9,603,038 B2* | 3/2017 | Tseng | H04W 24/02 |
| 9,622,174 B2* | 4/2017 | Kim | H04L 5/001 |
| 9,686,711 B2* | 6/2017 | Kim | H04W 28/0236 |
| 9,712,213 B2* | 7/2017 | Mochizuki | H04W 24/10 |
| 9,722,743 B2 | 8/2017 | Li et al. | |
| 9,730,097 B2* | 8/2017 | Yu | H04W 24/10 |
| 9,749,998 B2* | 8/2017 | Takeda | H04W 72/0413 |
| 9,763,151 B2* | 9/2017 | Kim | H04L 5/00 |
| 9,801,232 B2* | 10/2017 | Deenoo | H04W 72/046 |
| 9,806,873 B2* | 10/2017 | Kim | H04W 52/0216 |
| 9,820,117 B1* | 11/2017 | Tran | H04W 4/21 |
| 9,832,743 B2* | 11/2017 | Lee | H04W 52/146 |
| 9,949,297 B2* | 4/2018 | Uemura | H04W 74/0833 |
| 9,967,066 B2* | 5/2018 | Li | H04W 72/12 |
| 9,992,693 B2* | 6/2018 | Kuo | H04W 24/02 |
| 10,075,991 B2* | 9/2018 | Kim | H04W 76/14 |
| 10,313,208 B2* | 6/2019 | da Silva | H04L 41/5054 |
| 2005/0039101 A1 | 2/2005 | Torsner | |
| 2005/0113070 A1 | 5/2005 | Okabe | |
| 2005/0153692 A1 | 7/2005 | Hwang et al. | |
| 2007/0249352 A1 | 10/2007 | Song et al. | |
| 2008/0188223 A1 | 8/2008 | Vesterinen et al. | |
| 2008/0248840 A1 | 10/2008 | Kim et al. | |
| 2008/0310368 A1 | 12/2008 | Fischer | |
| 2009/0034476 A1 | 2/2009 | Wang et al. | |
| 2010/0135249 A1 | 6/2010 | Meyer et al. | |
| 2011/0053658 A1* | 3/2011 | Park | H04W 52/0216 455/574 |
| 2011/0243008 A1* | 10/2011 | Kim | H04L 1/1893 370/252 |
| 2011/0317642 A1* | 12/2011 | Eravelli | H04L 49/90 370/329 |
| 2012/0076090 A1 | 3/2012 | Kim et al. | |
| 2012/0216039 A1 | 8/2012 | Franklin et al. | |
| 2013/0176988 A1* | 7/2013 | Wang | H04W 28/08 370/331 |
| 2013/0229931 A1* | 9/2013 | Kim | H04W 24/10 370/252 |
| 2013/0258932 A1 | 10/2013 | Kim et al. | |
| 2013/0282855 A1 | 10/2013 | Lee et al. | |
| 2013/0315202 A1 | 11/2013 | May | |
| 2013/0324114 A1* | 12/2013 | Raghothaman | H04W 76/023 455/426.1 |
| 2013/0329694 A1 | 12/2013 | Vrzic et al. | |
| 2014/0023013 A1 | 1/2014 | Lee et al. | |
| 2014/0056243 A1 | 2/2014 | Pelletier et al. | |
| 2014/0301188 A1 | 10/2014 | Koskinen | |
| 2014/0301362 A1 | 10/2014 | Koskinen | |
| 2014/0369201 A1 | 12/2014 | Gupta et al. | |
| 2015/0063151 A1 | 3/2015 | Sadek et al. | |
| 2015/0098459 A1 | 4/2015 | Lee et al. | |
| 2015/0109927 A1* | 4/2015 | Ozturk | H04W 36/0027 370/235 |
| 2015/0117357 A1* | 4/2015 | Ozturk | H04W 28/0205 370/329 |
| 2015/0181593 A1* | 6/2015 | Kim | H04W 52/0216 370/329 |
| 2015/0208311 A1* | 7/2015 | Lee | H04W 24/10 455/436 |
| 2015/0264699 A1* | 9/2015 | Fwu | H04L 5/0001 370/329 |
| 2015/0351079 A1* | 12/2015 | Himayat | H04W 28/08 370/329 |
| 2016/0021581 A1* | 1/2016 | Deenoo | H04W 48/16 370/331 |
| 2016/0057585 A1* | 2/2016 | Horn | H04W 80/02 370/312 |
| 2016/0073305 A1* | 3/2016 | Yang | H04W 36/0083 455/436 |
| 2016/0157295 A1* | 6/2016 | Qin | H04W 24/02 370/329 |
| 2016/0285716 A1* | 9/2016 | Pelletier | H04L 5/0098 |
| 2016/0323823 A1* | 11/2016 | Ryoo | H04W 52/0229 |
| 2016/0374000 A1* | 12/2016 | Kim | H04W 48/20 |
| 2017/0070923 A1* | 3/2017 | Li | H04W 36/0066 |
| 2017/0195955 A1* | 7/2017 | Ryoo | H04W 52/0216 |
| 2017/0264562 A1* | 9/2017 | Yi | H04W 80/02 |

FOREIGN PATENT DOCUMENTS

| | | |
|---|---|---|
| JP | 2010-521917 A | 6/2010 |
| JP | 2012-160893 A | 8/2012 |

(56) References Cited

FOREIGN PATENT DOCUMENTS

| KR | 10-2013-0085429 | A | | 7/2013 | | |
|---|---|---|---|---|---|---|
| KR | 10-2015-0023583 | A | | 3/2015 | | |
| WO | 2013/143051 | A1 | | 10/2013 | | |
| WO | 2014/064322 | A1 | | 5/2014 | | |
| WO | WO 2014/172306 | A2 | * | 10/2014 | .............. | H04W 4/00 |

OTHER PUBLICATIONS

Junxian Huang et al., "A Close Examination of Performance and Power Characteristics of 4G LTE Networks", MobiSys '12, Jun. 25-29, 2012.
Mads Lauridsen et al., "An Empirical LTE Smartphone Power Model with a View to Energy Efficiency Evolution", Intel Technology Journal, 2014, pp. 172-193, vol. 18, Issue 1.
Chinghwa Yu et al., "IEEE 11-14/1444r2: Energy Efficiency Evaluation and Simulation Model", MediaTek Inc., Nov. 2014, pp. 1-14.
"Battery Life Test Results", GSMArena.com, Apr. 29, 2016, pp. 1-12.
Alcatel-Lucent Shanghai Bell et al., "UE power saving considerations for LAA", 3GPP Draft, R2-150376-LAA-V02, 3rd Generation Partnership Project (3GPP), Mobile Competence Centre, 650, Route Des Lucioles, F-06921 Sophia-Anti Polis Cedex, France, vol. RAN WG2, No. Athens, Greece.
Intel Corporation, "DRS Design Options for LAA Downlink", 3GPP Draft, RI-151108, 3rd Generation Partnership Project (3GPP), Mobile Competence Centre, 650, Route Des Lucioles, F-06921 Sophia-Anti Polis Cedex, France, vol. RAN WGI, No. Paris, France.
Motorola Mobility, "Activation and Deactivation of LAA SCells", 3GPP Draft, R2-150474, 3rd Generation Partnership Project (3GPP), Mobile Competence Centre, 650, Route Des Lucioles, F-06921 Sophia-Anti Polis Cedex, France, vol. RAN WG2, No. Athens, Greece.
ETRI, "Scenarios and Requirements for LAA", 3GPP Draft, R2-150234, 3rd Generation Partnership Project (3GPP), Mobile Competence Centre, 650, Route Des Lucioles, F-06921 Sophia-Antipolis Cedex, France, vol. RAN WG2, No. Athens, Greece.

Huawei et al., "Further analysis on the required functionalities for LAA", 3GPP Draft, RI-144590, 3rd Generation Partnership Project (3GPP), Mobile Competence Centre, 650, Route Des Lucioles, F-06921 Sophia-Antipolis Cedex, France, vol. RAN WG1, No. San Francisco, USA.
European Search Report dated Apr. 16, 2018, issued in European Patent Application No. 16786789.4-1219.
U.S. Office Action dated Jun. 4, 2018, issued in U.S. Appl. No. 15/466,197.
3GPP TSG-RAN2 Meeting #81bis Chicago, IL, USA, Apr. 15-19, 2013. R2-131181. Load Balance Between 3GPP and WLAN.
Japanese Notice of Prelimanry Rejection dated Oct. 15, 2018, issued in Japanese Application No. 2017-556655.
U.S. Advisory Action dated Aug. 9, 2018, issued in U.S. Appl. No. 15/466,197.
U.S. Office Action dated Sep. 24, 2018, issued in U.S. Appl. No. 15/466,197.
Alcatel-Lucent; "PDCP status reporting"; 3GPP TSG-RAN WG2 meeting #86; Seoul, South Korea; May 19-23, 2014; R2-142508.
Samsung; "User Plane Architecture for LTE-WLAN integration"; 3GPP TSG-RAN2 meeting #89bis; Bratislava, Slovakia, Apr. 20-24, 2015; R2-151668.
Samsung; "Reporting from the SeNB in dual connectivity"; 3GPP TSG-RAN WG3 meeting #84; Seoul, South Korea; May 19-23, 2014; R3-141254.
U.S. Office Action for related case U.S. Appl. No. 15/466,197; dated Jan. 28, 2019.
U.S. Advisory Action for related case U.S. Appl. No. 15/466,197; dated Mar. 28, 2019.
European Office Action; Ref: # P6071534EP1; Application #/Patent #: 19160611.0-1219; dated Mar. 27, 2019.
Japanese Office Action; Application #: JP2017-556655; dated Mar. 18, 2019.
Japanese Notice of Patent Grant dated Jul. 29, 2019, issued in Japanese Application No. 2017-556655.
European Office Action dated Aug. 20, 2019, issued in European Application No. 19 160 611.0-1219.
U.S. Office Action dated Aug. 1, 2019, issued in U.S. Appl. No. 15/466,197.

* cited by examiner

| Beacon Option | UE WLAN Activation | LTE UL Grant |
|---|---|---|
| 0: Legacy beacon | Activation after waiting, next beacon reception | Resource allocation after next beacon |
| 1: Short Beacon | Immediate activation, short beacon reception | Resource allocation after short beacon |

FIG.8C

| Information | Length | NOTE |
|---|---|---|
| Direction | 1 bit | Uplink/downlink transmission recognition, compressed beacon/best beam feedback recognition |
| Beam ID | 6 bit | AP's Tx beam ID information, informed in feedback of (16, 32, 64) |
| Antenna ID | 2 bit | MIMO antenna ID information, informed at feedback |
| Partial PCID | 5 bit | - SFT sequence = other than 8~19, additional PCID recognition information in case of conventional design, 256 bits (among 8bits, 3bit STF, 5bit) are required |
| Total | 14 bit | Control PHY HDR 88bit information can be included legacy PHY HDR 40bit + reserved (48 bit) 48-14 = reserve 34 bits are available |

FIG.8G

| Option | CTRL PHY configuration | | Length (us) | Normalized Length | NOTE | Candidate Info |
|---|---|---|---|---|---|---|
| 1 | STF only | | 3.636 | 1.00 | Minimum length, no additional information transmission | - |
| 2-1 | STF,CE,HDR (11B Legacy) | | 8.96 | 2.46 | One header: 11byte transmission (88 bits in total) | Beamforming Info., Partial Cell ID,UL Feedback Grant |
| 2-2 | STF,CE,HDR (22B Legacy) | | 13.69 | 3.77 | Two header: 22byte transmission (176 bits in total) | |
| 3 | STF, CE, HDR, DATA | 14B 4.073 | 13.03 | 3.58 | In data transmission, Legacy MAC 14bute+ 0 | FFS |
| | | 34B 9.891 | 18.85 | 5.18 | In data transmission, Legacy MAC 14bute+ 20B data | FFS |
| | | 100B 29.091 | 38.05 | 10.47 | In data transmission, Legacy MAC 14bute+ 86B data | FFS |

FIG.8H

| Scenario | MeNB | UE | Active → Sleep |
|---|---|---|---|
| 1 | WLAN Sleep Request (SN x) | WLAN Sleep Response (SN x), or No Response | SN difference cannot be recognized, Packet loss occurs |
| 2 | WLAN Sleep Request (SN x) | WLAN Sleep Response + (SN_UE o) | SN difference (SN -SN_UE) is recognized, Loss packet is retransmitted to MeNB via LTE Air |
| 3 | WLAN Sleep Request + (SN o) | No Response | SN difference (SN -SN_UE) is recognized, UE receives corresponding SN packet at the request, and enters sleep status |
| 4 | WLAN Sleep Request + (SN o) | WLAN Sleep Response + (SN_UE o) | SN difference is recognized, UE and MeNB receive corresponding SN packet at the request, and thereafter enter sleep status or transmit packet after SN_UE via LTE Air |

FIG.10B

| State No. | UE | MeNB | Note |
|---|---|---|---|
| 1 | ON | ON | Tx/Rx state match, no problem |
| 2 | ON | OFF | Mismatch, without DL traffic, waste of UE power |
| 3 | OFF | ON | Mismatch, with DL traffic<br>• Transmission is impossible (fails) when unrecognized by MeNB/AP<br>• Buffering is necessary by on-indication signaling duration when recognized by MeNB/AP |
| 4 | OFF | OFF | State match, no problem, decrease in UE power consumption |

FIG.11B

| Case | UE WLAN modem Sleep/Activation state mismatch occurrence cause | Sleep/Active correction method |
|---|---|---|
| 1 | Unlicensed Band Channel Access Delay | AP Correct State @ LTE/WLAN Air |
| 2 | Control Signal Latency (MeNB-AP Xw Delay) | AP DL Traffic Buffering |
| 3 | UL Traffic initiates WLAN Activation | UE Update MeNB @ LTE Air |
| 4 | Timer Mismatch (Clock draft) | Activation Margin |

FIG.12D

METHOD AND APPARATUS FOR CONTROLLING COMMUNICATION OF A PORTABLE TERMINAL IN A WIRELESS COMMUNICATION SYSTEM

CROSS-REFERENCE TO RELATED APPLICATION(S)

This application claims the benefit under 35 U.S.C. § 119(a) of a Korean patent application filed on Apr. 29, 2015 in the Korean Intellectual Property Office and assigned Serial number 10-2015-0060647, and of a Korean patent application filed on Jun. 29, 2015 in the Korean Intellectual Property Office and assigned Serial number 10-2015-0092378, the entire disclosure of each of which is hereby incorporated by reference.

TECHNICAL FIELD

The present disclosure relates to a method and an apparatus for controlling communication of a terminal supporting a multi-radio access technology in a wireless communication system. More particularly, the present disclosure relates to a method and an apparatus for decreasing power consumption of a terminal simultaneously supporting a licensed band communication system and an unlicensed band communication system in a licensed and unlicensed band multi-radio access technology (RAT) environment.

BACKGROUND

To meet a demand on wireless data traffic which has been in an increasing trend after a $4^{th}$ Generation (4G) communication system was commercialized, there is an ongoing effort to develop an improved $5^{th}$ Generation (5G) communication system or a pre-5G communication system. For this reason, the 5G communication system or the pre-5G communication system is called a beyond 4G network communication system or a post long term evolution (LTE) system.

To achieve a high data transfer rate, the 5G communication system is considered to be implemented in an mmWave band (e.g., such as a 60 GHz band). To reduce a propagation path loss at the mmWave band and to increase a propagation delivery distance, beamforming, massive multiple input multiple output (MIMO), full dimensional MIMO (FD-MIMO), array antenna, analog beam-forming, and large scale antenna techniques are under discussion in the 5G communication system.

In addition, to improve a network of a system, techniques, such as an evolved small cell, an advanced small cell, a cloud radio access network (RAN), an ultra-dense network, device to device (D2D) communication, a wireless backhaul, a moving network, cooperative communication, coordinated multi-points (CoMP), and reception interference cancellation, and the like, are being developed in the 5G communication system.

In addition thereto, hybrid frequency shift keying and quadrature amplitude modulation (FQAM) and sliding window superposition coding (SWSC) as an advanced coding modulation (ACM) technique and filter bank multi carrier (FBMC), non orthogonal multiple access (NOMA), and sparse code multiple access (SCMA), and the like, as an advanced access technology are being developed in the 5G system.

Further, recently, there is an ongoing discussion on a technique for effectively operating a multi-modem terminal simultaneously supporting a licensed band communication system and an unlicensed band communication system in a licensed and unlicensed band multi-radio access technology (RAT) environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for decreasing power consumption of a terminal simultaneously supporting a licensed band communication system and an unlicensed band communication system in a licensed and unlicensed band multi-radio access technology (RAT) environment.

Another aspect of the present disclosure is to provide a method and an apparatus for keeping an activation state of some communication modules among a plurality of communication modules supporting different RATs and included in a terminal in a licensed and unlicensed band multi-RAT environment, and for controlling an activation state of the other communication modules.

Another aspect of the present disclosure is to provide a method and an apparatus for performing downlink monitoring for at least one different terminal by one terminal in a licensed and unlicensed band multi-RAT environment, and for controlling an activation state of at least one communication module for the at least one different terminal.

In accordance with an aspect of the present disclosure, a method of controlling a terminal in a wireless communication system is provided. The method includes receiving information regarding an operation of a second system by using a first communication module configured to support a first system, and controlling an activation state of a second communication module configured to support the second system, based on the information regarding the operation of the second system.

In accordance with another aspect of the present disclosure, a method of a base station supporting a first system is provided. The method includes detecting a presence/absence of downlink traffic of a second system for a terminal, and transmitting information regarding an operation of the second system of the terminal to the terminal via a link of the first system based on the presence/absence of the downlink traffic of the second system.

In accordance with another aspect of the present disclosure, a method of a base station supporting a second system is provided. The method includes determining whether first information for indicating a communication module state of a second system controlled by a first system for a terminal is matched to second information for indicating a communication module state of a second system of the terminal, and requesting, if the first information is not matched to the second information, to change the communication module state of the second system of the terminal.

In accordance with another aspect of the present disclosure, an apparatus of a terminal in a wireless communication system is provided. The apparatus includes a first communication module configured to support a first system, a second communication module configured to support a second system, and a controller configured to receive information regarding an operation of the second system by using the first communication module and, based on the information regarding the operation of the second system, control an activation state of the second module.

In accordance with another aspect of the present disclosure, an apparatus of a base station supporting a first system is provided. The apparatus includes a communication module, and a controller configured to detect a presence/absence of downlink traffic of a second system for a terminal, and transmit information regarding an operation of the second system of the terminal to the terminal via a link of the first system based on the presence/absence of the downlink traffic of the second system.

In accordance with another aspect of the present disclosure, an apparatus of a base station supporting a second system is provided. The apparatus includes a communication module, and a controller configured to determine whether first information for indicating a communication module state of a second system controlled by a first system for a terminal is matched to second information for indicating a communication module state of a second system of the terminal, and request, if the first information is not matched to the second information, to change the communication module state of the second system of the terminal.

In accordance with another aspect of the present disclosure, a method of controlling a terminal in a wireless communication system is provided. The method includes receiving, from a base station of a first system via a first communication module configured to support the first system, a signal containing information for indicating whether downlink traffic is generated for at least one different terminal, and transmitting, to the at least one terminal, a signal for requesting to control an activation state of a communication module corresponding to the downlink traffic.

In accordance with another aspect of the present disclosure, a method of controlling a terminal in a wireless communication system is provided. The method includes receiving from a different terminal a signal for requesting to control an activation state of a second communication module corresponding to a second system via a first communication module corresponding to a first system, and controlling the activation state of the second communication module corresponding to the second system based on the signal received from the different terminal.

In accordance with another aspect of the present disclosure, an apparatus of a terminal in a wireless communication system is provided. The apparatus includes a communication unit having a plurality of communication modules supporting different systems, and a controller configured to receive, from a base station of a first system via a first communication module configured to support the first system, a signal containing information for indicating whether downlink traffic is generated for at least one different terminal, and transmit, to the at least one terminal, a signal for requesting to control an activation state of a communication module corresponding to the downlink traffic.

In accordance with another aspect of the present disclosure, an apparatus of a terminal in a wireless communication system is provided. The apparatus includes a communication unit having a plurality of communication modules supporting different systems, and a controller configured to receive from a different terminal a signal for requesting to control an activation state of a second communication module corresponding to a second system via a first communication module corresponding to a first system, and control the activation state of the second communication module corresponding to the second system based on the signal received from the different terminal.

The present disclosure can decrease power consumption of a terminal in a licensed and unlicensed band multi-RAT environment in such a manner that, among a plurality of communication modules supporting different RATs and included in the terminal, an activation state of a $1^{st}$ communication module supporting a $1^{st}$ RAT is kept, and at least one different communication module is activated only in the presence of traffic through a corresponding system and is deactivated in the absence of traffic. The present disclosure also can decrease power consumption in terminals in a group in such a manner that a group of a plurality of terminals is formed and thereafter a representative terminal in the group performs downlink monitoring for different terminals in the group, and controls an activation state of a communication module for different terminals in the group according to a result of the downlink monitoring.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8C illustrates a UE operation and uplink resource allocation based on beacon option information included in a $2^{nd}$ access module activation signal according to an embodiment of the present disclosure;

FIG. 8G illustrates information included in a short beacon signal according to an embodiment of the present disclosure;

FIG. 8H illustrates information included in a short beacon signal based on a frame structure of a short beacon signal according to an embodiment of the present disclosure;

FIG. 10B illustrates an operation based on transmission/reception of a last packet number when a $2^{nd}$ access module of a UE is deactivated according to an embodiment of the present disclosure;

FIG. 11B illustrates a situation of deciding a state for a $2^{nd}$ access module of a UE by the UE and a $1^{st}$ access eNB according to an embodiment of the present disclosure;

FIG. 12D illustrates a cause of a state mismatch occurrence on a $2^{nd}$ access module of a UE and a method of correcting the state mismatch according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A mobile station (MS) according to an embodiment of the present disclosure may be fixed or mobile, and may also be called other terms, such as a user equipment (UE), a mobile terminal (MT), a user terminal (UT), a subscriber station (SS), a wireless device, a personal digital assistant (PDA), a handheld device, and the like.

Further, a base station (BS) according to an embodiment of the present disclosure is generally a fixed station which communicates with the MS, and may also be called other terms, such as an evolved-nodeB (eNB), a base transceiver system (BTS), an access point, and the like.

The present disclosure described hereinafter relates to a method and an apparatus for decreasing power consumption of a UE simultaneously supporting a licensed band communication system and an unlicensed band communication system in a licensed and non-licensed band multi-radio access technology (RAT) environment.

Figure 1:
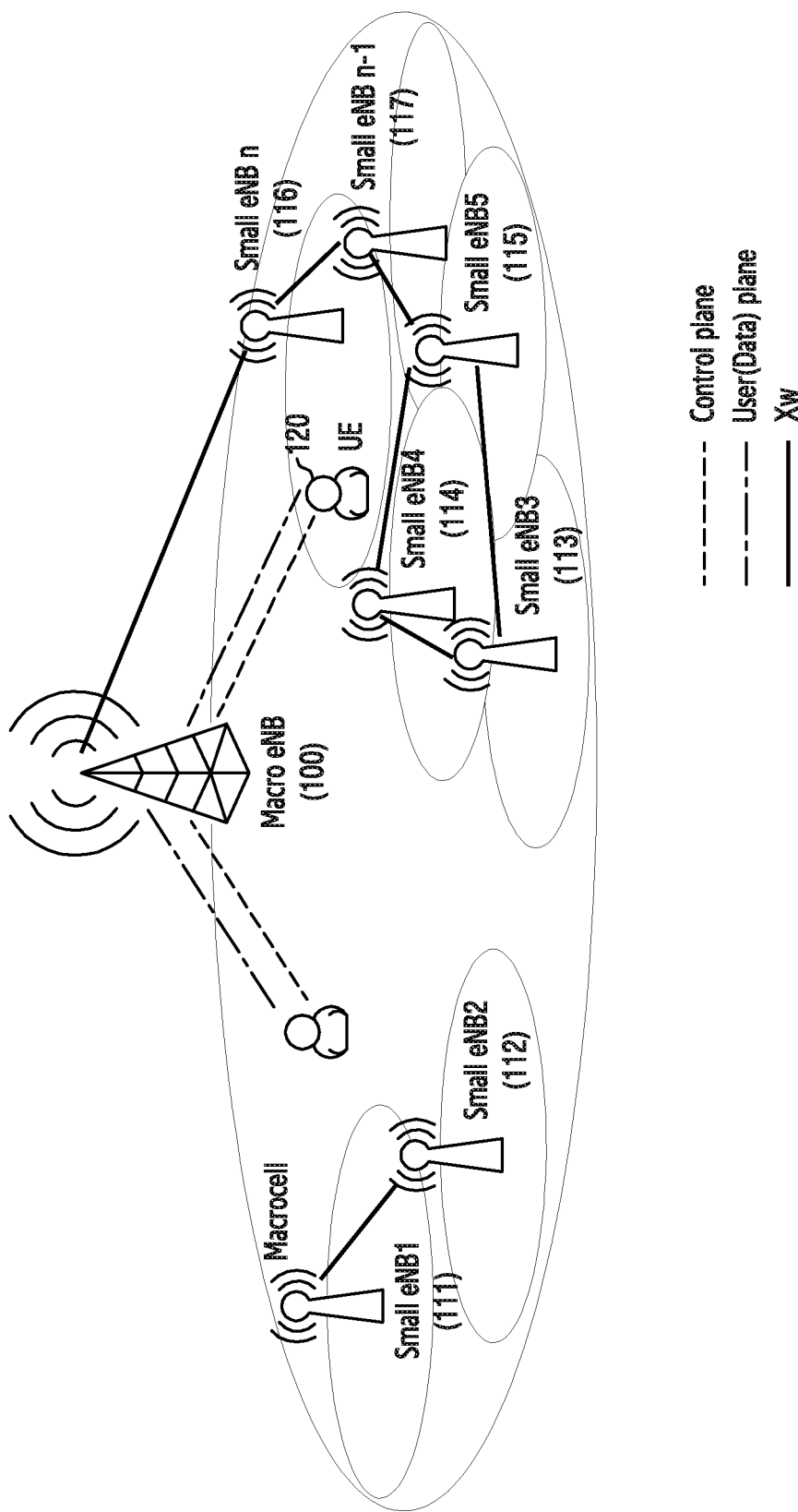
FIG. 1 illustrates a network system in a licensed band and unlicensed band multi-radio access technology (RAT) environment according to an embodiment of the present disclosure.

FIG. 1 illustrates a network system in a licensed band and unlicensed band multi-RAT environment according to an embodiment of the present disclosure.

Referring to FIG. 1, according to an embodiment of the present disclosure, in an environment in which a macro cell network of a licensed band and a small cell network of an unlicensed band coexist, a UE 120 may communicate with a macro eNB 100 of the licensed band and small eNBs 111 to 117 of the unlicensed band. Therefore, the UE 120 according to the embodiment of the present disclosure may include a communication module for communicating with the macro eNB 100 of the licensed band and a communication module for communicating with the small eNBs 111 to 117 of the unlicensed band. Herein, the macro eNB 100 may occupy a channel by using the licensed band, have a wide coverage, use a narrow bandwidth, and provide a low data transfer rate. On the other hand, the small eNBs 111 to 117 may occupy a channel by using the unlicensed band, have a narrow coverage, use a wide bandwidth, and provide a high data transfer rate.

Figure 2A:
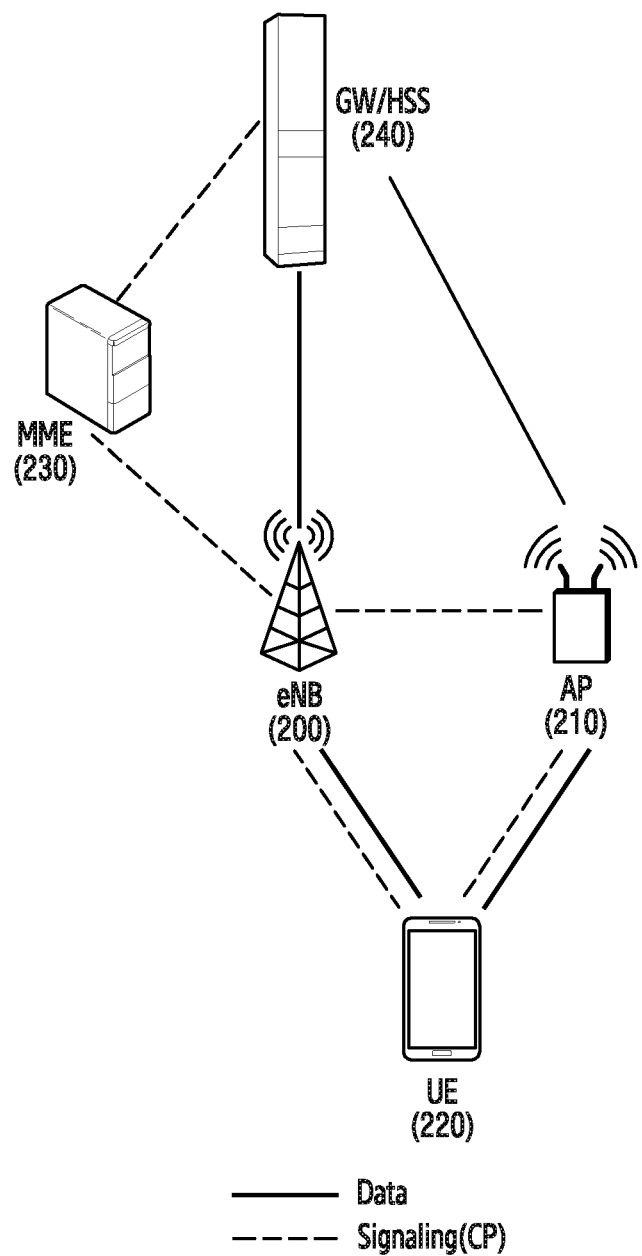
FIGS. 2A and 2B illustrate a network structure of a multi-RAT environment according to various embodiments of the present disclosure.
Figure 2B:
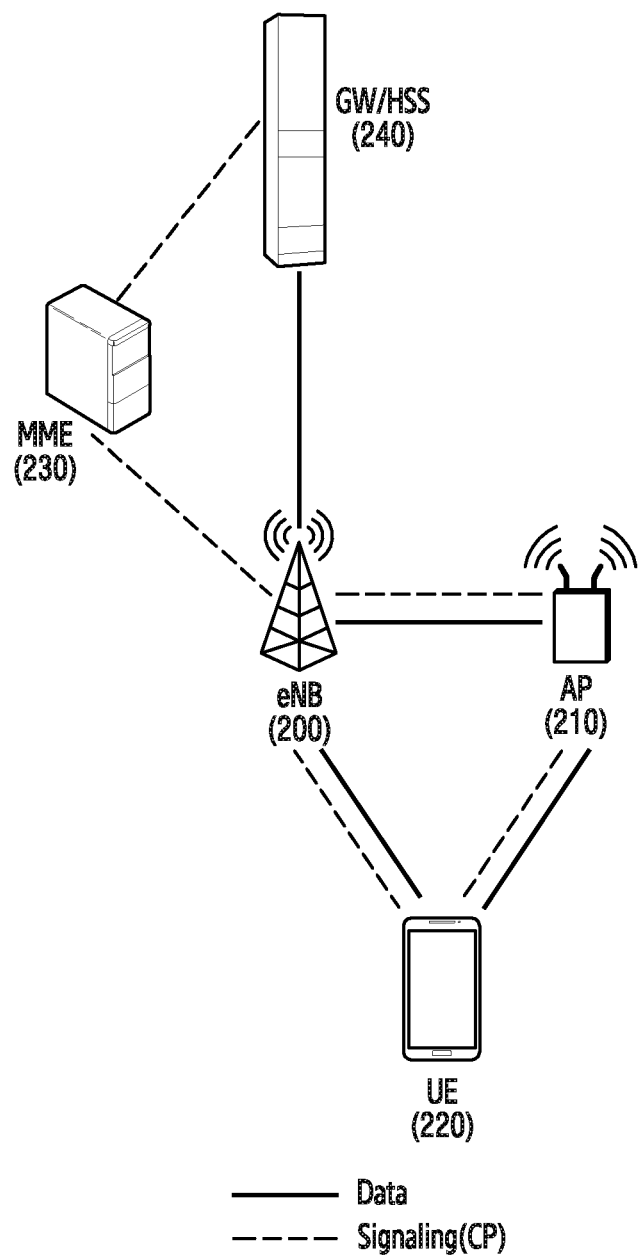

For example, if the macro eNB 100 of the licensed band is assumed as an eNB 200 of a long term evolution (LTE) system and if the small eNBs 111 to 117 of the unlicensed band are assumed as an access point (AP) 210 of a wireless local area network (WLAN), a network structure of a multi-RAT environment for communicating with the UEs 120 and 220 may be the same as shown in FIG. 2A or 2B.

FIGS. 2A and 2B illustrate a network structure of a multi-RAT environment according to various embodiments of the present disclosure.

Referring to FIGS. 2A and 2B, a UE 220 may transmit/receive data and signaling to/from an eNB 200 and an AP 210. In this case, the AP 210 according to an embodiment of the present disclosure directly transmits/receives data for the UE 220 to/from a gateway (GW)/home subscriber server (HSS) 240, but may transmit/receive signaling for the UE 220 to/from a mobility management entity (MME) 230 and the GW/HSS 240 via the eNB 200. Further, the AP 210 according to the embodiment of the present disclosure may transmit/receive data and signaling for the UE 220 to/from the MME 230 and the GW/HSS 240 via the eNB 200.

For example, the small eNBs 111 to 116 (e.g., the AP 210) according to the embodiment of the present disclosure may transmit/receive signaling for the UEs 120 and 220 via the macro eNB 100 (e.g., the eNB 200). Further, the small eNBs 111 to 116 (e.g., the AP 210) according to the embodiment of the present disclosure may transmit/receive data for the UEs 120 and 220 via the macro eNB 100, or may directly transmit/receive the data to/from a higher network node.

For convenience of explanation, a case where the small eNBs 111 to 116 (e.g., the AP 210) transmit/receive data and signaling via the macro eNB 100 (e.g., the eNB 200) is assumed hereinafter in the embodiment of the present disclosure described. However, the embodiment of the present disclosure described hereinafter may also be applied to a case where the small eNBs 111 to 116 (e.g., the AP 210) transmit/receive signaling via the eNB 100 (e.g., the eNB 200) and directly transmit/receive data to/from a higher network node. Only a difference occurring when the small eNBs 111 to 116 directly transmit/receive data for the UE to/from the higher network node is described below.

Figure 3:
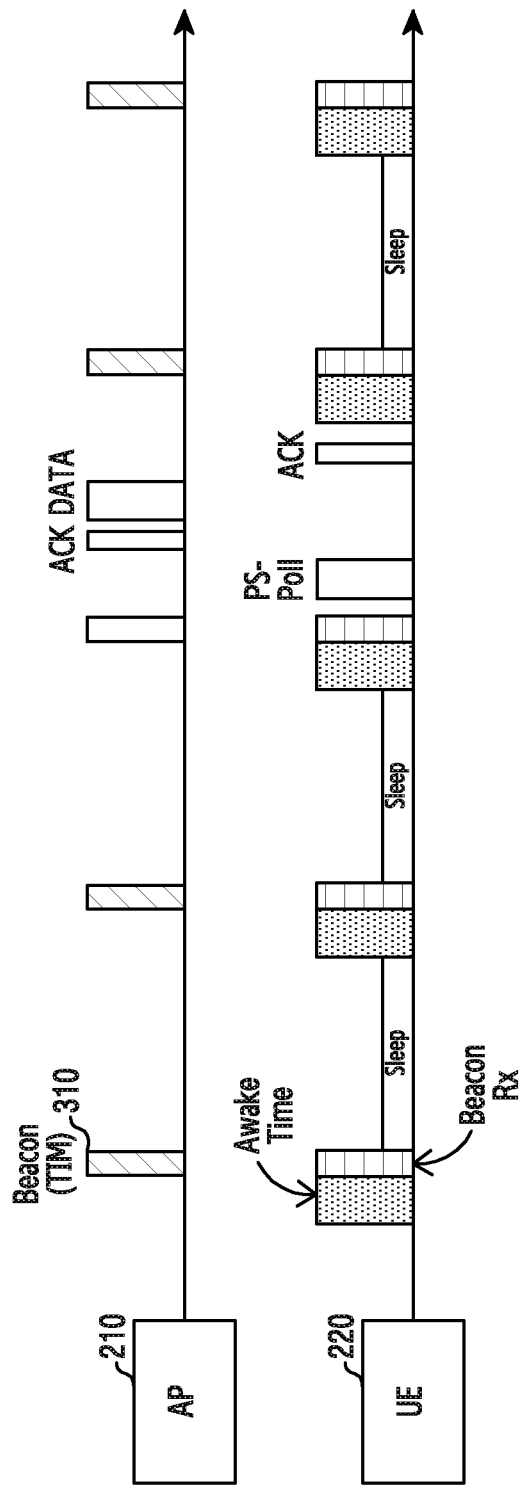
FIG. 3 illustrates a power saving mode (PSM) mechanism of a wireless local area network (WLAN) according to an embodiment of the present disclosure.

FIG. 3 illustrates a power saving mode (PSM) mechanism of a WLAN according to an embodiment of the present disclosure.

Referring to FIG. 3, in general, a UE supporting a WLAN of an unlicensed band uses a PSM mechanism to decrease power consumption. The PSM mechanism implies a mechanism in which a communication module supporting the WLAN of the UE operates in an awake status in a beacon duration periodically repeated, and if it is identified that there is no downlink traffic through a received beacon, operates in a sleep mode until a next beacon duration. For example, an AP 210 of the WLAN periodically transmits a beacon 310, and in this case, a traffic indication map (TIM) included in the beacon indicates a presence/absence of traffic to a UE 220. Therefore, the UE 220 receives the beacon 310 by operating a WLAN communication module in the awake status according to a periodic transmission duration of the beacon 310. Upon identifying of the absence of downlink traffic based on the received beacon 310, the UE 220 may operate the WLAN communication module in the sleep state until a next duration of the beacon 310.

As described above, the UE operating according to the PSM mechanism must operate the WLAN communication module in the awake status in every beacon transmission duration periodically repeated even though there is no downlink data, and thus may periodically consume a great amount of power.

Figure 4:
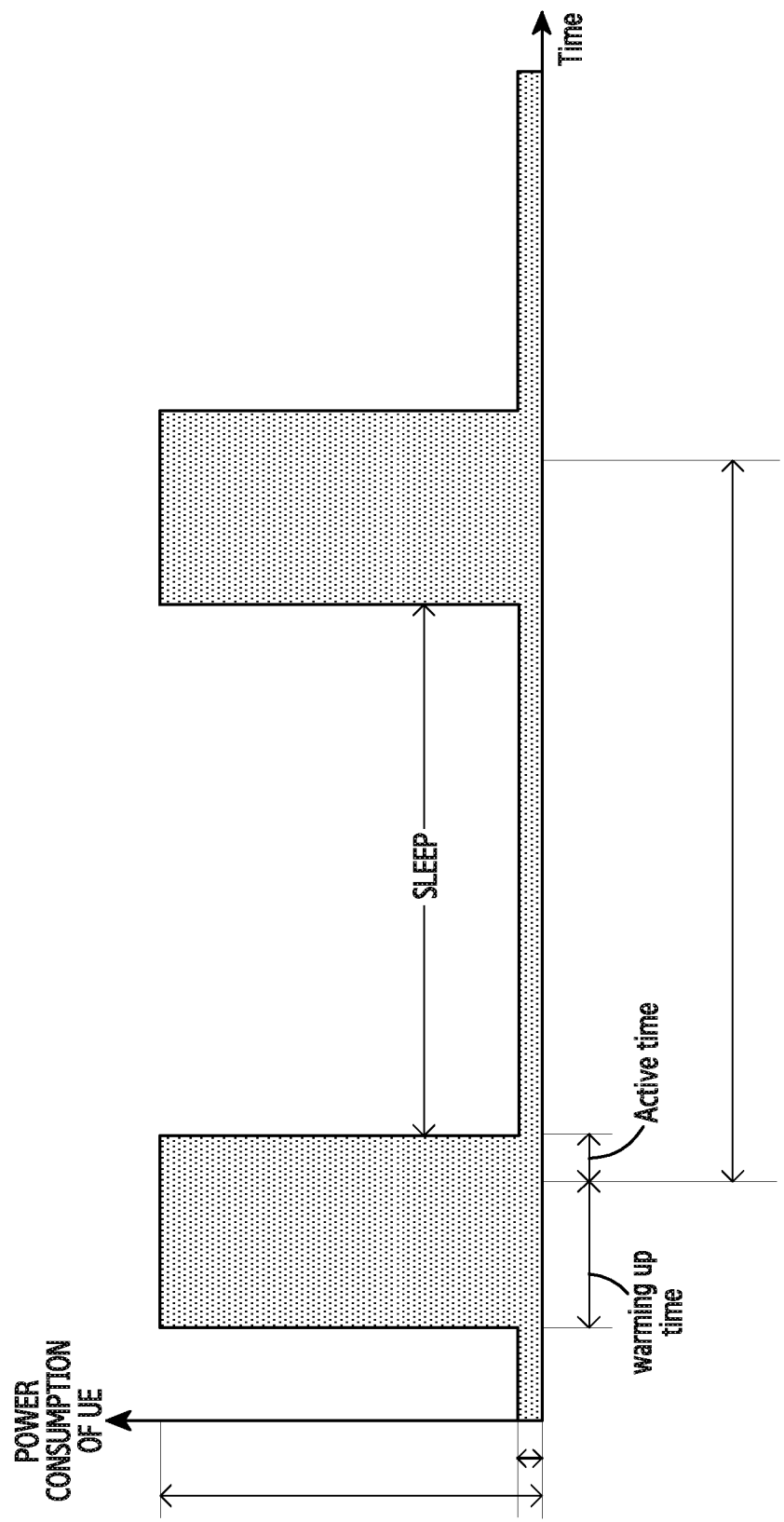
FIG. 4 illustrates a power consumption rate depending on a PSM operation of a user equipment (UE) according to an embodiment of the present disclosure.

FIG. 4 illustrates a power consumption rate depending on a PSM operation of a UE according to an embodiment of the present disclosure.

Referring to FIG. 4, an amount of power consumed in a duration in which the UE operates in the awake status (e.g., a warming-up time duration and an active time duration) is greater than an amount of power consumed in a sleep duration. For example, power consumed in the warming-up time duration is 27.5 mW, which is greater by more than 8000 times the power 0.0033 mW consumed in the sleep time duration. Therefore, in a situation in which there is no downlink data for the UE, the UE operates in the awake status to periodically receive a beacon, thereby unnecessarily consuming power. To address such an unnecessary power consumption issue, there is a method of increasing a beacon transmission period, which may cause a delay in downlink data transmission to the UE.

In addition, the UE operating according to the PSM mechanisms may not be able to receive downlink data due to a failure in occupying a channel of an AP in an environment in which a plurality of APs are congested.

Figure 5:
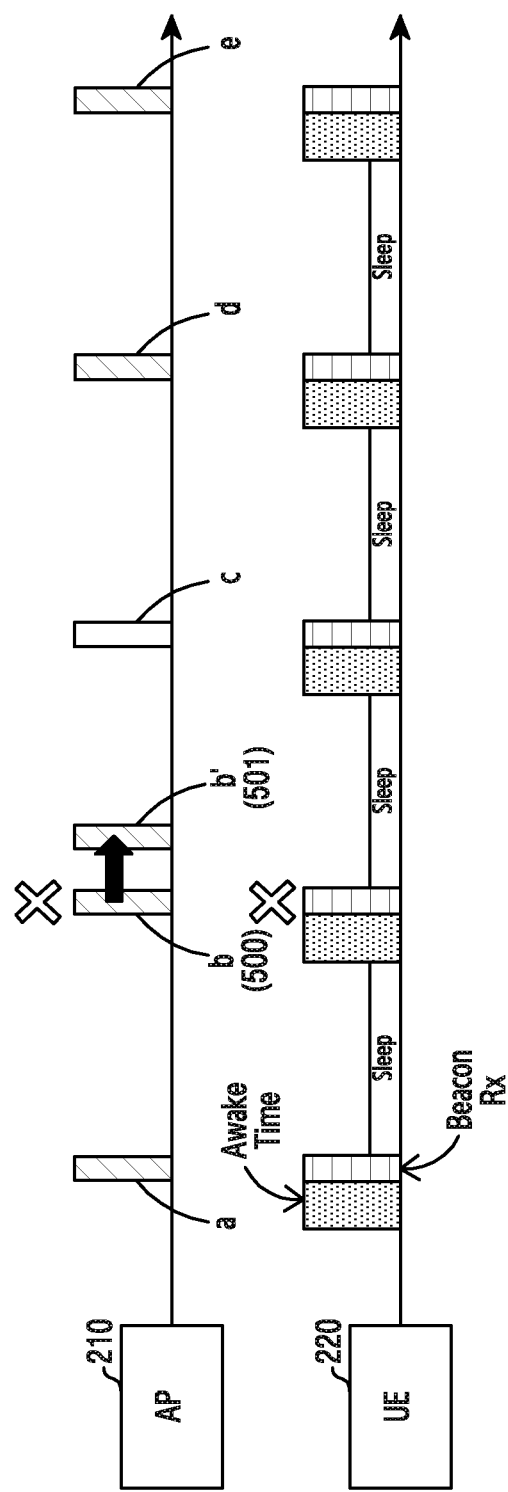
FIG. 5 illustrates a situation in which an access point (AP) fails to occupy a channel in an environment in which overlapping WLANs are congested according to an embodiment of the present disclosure.

FIG. 5 illustrates a situation in which an AP fails to occupy a channel in an environment in which overlapping WLANs are congested according to an embodiment of the present disclosure.

Referring to FIG. 5, in an environment in which a plurality of APs having an overlapping coverage are congested, each AP 210 may not be able to occupy a channel in a pre-set beacon transmission period. In this case, the AP 210 may transmit a beacon signal at a different time other than a time corresponding to the pre-set beacon transmission period. For example, if the AP 210 succeeds in the channel occupation, a beacon is transmitted at time points a, b, c, d, and e, whereas if the AP 210 fails in the channel occupation, a situation may occur in which the beacon cannot be transmitted at the time point b 500 and thus the beacon is transmitted at a time point b' 501. A UE operates in an awake status only in the pre-set beacon transmission period according to the PSM mechanism, and thus cannot receive the beacon transmitted at the time point b' 501. Therefore, even if information for indicating a presence of downlink data for the UE 220 exists in the beacon transmitted at the time point b' 501, the UE 220 cannot recognize this and thus operates in the sleep status.

Accordingly, an embodiment of the present disclosure describes a method and an apparatus for avoiding a downlink data transmission delay and/or data reception failure situation while minimizing unnecessary power consumption of a UE.

The embodiment of the present disclosure described hereinafter is for keeping an activation state of some communication modules among a plurality of communication modules supporting different RATs and included in the UE in a licensed and unlicensed band multi-RAT environment, and is for controlling an activation state of the other communication modules. In the embodiment described hereinafter, a macro cell network of a licensed band is called a $1^{st}$ access system, and a small cell network of an unlicensed band is called a $2^{nd}$ access system. However, the embodiment described hereinafter may also be equally applied to a case where the $1^{st}$ access system is the small cell network of the unlicensed band, and the $2^{nd}$ access system is the macro cell network of the licensed band. In addition, although the embodiment of the present disclosure is described hereinafter under the assumption that the UE supports the $1^{st}$ access system and the $2^{nd}$ access system for convenience of explanation, various embodiments of the present disclosure may also be equally applied to a case where the UE supports three or more access systems.

Figure 6:
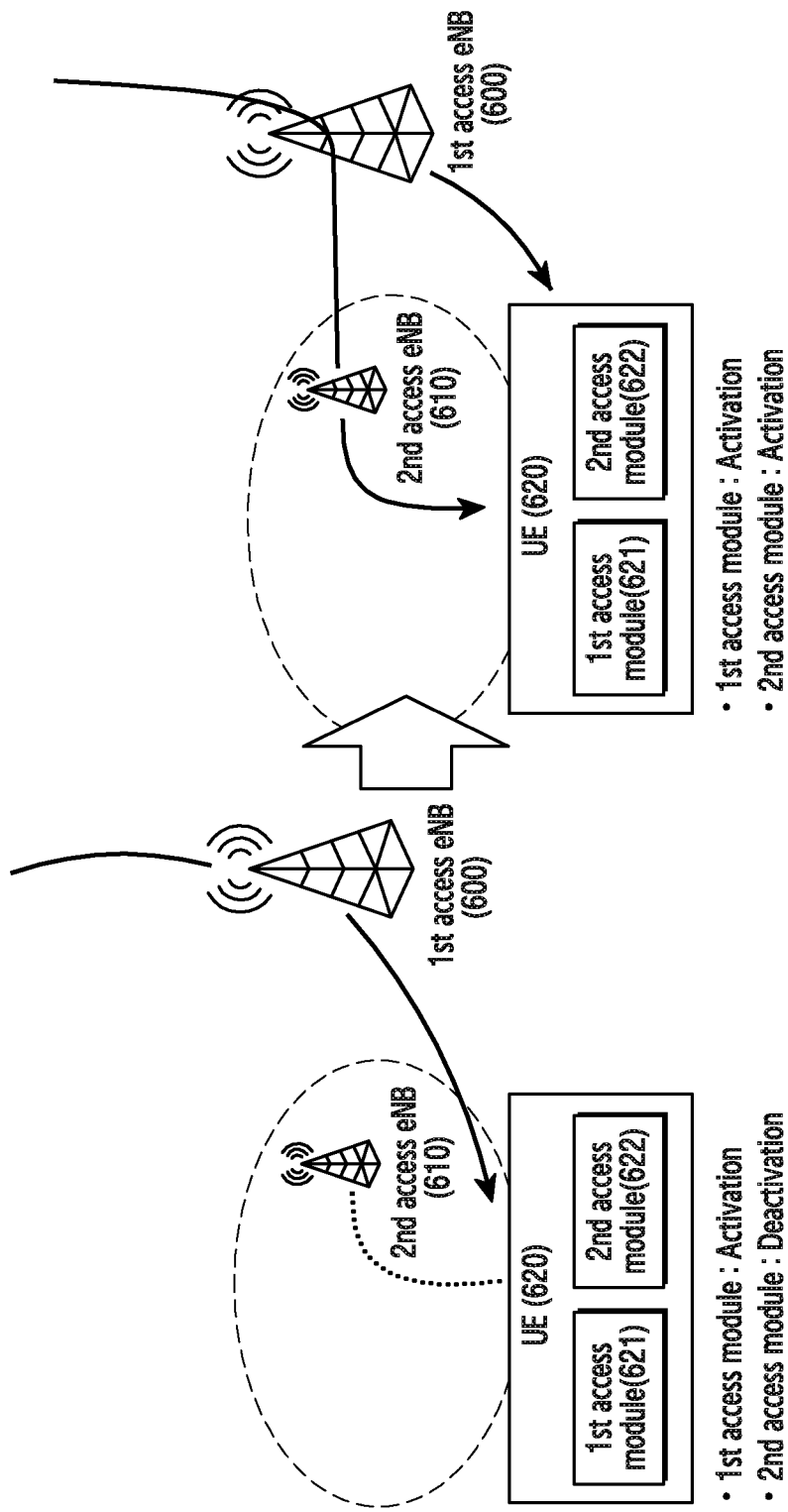
FIG. 6 illustrates a method of controlling an activation state of a $2^{nd}$ access module of a UE supporting a multi-RAT according to an embodiment of the present disclosure.

FIG. 6 illustrates a method of controlling an activation state of a $2^{nd}$ access module of a UE supporting a multi-RAT according to an embodiment of the present disclosure.

Referring to FIG. 6, a UE 620 includes a $1^{st}$ access module supporting a $1^{st}$ access system and a $2^{nd}$ access module supporting a $2^{nd}$ access system. The access module according to the embodiment of the present disclosure may include at least one of a modem, a radio frequency (RF) module, and a power amplifier (PA).

The UE 620 according to the embodiment of the present disclosure may communicate with a $1^{st}$ access eNB 600 while keeping an activation state of a $1^{st}$ access module 621. Further, the UE 620 according to the embodiment of the present disclosure may activate or deactivate a $2^{nd}$ access module 622 based on information received from the $1^{st}$ access eNB 600 while keeping the activation state of the $1^{st}$ access module 621. For example, the UE 620 according to the embodiment of the present disclosure detects a presence/absence of traffic to be received via a $2^{nd}$ access link, based on information received via a link of the $1^{st}$ access system from the $1^{st}$ access eNB 600. The UE 620 activates the $2^{nd}$ access module 622 in the presence of traffic to be received via the $2^{nd}$ access link, and deactivates the $2^{nd}$ access module 622 in the absence of the traffic to be received via the $2^{nd}$ access link. In the embodiment of the present disclosure, an activation state of an access module implies that the access module operates in an awake status (or mode), and a deactivation state of the access module may imply that the access module operates in a sleep status (or mode).

For example, the $1^{st}$ access eNB 600 detects generation of downlink traffic to be transmitted to the UE 620 via a $2^{nd}$ access eNB 610. When downlink data is received from a higher network node, the $1^{st}$ access eNB 600 may detect the generation of downlink traffic. The $1^{st}$ access eNB 600 may transmit a signal for instructing activation of the $2^{nd}$ access module 622 to the UE 620 via a $1^{st}$ access link. Accordingly, the UE 620 activates the $2^{nd}$ access module 622 in a deactivation state in preparation for receiving a signal from the $2^{nd}$ access eNB via the $2^{nd}$ access link. The $1^{st}$ access eNB 600 transmits the detected downlink data to the $2^{nd}$ access eNB 610. The $2^{nd}$ access eNB 610 transmits to the UE 620 the downlink data received from the $1^{st}$ access eNB 600 via the $2^{nd}$ access link. The UE 620 receives the downlink data from the $2^{nd}$ access eNB 610 by using the activated $2^{nd}$ access module 622.

In addition, according to the embodiment of the present disclosure, if downlink data is no longer received from the higher network node within a pre-set time after the downlink data is transmitted to the $2^{nd}$ access eNB 610, the $1^{st}$ access eNB 600 may transmit a signal for instructing deactivation of the $2^{nd}$ access module 622 to the UE 620 via the $1^{st}$ access link. The UE 620 may deactivate the $2^{nd}$ access module 622, based on the deactivation instruction signal of the $2^{nd}$ access module 622 from the $1^{st}$ access eNB 600.

According to another embodiment of the present disclosure, if downlink data is no longer received from the $2^{nd}$ access eNB 610 within a pre-set time after the downlink data is received, the UE 620 may automatically deactivate the $2^{nd}$ access module 622. For example, the UE 620 may deactivate the $2^{nd}$ access module 622 by using a timer, instead of receiving the deactivation instruction signal of the $2^{nd}$ access module 622 from the $1^{st}$ access eNB 600. Information on the timer may be received from the $1^{st}$ access eNB 600, or may be stored in the UE 620.

Figure 7:
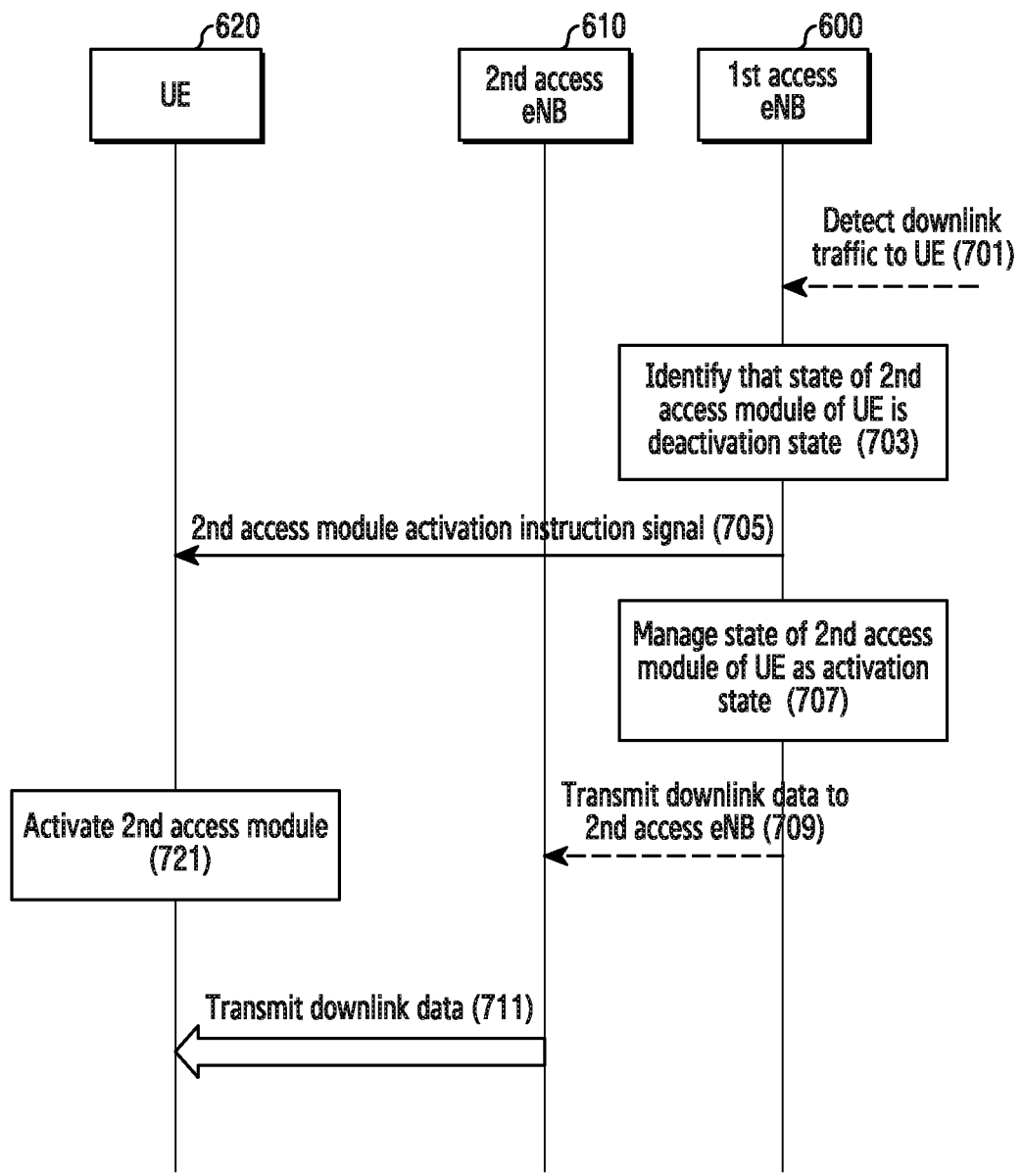
FIG. 7 illustrates a signal flow for activating a $2^{nd}$ access module of a UE according to an embodiment of the present disclosure.

FIG. 7 illustrates a signal flow for activating a $2^{nd}$ access module of a UE according to an embodiment of the present disclosure. It is assumed herein that the $2^{nd}$ access module of the UE is in a deactivation state.

Referring to FIG. 7, in operation 701, a $1^{st}$ access eNB 600 detects downlink traffic to be transmitted to a UE 620 via a $2^{nd}$ access eNB 610. For example, the $1^{st}$ access eNB 600 receives downlink data for a $2^{nd}$ access system of the UE 620 from a higher network node. In operation 703, the $1^{st}$ access eNB 600 identifies that the $2^{nd}$ access module of the UE 620 is in the deactivation state. For example, the $1^{st}$ access eNB 600 may identify that the $2^{nd}$ access module is in the deactivation state, based on pre-stored state information for the $2^{nd}$ access module of the UE 620.

Thereafter, in operation 705, the $1^{st}$ access eNB 600 transmits a signal for instructing activation of the $2^{nd}$ access module to the UE 620 via a $1^{st}$ access link. According to the embodiment of the present disclosure, if the $1^{st}$ access eNB 600 is an LTE system of a licensed band, the $1^{st}$ access eNB 600 may instruct the UE 620 to activate the $2^{nd}$ access module by using a radio resource control (RRC) reconfiguration message. According to another embodiment of the present disclosure, if the $1^{st}$ access eNB 600 is the LTE system of the licensed band, the $1^{st}$ access eNB 600 may instruct the UE 620 to activate the $2^{nd}$ access module by using a media access control (MAC) common emitter (CE) signal for controlling an activation state of a secondary (S) cell. According to another embodiment of the present disclosure, if the $1^{st}$ access eNB 600 is the LTE system of the licensed band, the $1^{st}$ access eNB 600 may instruct the UE 620 to activate the $2^{nd}$ access module by using a physical downlink control channel (PDCCH). In the aforementioned embodiments of the present disclosure, since the RRC reconfiguration message, the MAC CE, and the PDCCH have different transmission rates or transmission delays, any one of the RRC reconfiguration message, the MAC CE, and the PDCCH may be selected based on how quickly the $2^{nd}$ access module of the UE 620 must be activated.

In operation 707, the $1^{st}$ access eNB 600 stores the state information for the $2^{nd}$ access module of the UE 620 by changing its state to an activation state. In operation 709, the $1^{st}$ access eNB 600 transmits downlink data to the $2^{nd}$ access eNB 610. According to the embodiment of the present disclosure, an order of performing operations 705, 707, and 709 may be changed depending on a design rule.

The UE 620 receives the signal for instructing activation of the $2^{nd}$ access module via the $1^{st}$ access module, and in operation 721, activates the $2^{nd}$ access module.

The $2^{nd}$ access eNB 610 receives downlink data from the $1^{st}$ access eNB 600, and in operation 711, transmits the downlink data to the UE 620 via the $2^{nd}$ access link.

Accordingly, the UE 620 may receive the downlink data transmitted from the $2^{nd}$ access eNB 610 via the $2^{nd}$ access module.

In addition, although not shown in FIG. 7, the UE 620 may activate the $2^{nd}$ access module, and thereafter may transmit a response signal for the signal for instructing activation of the $2^{nd}$ access module to the $1^{st}$ access eNB 600. According to the embodiment of the present disclosure, the UE 620 may transmit the response signal to the $1^{st}$ access eNB 600 via the $1^{st}$ access link. According to another embodiment of the present disclosure, the UE 620 may transmit the response signal to the $2^{nd}$ access eNB 610 via a $2^{nd}$ access link. In this case, the $2^{nd}$ access eNB 610 may deliver the response signal to the $1^{st}$ access eNB 600.

In addition, the $1^{st}$ access eNB 600 may transmit the state information for the $2^{nd}$ access module of the UE 620 to the $2^{nd}$ access eNB 610. For example, whenever the state information for the $2^{nd}$ access module of the UE 620 is changed, the $1^{st}$ access eNB 600 may transmit the changed state information to the $2^{nd}$ access eNB 610. For another example, the $1^{st}$ access eNB 600 may periodically transmit the state information for the $2^{nd}$ access module of the UE 620.

Figure 8A:
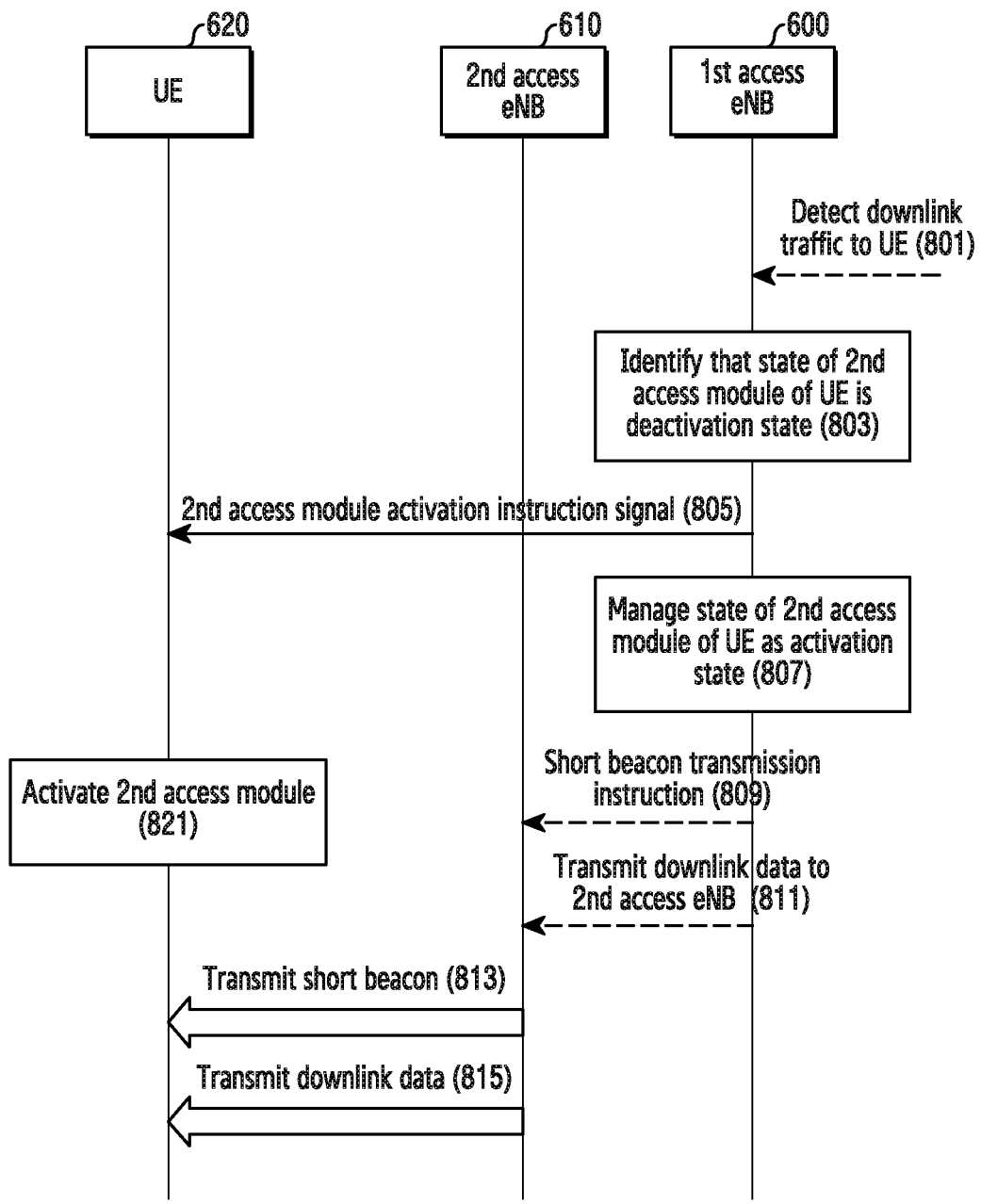
FIGS. 8A and 8B illustrate a signal flow for activating a $2^{nd}$ access module of a UE according to an embodiment of the present disclosure.

FIG. 8A illustrates a signal flow for activating a $2^{nd}$ access module of a UE according to an embodiment of the present disclosure.

Figure 8B:
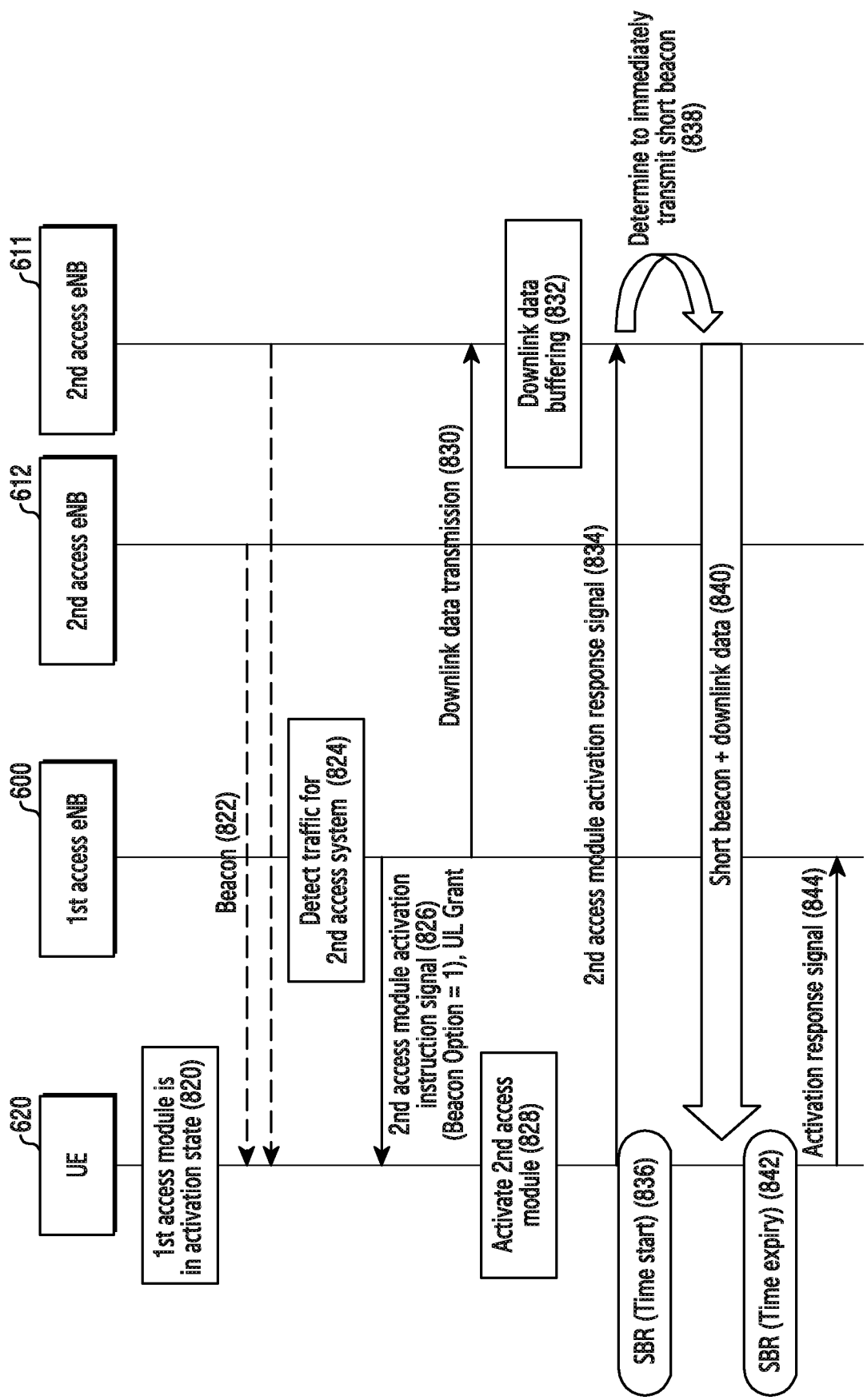
Figure 8D:
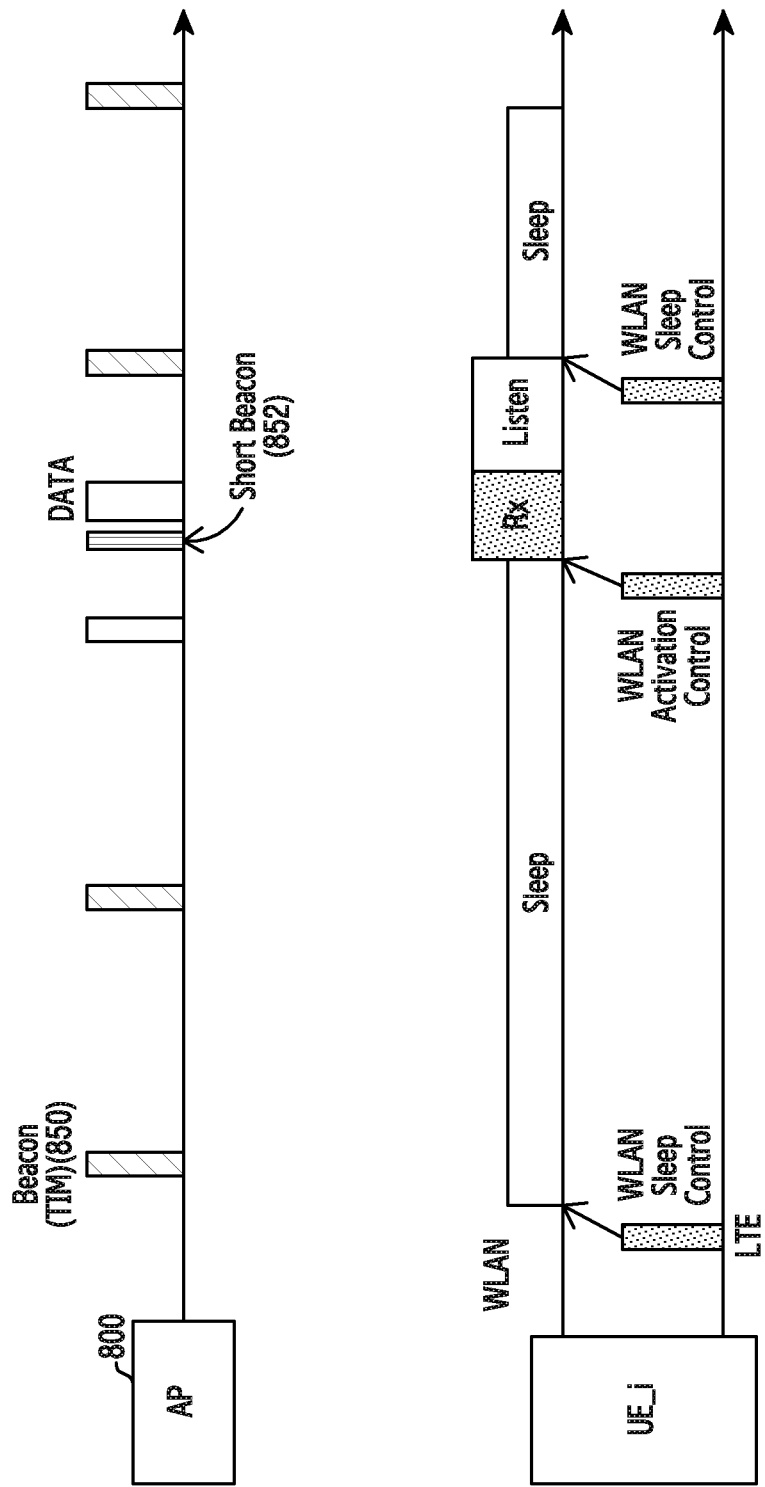
FIG. 8D illustrates activation, deactivation, and transmission of a $2^{nd}$ access module through $1^{st}$ access control transmission according to an embodiment of the present disclosure, and a time and operation of receiving a beacon signal of a $2^{nd}$ access evolved nodeB (eNB) by a UE according thereto.

FIG. 8D illustrates activation, deactivation, and transmission of a $2^{nd}$ access module through $1^{st}$ access control transmission, and a time and operation of receiving a beacon signal of a $2^{nd}$ access eNB by a UE according to another embodiment of the present disclosure.

Figure 8E:
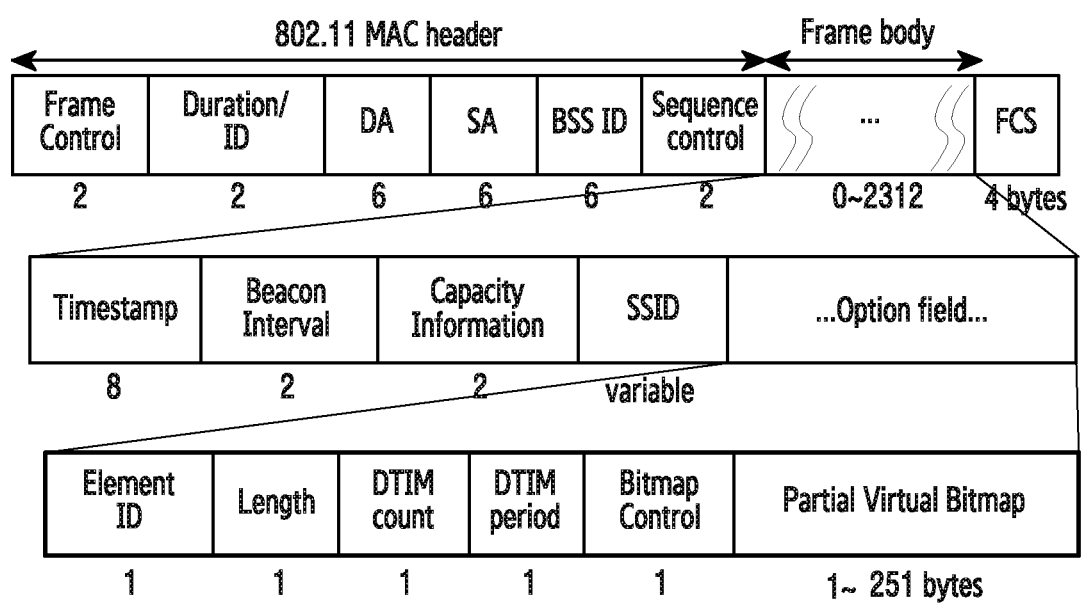
FIG. 8E illustrates a traffic indication map (TIM) configuration of a typical beacon signal according to an embodiment of the present disclosure.

FIG. 8E illustrates a TIM configuration of a typical beacon signal. It is assumed herein that the $2^{nd}$ access module of the UE is in a deactivation state according to an embodiment of the present disclosure.

Referring to FIGS. 8A, 8D, and 8E, in operation 801, a $1^{st}$ access eNB 600 detects downlink traffic to be transmitted to a UE 620 via a $2^{nd}$ access eNB 610. For example, the $1^{st}$ access eNB 600 receives downlink data for a $2^{nd}$ access system of the UE 620 from a higher network node. In operation 803, the $1^{st}$ access eNB 600 identifies that the $2^{nd}$ access module of the UE 620 is in the deactivation state. For example, the $1^{st}$ access eNB 600 may identify that the $2^{nd}$ access module is in the deactivation state, based on pre-stored state information for the $2^{nd}$ access module of the UE 620.

Thereafter, in operation 805, the $1^{st}$ access eNB 600 transmits a signal for instructing activation of the $2^{nd}$ access module to the UE 620 via a $1^{st}$ access link. According to the embodiment of the present disclosure, if the $1^{st}$ access eNB 600 is an LTE system of a licensed band, the $1^{st}$ access eNB 600 may instruct the UE 620 to activate the $2^{nd}$ access module by using an RRC reconfiguration message. According to another embodiment of the present disclosure, if the $1^{st}$ access eNB 600 is the LTE system of the licensed band, the $1^{st}$ access eNB 600 may instruct the UE 620 to activate the $2^{nd}$ access module by using an MAC CE signal for controlling an activation state of an S cell. According to another embodiment of the present disclosure, if the $1^{st}$ access eNB 600 is the LTE system of the licensed band, the $1^{st}$ access eNB 600 may instruct the UE 620 to activate the $2^{nd}$ access module by using a PDCCH. In the aforementioned embodiments of the present disclosure, since the RRC reconfiguration message, the MAC CE, and the PDCCH have different transmission rates or transmission delays, any one of the RRC reconfiguration message, the MAC CE, and the PDCCH may be selected based on how quickly the $2^{nd}$ access module of the UE 620 must be activated.

In operation 807, the $1^{st}$ access eNB 600 stores the state information for the $2^{nd}$ access module of the UE 620 by changing its state to an activation state. The $1^{st}$ access eNB 600 instructs the $2^{nd}$ access eNB 610 to transmit a short beacon in operation 809, and transmits downlink data to the $2^{nd}$ access eNB 610 in operation 811. According to the embodiment of the present disclosure, an order of performing operations 805 to 811 may be changed depending on a design rule.

The UE 620 receives the signal for instructing activation of the $2^{nd}$ access module via the $1^{st}$ access module, and in operation 821, activates the $2^{nd}$ access module.

The $2^{nd}$ access eNB 610 transmits the short beacon in operation 813 according to the short beacon transmission instruction received from the $1^{st}$ access eNB 600. Thereafter, in operation 815, the $2^{nd}$ access eNB 610 transmits the downlink data to the UE 620 via a $2^{nd}$ access link. As shown in FIG. 8D, a short beacon 852 is not transmitted at a time of transmitting a periodically repeated beacon 850 but is transmitted at a time point between beacon transmission periods. This is for allowing the UE 620 to receive a $2^{nd}$ access module activation signal via the $1^{st}$ access module, to activate the $2^{nd}$ access module, thereafter to receive the short beacon 852 instead of waiting until a next beacon reception duration, and thereafter to immediately receive downlink data. As shown in FIG. 8E, the short beacon may be configured by including only some pieces of information required by the UE 620 to receive downlink data among a plurality of pieces of information included in a well-known beacon signal. A configuration for the short beacon will be described below with reference to FIGS. 8F to 8H.

Accordingly, the UE 620 may receive the downlink data transmitted from the $2^{nd}$ access eNB 610 via the $2^{nd}$ access module. According to the embodiment of the present disclosure, the UE 620 of which the $2^{nd}$ access module is activated may acquire additional information required to receive downlink data by receiving the short beacon 852 in operation 813, and thus may receive the downlink data via the $2^{nd}$ access module in operation 815 without having to wait until a next beacon transmission time. Therefore, a wake-up delay of the UE 620 can be decreased.

According to another embodiment of the present disclosure, operations 809 and 811 may be skipped, and the $1^{st}$ access eNB 600 may transmit additional information included in the $2^{nd}$ access module activation instruction signal to be transmitted to the UE 620. The additional information may be information regarding downlink data to be transmitted via the $2^{nd}$ access eNB 610.

In addition, although not shown in FIG. 8A, the UE 620 may activate the $2^{nd}$ access module, and thereafter may transmit a response signal for the signal for instructing activation of the $2^{nd}$ access module to the $1^{st}$ access eNB 600. According to the embodiment of the present disclosure, the UE 620 may transmit the response signal to the $1^{st}$ access eNB 600 via the $1^{st}$ access link. According to another embodiment of the present disclosure, the UE 620 may transmit the response signal to the $2^{nd}$ access eNB 610 via the $2^{nd}$ access link. In this case, the $2^{nd}$ access eNB 610 may deliver the response signal to the $1^{st}$ access eNB 600.

In addition, the $1^{st}$ access eNB 600 may transmit the state information for the $2^{nd}$ access module of the UE 620 to the $2^{nd}$ access eNB 610. For example, whenever the state information for the $2^{nd}$ access module of the UE 620 is changed, the $1^{st}$ access eNB 600 may transmit the changed state information to the $2^{nd}$ access eNB 610. For another example, the $1^{st}$ access eNB 600 may periodically transmit the state information for the $2^{nd}$ access module of the UE 620.

FIG. 8B illustrates a signal flow for activating a $2^{nd}$ access module of a UE according to an embodiment of the present disclosure.

FIG. 8D illustrates a time of transmitting a beacon signal of a $2^{nd}$ access eNB and receiving a beacon signal of a UE according to an embodiment of the present disclosure.

FIG. 8E illustrates a frame structure of a typical beacon signal according to another embodiment of the present disclosure.

Referring to FIGS. 8B, 8D, and 8E, a UE 620 may activate only a $1^{st}$ access module in operation 820. For example, a $2^{nd}$ access module may be deactivated. In this case, a $2^{nd}$ access eNB 611 and a $2^{nd}$ access eNB 612 may transmit a beacon in a beacon transmission period in operation 822. However, since only the $1^{st}$ access module is in an activation state, the UE 620 cannot receive the beacon signal of the $2^{nd}$ access eNB 611 and the $2^{nd}$ access eNB 612.

Meanwhile, in operation 824, a $1^{st}$ access eNB 600 detects traffic for the $2^{nd}$ access system. For example, the $1^{st}$ access eNB 600 receives downlink traffic to be transmitted to the $2^{nd}$ access eNB 611 or to the UE 620 via the $2^{nd}$ access eNB 611 from a higher network node. The $1^{st}$ access eNB 600 identifies that the $2^{nd}$ access module of the UE 620 is in a deactivation state, and in operation 826, transmits a $2^{nd}$ access module activation instruction signal to the UE 620. For example, based on pre-stored state information for the $2^{nd}$ access module of the UE 620, the $1^{st}$ access eNB 600 may identify that the $2^{nd}$ access module is in the deactivation state. According to the embodiment of the present disclosure, the $2^{nd}$ access module activation instruction signal may include beacon option information and uplink resource allocation information. The beacon option information may indicate a type of a beacon signal transmitted by the $2^{nd}$ access eNB 611 or 612. In other words, the beacon option information may indicate whether a short beacon signal is transmitted by the $2^{nd}$ access eNB 611 or 612. For example, if the beacon option information is "0", it may indicate that the short beacon signal is not transmitted by the $2^{nd}$ access eNB 611 or 612, and if the beacon option information is "1", it may indicate that the short beacon signal is transmitted by the $2^{nd}$ access eNB 611 or 612. Further, the uplink resource allocation information may indicate information of uplink resources allocated to transmit an activation response signal of the UE 620. Herein, the activation response signal implies a signal for informing the $1^{st}$ access eNB of whether the UE 620 has received the beacon signal of the $2^{nd}$ access eNB. Further, without an additional scheduling request (SR) of the UE, uplink resources allocation is performed for a beacon reception response. This uplink resource allocation may vary depending on whether a short beacon is transmitted. For example, if the beacon option information is "0", since the UE responds to whether a beacon is received via a $1^{st}$ access uplink after periodic beacon reception is achieved, the $1^{st}$ access eNB allocates an uplink resource to the UE after a next periodic beacon. Otherwise, if the beacon option information is "1", it is adjusted such that an uplink resource is allocated after a short beacon. It is assumed in FIG. 8B that the $1^{st}$ access eNB 600 transmits a $2^{nd}$ access module activation response signal including "beacon option=1" as the beacon option information. In addition, the $2^{nd}$ access module activation response signal in operation 826 may be transmitted based on any one of an RRC reconfiguration message, an MAC CE, and a PDCCH.

In operation 830, the $1^{st}$ access eNB 600 transmits downlink data to the $2^{nd}$ access eNB 611 to which the UE 620 has access. In operation 832, the $2^{nd}$ access eNB 611 buffers downlink data received for the UE 620 from the $1^{st}$ access eNB 600.

The UE 620 receives a $2^{nd}$ access module activation instruction signal via the $1^{st}$ access module, and in operation 828, activates the $2^{nd}$ access module. Thereafter, in operation 834, the UE 620 transmits a $2^{nd}$ access module activation response signal to the $2^{nd}$ access eNB 611 via the $2^{nd}$ access module. In operation 836, the UE 620 may drive a short beacon reception (SBR) timer for receiving a short beacon signal. According to a design rule, operations 834 and 836 may be performed simultaneously, or operation 834 may be performed after operation 836 is performed.

Upon receiving the $2^{nd}$ access module activation response signal from the UE 620 in a state where the downlink data for the UE 620 is buffered, in operation 838, the $2^{nd}$ access eNB 611 may recognize that the short beacon signal must be transmitted immediately. Thereafter, in operation 840, the $2^{nd}$ access eNB 611 may transmit the short beacon signal, and may transmit the buffered downlink data. Herein, the downlink data may be transmitted together with the short beacon, or may be transmitted immediately after the short beacon is transmitted. Further, as shown in FIG. 8E, the short beacon may be configured by including only some pieces of information required by the UE 620 to receive the downlink data among a plurality of TIM information included in the well-known beacon signal. A configuration for the short beacon will be described below with reference to FIGS. 8F to 8H.

Meanwhile, before an SBR timer expires, the UE 620 may receive the short beacon signal via the $2^{nd}$ access module, and may receive downlink data. According to the embodiment of the present disclosure, the UE 620 of which the $2^{nd}$ access module is activated may acquire additional information required to receive downlink data by receiving a short beacon, and thus may receive downlink data from the $2^{nd}$ access eNB 611 without having to wait until a next beacon transmission time. The UE 620 receives the short beacon from the $2^{nd}$ access eNB 611, and if the SBR timer expires in operation 842, may transmit an activation response signal to the $1^{st}$ access eNB 600 in operation 844. According to a design rule, the UE 620 may transmit the activation response signal to the $1^{st}$ access eNB 600 before the SBR timer expires. According to the embodiment of the present disclosure, the activation response signal may include information for indicating whether an eNB change is necessary. For example, if the short beacon is received via the $2^{nd}$ access module before the SBR timer expires, the UE 620 may transmit information "AP change=0" for indicating that an AP change is not necessary since it is a situation in which signal reception from an AP is possible. For another example, although not shown, if the short beacon is not received via the $2^{nd}$ access module before the timer expires, the UE 620 may transmit information "AP change=1" for indicating that the AP change is necessary since it is a situation in which signal reception from the AP is impossible. A case where the AP change of the UE 620 is necessary will be described below with reference to FIG. 9.

Referring to FIG. 8B described above, the UE 620 may determine a $2^{nd}$ access module activation time based on the beacon option information included in the $2^{nd}$ access module activation instruction signal.

FIG. 8C illustrates a UE operation and uplink resource allocation based on beacon option information included in a $2^{nd}$ access module activation signal according to an embodiment of the present disclosure.

Referring to FIG. 8C, if the beacon option information included in the $2^{nd}$ access module activation instruction signal is "0", the UE 620 may activate the $2^{nd}$ access module by waiting until a pre-set beacon transmission time, and may receive a beacon based on the method of the related art via the activated $2^{nd}$ access module. In this case, uplink resource allocation information included in the $2^{nd}$ access module activation instruction signal may include information regarding a resource after a beacon reception time based on the method of the related art. Further, if the beacon option information included in the $2^{nd}$ access module activation instruction signal is "1", the UE 620 may activate the $2^{nd}$ access module immediately after the $2^{nd}$ access module activation instruction signal is received, and may receive the short beacon via the activated $2^{nd}$ access module. In this case, the uplink resource allocation information included in the $2^{nd}$ access module activation instruction signal may include information regarding the resource after the short beacon reception time.

Figure 8F:
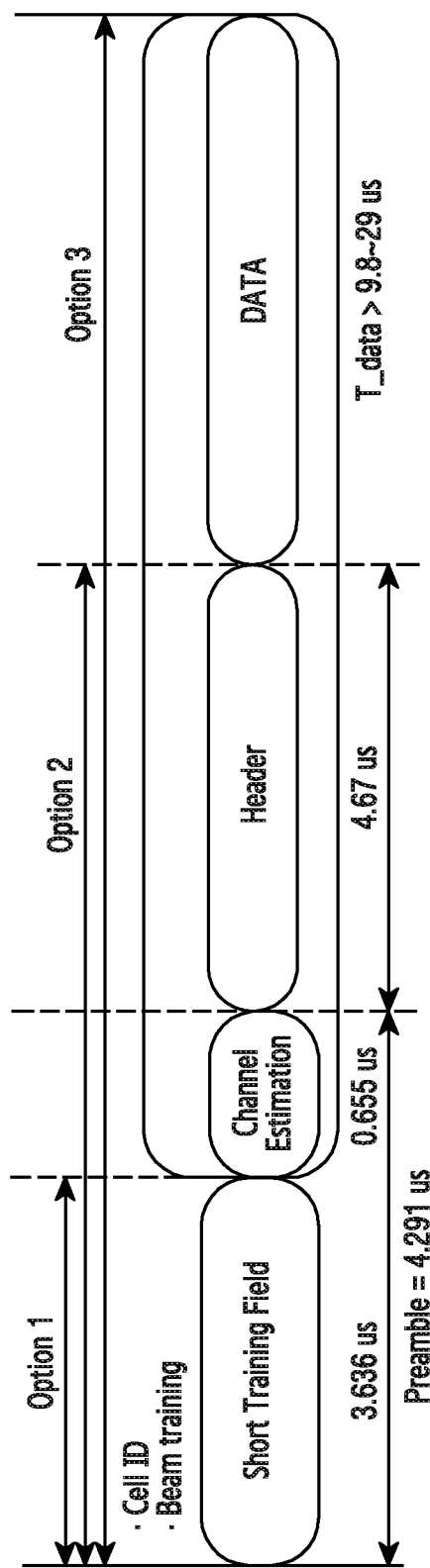
FIG. 8F illustrates a frame structure of a short beacon signal according to an embodiment of the present disclosure.

FIG. 8F illustrates a frame structure of a short beacon signal according to an embodiment of the present disclosure.

FIG. 8G illustrates information included in a short beacon signal according to an embodiment of the present disclosure.

FIG. 8H illustrates information included in a short beacon signal based on a frame structure of a short beacon signal according to an embodiment of the present disclosure.

Referring to FIGS. 8F, 8G, and 8H, the frame structure of the short beacon signal may include at least one of a short training field, a field for channel estimation, a header, and data. For example, it may be effective to configure the short beacon signal with a size less than 88 bits, i.e., a size of a control physical header. As illustrated, the short beacon signal may be configured by using the following three methods.

According to a first method, the short beacon signal may include only a short training field. In this case, as shown in FIG. 8H, the short beacon signal may be configured with a minimum length of 3.636 us, and the short beacon signal does not include additional information.

According to a second method, the short beacon signal may include a short training field, a field for channel estimation, and a header. In this case, the header of the short beacon signal may include beamforming related information and a partial physical cell identifier (PCID). For example, as shown in FIG. 8G, the header of the short beacon signal may include direction information, beam identifier information, antenna identifier information, and partial PCID information. Herein, the direction information may include uplink and downlink transmission recognition information and information for recognizing a compressed beacon and a best beam feedback, and the beam identifier information may include transmission beam ID information of an AP. Further, the antenna identifier information may include antenna ID information, and the partial PCID may include a sequence of the short training field. According to a design rule, the short beacon signal may include only one header, or may include two headers. As illustrated, the direction information, the beam identifier information, the antenna identifier information, and the partial PCID information may consist of 14 bits in total. A control physical layer header may include 88-bit information, and in this case, the existing physical layer header consists of 40 bits, and the remaining 48 bits are reserved bits. Therefore, among the 48-bit reserved bits according to the embodiment of the present disclosure, 14-bit information can be additionally used. If the short beacon signal includes one header, a length of the short beacon signal is 8.93 us, and may be 88 bits in total. On the other hand, if the short beacon signal includes two headers, the length of the short beacon signal is 13.69 us, and may be 176 bits in total.

According to a third method, the short beacon signal may include a short training field, a field for channel estimation, a header, and data. In this case, the header of the short beacon field may include information as shown in FIG. 8G. Further, in this case, the data may include only a 14-byte MAC header, or may include a 14-byte MAC header and 10-byte data, or may include a 14-byte MAC header and 86-byte data.

Figure 8I:
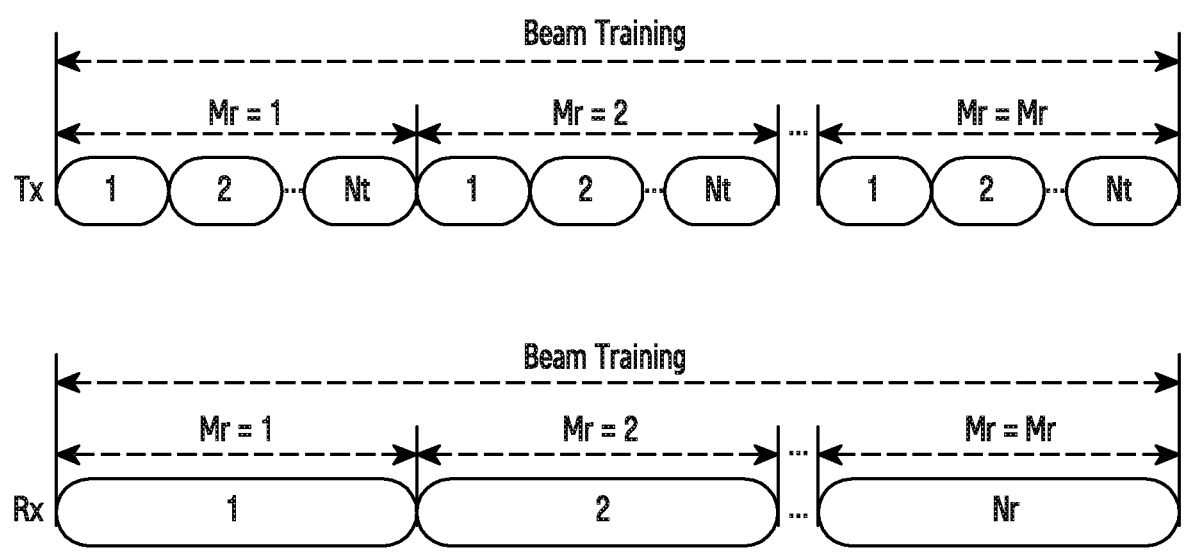
FIG. 8I illustrates beam training using a short beacon signal according to an embodiment of the present disclosure.

FIG. 8I illustrates beam training using a short beacon signal according to an embodiment of the present disclosure.

Referring to FIG. 8I, when the beam training is performed using the short beacon signal, the short beacon signal may be transmitted/received repetitively by the number of transmit antenna beams of an AP and the number of receive antenna beams of a UE. Since the short beacon signal may be configured to be significantly shorter than a legacy beacon signal, not only a beam training time can be decreased but also an overhead caused by the beam training can be decreased.

Figure 9:
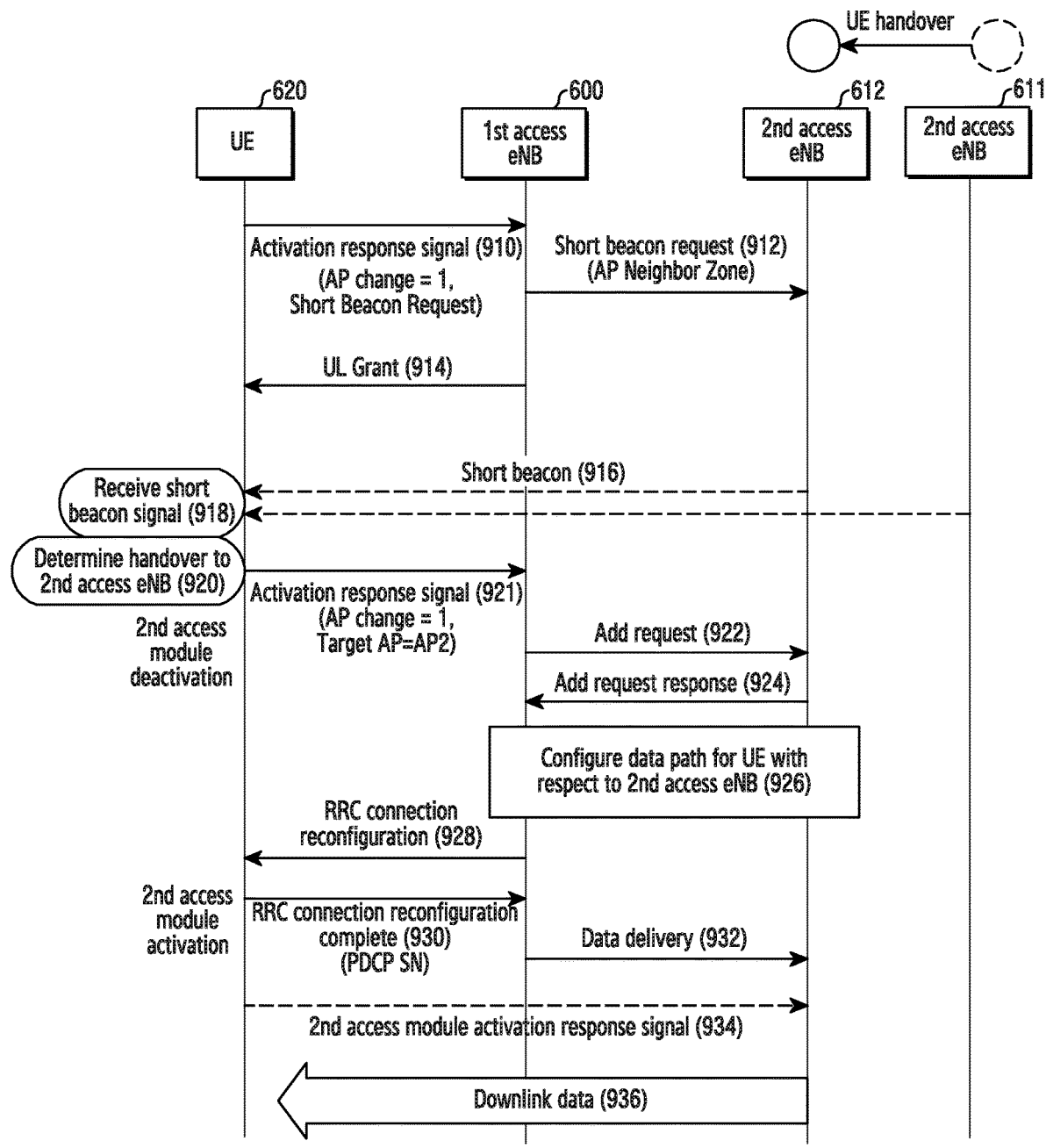
FIG. 9 illustrates a signal flow for a case where an eNB for a $2^{nd}$ access module of a UE is changed according to an embodiment of the present disclosure.

FIG. 9 illustrates a signal flow for a case where an eNB for a $2^{nd}$ access module of a UE is changed according to an embodiment of the present disclosure.

It is assumed in FIG. 9 that a UE 620 fails to receive a short beacon signal from a $2^{nd}$ access eNB 611 before an SBR timer expires in the aforementioned situation of FIG. 8B. Further, it is assumed in FIG. 9 that the UE 620 detects a situation in which signal reception from the $2^{nd}$ access eNB 611 is impossible during downlink data is received from the $2^{nd}$ access eNB 611. For example, it is assumed that the situation in which the signal reception from the $2^{nd}$ access eNB 611 is impossible is detected due to a movement of the UE 620 or a change in a channel state with respect to the $2^{nd}$ access eNB 611. Herein, a $1^{st}$ access module for transmitting/receiving a signal to/from a $1^{st}$ access eNB 600 may be persistently kept in an activation state.

Referring to FIG. 9, in operation 910, the UE 620 may transmit an activation response signal to the $1^{st}$ access eNB 600. The activation response signal may include information for indicating whether an eNB change is necessary and short beacon request information. For example, the UE 620 fails to receive a short beacon via a $2^{nd}$ access module before an SBR time expires, and thus may determine that it is a situation in which an AP change is necessary and may transmit the activation response signal which includes information "AP change=1" for indicating that the AP change is necessary and which includes information for requesting for the short beacon signal. For another example, the UE 620 may determine that it is a situation in which additional signal reception is impossible via the $2^{nd}$ access eNB 611, and may transmit the activation response signal including the information "AP change=1" for indicating that the AP change is necessary and the information for requesting for the short beacon signal. According to a design rule, the UE 620 may deactivate the $2^{nd}$ access module if the SBR timer expires in a state where the short beacon signal is not received. Further, irrespective of the SBR timer, the UE 620 may deactivate the $2^{nd}$ access module by using an additional timer for determining a time of deactivating the $2^{nd}$ access module at a time when the $2^{nd}$ access module is activated. For example, after running the additional timer at the time when the $2^{nd}$ access module is activated, the UE 620 may deactivate the $2^{nd}$ access module if the additional timer expires in a state where downlink signal is not detected via the $2^{nd}$ access module.

In response to the activation response signal received from the UE 620, in operation 912, the $1^{st}$ access eNB 600 transmits a short beacon request signal to the $2^{nd}$ access eNB 611 and a $2^{nd}$ access eNB 612. Herein, the short beacon request signal may be transmitted to the $2^{nd}$ access eNB 611 and/or at least one $2^{nd}$ access eNB neighboring to the $2^{nd}$ access eNB 611. The $1^{st}$ access eNB 600 may select at least one $2^{nd}$ access eNB for transmitting the short beacon request signal, based on a pre-registered $2^{nd}$ access eNB list. The $2^{nd}$ access eNB list may include location information of each $2^{nd}$ access eNB and/or information of a $2^{nd}$ access eNB neighboring to each $2^{nd}$ access eNB. Further, the $1^{st}$ access eNB 600 may select at least one $2^{nd}$ access eNB for transmitting the short beacon request signal, based on a location of the UE 620.

In operation 914, the $1^{st}$ access eNB 600 retransmits an uplink resource allocation signal for transmitting an activation response signal of the UE 620. Herein, upon receiving the uplink resource allocation signal from the $1^{st}$ access eNB 600 via the $1^{st}$ access module, the UE 620 may activate the $2^{nd}$ access module.

In operation 916, the $2^{nd}$ access eNB 611 and the $2^{nd}$ access eNB 612 transmit the short beacon signal. The $2^{nd}$ access eNB 611 and the $2^{nd}$ access eNB 612 may transmit the short beacon signal immediately after the short beacon request signal is received, or may transmit the short beacon signal based on a short beacon signal transmission time included in the short beacon request signal. If the $2^{nd}$ access eNB 611 or the $2^{nd}$ access eNB 612 does not support short beacon signal transmission, a corresponding $2^{nd}$ access eNB may transmit a legacy beacon signal at a pre-set beacon signal transmission time.

In operation 918, the UE 620 receives a short beacon (and/or a beacon signal) via the $2^{nd}$ access module. Herein, to describe a case where the UE 620 changes the AP, it is assumed a case where the UE 620 fails to receive the short beacon signal from the $2^{nd}$ access eNB 611 and receives the beacon signal from the $2^{nd}$ access eNB 612. Further, it is assumed a case where the UE 620 receives the short beacon signal from the $2^{nd}$ access eNB 611 and the $2^{nd}$ access eNB 612, but reception strength of the short beacon signal from the $2^{nd}$ access eNB 611 is less than a threshold and reception strength of the short beacon signal from the $2^{nd}$ access eNB 612 is greater than or equal to the threshold. In operation 920, the UE 620 determines a handover to the $2^{nd}$ access eNB 612, based on a result of receiving the short beacon signal. In operation 921, the UE 620 transmits an activation response signal to the $1^{st}$ access eNB 600. In this case, the activation response signal may include information for indicating that an AP change is necessary and identification information for a target AP. For example, the activation response signal may include "AP change=1" for indicating that the AP change is necessary and "target AP=AP2" for indicating the identification information for the target AP. Herein, after transmitting the activation response signal, the UE 620 may deactivate the $2^{nd}$ access module.

The $1^{st}$ access eNB 600 identifies the target $2^{nd}$ access eNB 611 to which the UE 620 intends to be handed over from the activation response signal received from the UE 620, and in operation 922, transmits an add request signal to the $2^{nd}$ access eNB 612. The add request signal may include information regarding the UE 620. In operation 924, the $2^{nd}$ access eNB 612 transmits an add request acknowledgment (ACK) signal to the $1^{st}$ access eNB 600. Herein, the $2^{nd}$ access eNB 612 may transmit the add request ACK signal by considering a load depending on the number of UEs currently having access thereto. Thereafter, in operation 926, the $1^{st}$ access eNB 600 and the $2^{nd}$ access eNB 612 configure a data path for the UE 620.

In operation 928, the $1^{st}$ access eNB 600 transmits a radio resource control connection reconfiguration signal to the UE 620. In operation 930, the UE 620 transmits a radio resource control connection reconfiguration complete signal to the $1^{st}$ access eNB 600. Herein, upon receiving downlink data from the $2^{nd}$ access eNB 611 to which the UE 620 previously has access, information (e.g., packet data convergence protocol (PDCP) sequence number (SN)) for last received downlink data may be transmitted to the $1^{st}$ access eNB 600.

Upon receiving the radio resource control connection reconfiguration complete signal, in operation 932, the $1^{st}$ access eNB 600 transmits downlink data for the UE 620 to the $2^{nd}$ access eNB 612. Upon receiving the PDCP SN for the last downlink data from the UE 620, the $1^{st}$ access eNB 600 may deliver downlink data subsequent to the PDCP SN to the $2^{nd}$ access eNB 612.

Meanwhile, after transmitting the radio resource control connection reconfiguration complete signal to the $1^{st}$ access eNB 600, the UE 620 may activate the $2^{nd}$ access module, and in operation 934, may transmit to the $2^{nd}$ access eNB 612 a $2^{nd}$ access module activation response signal for indicating that the $2^{nd}$ access module is activated. According to a design rule, after activating the $2^{nd}$ access module, the UE 620 may not transmit the $2^{nd}$ access module activation response signal.

Thereafter, in operation 936, the UE 620 may receive downlink data from the $2^{nd}$ access eNB 612.

Figure 10A:
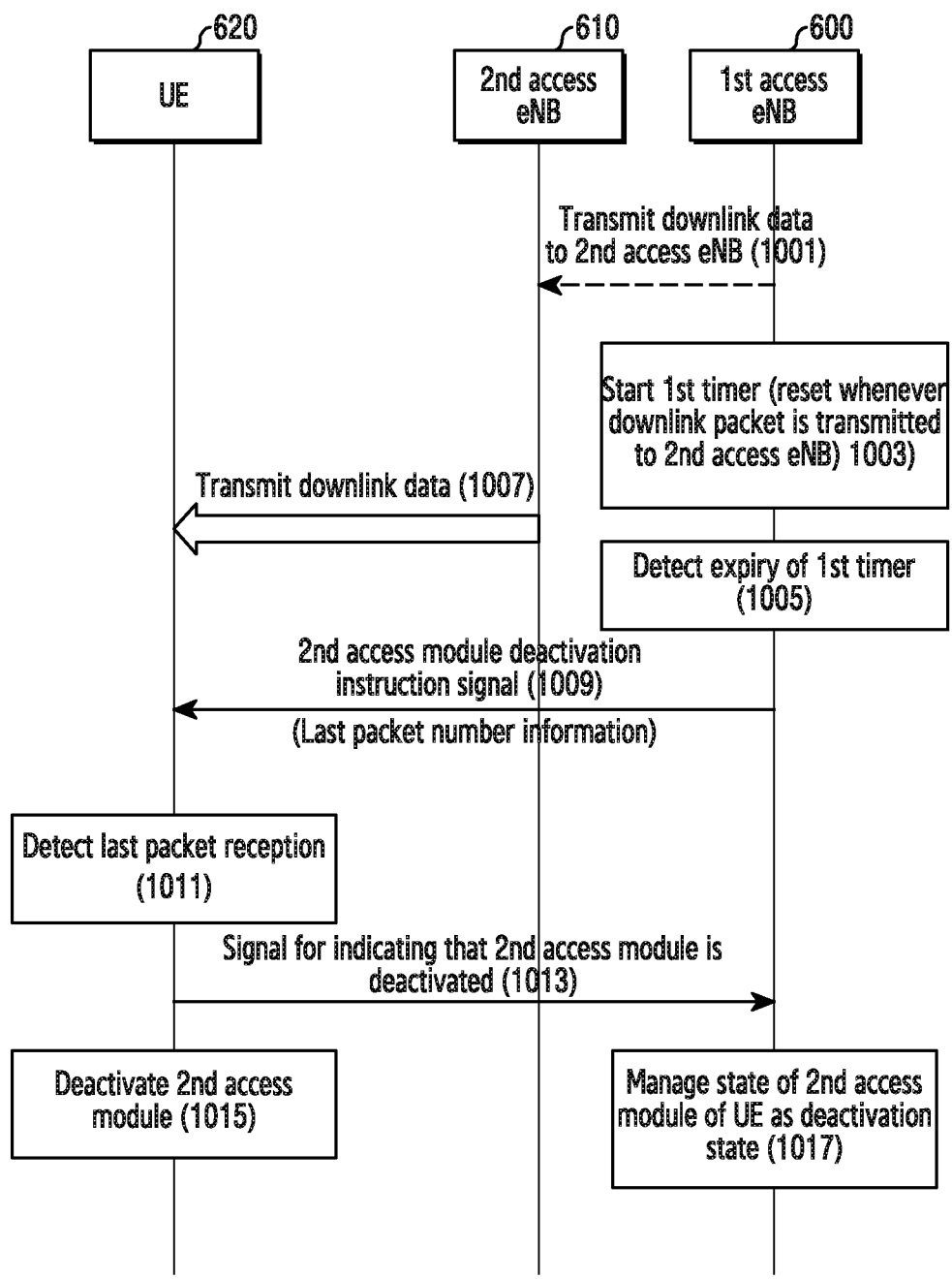
FIG. 10A illustrates a signal flow for deactivating a $2^{nd}$ access module of a UE based on control transmission of a $1^{st}$ access eNB according to an embodiment of the present disclosure.

FIG. 10A illustrates a signal flow for deactivating a $2^{nd}$ access module of a UE based on control transmission of a $1^{st}$ access eNB according to an embodiment of the present disclosure. It is assumed herein that the $2^{nd}$ access module of the UE is in an activation state.

Referring to FIG. 10A, in operation 1001, a $1^{st}$ access eNB 600 transmits downlink data for a UE 620 to a $2^{nd}$ access eNB 610. For example, the $1^{st}$ access eNB 600 may recognize that a $2^{nd}$ access module of the UE 620 is in an activation state, and may transmit the downlink data for the UE 620 to the $2^{nd}$ access eNB 610.

In operation 1003, the $1^{st}$ access eNB 600 measures a pre-set time by starting a $1^{st}$ timer at a time when downlink data is transmitted. If downlink data to be transmitted to the UE 620 via the $2^{nd}$ access eNB 610 is additionally detected before the $1^{st}$ timer expires or before a pre-set time elapses, returning to operation 1001, the $1^{st}$ access eNB 600 transmits downlink data for the UE 620 to the $2^{nd}$ access eNB 610. In this case, the $1^{st}$ timer is reset at a time when the additionally detected downlink data is transmitted, and thus the pre-set time is measured again. According to the embodiment of the present disclosure, a set time of the $1^{st}$ timer may be determined according to a type of a $2^{nd}$ access module activation signal. For example, the set time of the $1^{st}$ timer may be determined by considering which one is used to transmit a $2^{nd}$ access module activation instruction among an RRC reconfiguration message, an MAC CE, and a PDCCH.

In operation 1007, the $2^{nd}$ access eNB 610 transmits to the UE 620 the downlink data received from the $1^{st}$ access eNB 600.

Meanwhile, in operation 1005, the $1^{st}$ access eNB 600 may detect an expiry of the $1^{st}$ timer. If the $1^{st}$ timer expires since additional downlink data is not detected within a pre-set time from the time when the downlink data for the UE 620 is transmitted to the $2^{nd}$ access eNB 160, the $1^{st}$ access eNB 600 may determine that last downlink data is transmitted.

In operation 1009, the $1^{st}$ access eNB 600 transmits a signal for instructing deactivation of the $2^{nd}$ access module to the UE 620 via a $1^{st}$ access link. According to the embodiment of the present disclosure, the signal for instructing deactivation of the $2^{nd}$ access module may include a sequence number for a last downlink packet transmitted by the $1^{st}$ access eNB 600 to the $2^{nd}$ access eNB 610. Further, the signal for instructing deactivation of the $2^{nd}$ access module may include a PDCP SN of the last downlink packet for the UE 620. For example, the signal for instructing deactivation of the $2^{nd}$ access module may include a PDCP SN of a last downlink packet to be received by the UE 620.

Further, according to the embodiment of the present disclosure, the $1^{st}$ access eNB 600 may instruct deactivation of the $2^{nd}$ access module by using a probe request signal.

The UE 620 may receive the signal for instructing deactivation of the $2^{nd}$ access module via the $1^{st}$ access link, and in operation 1011, may acquire a sequence number for a last packet from the $2^{nd}$ access module deactivation instruction signal. The UE 620 may detect that the last packet is received based on the sequence number for the last packet acquired in operation 1011. For example, based on the sequence number acquired from the $2^{nd}$ access eNB 610, the UE 620 may determine that all plackets are received including up to the last downlink data packet. According to the embodiment of the present disclosure, if the sequence number for the last packet is not included in the $2^{nd}$ access module deactivation instruction signal, operation 1011 may be skipped. Further, the UE 620 may acquire a PDCP SN of the last downlink packet from the signal for instructing deactivation of the $2^{nd}$ access module, and may determine that all packets are received including up to the last downlink data packet based on the acquired PDCP SN.

The UE 620 transmits to the $1^{st}$ access eNB 600 a signal for indicating that the $2^{nd}$ access module is deactivated in operation 1013, and deactivate the $2^{nd}$ access module in operation 1015. According to the embodiment of the present disclosure, the UE 620 may indicate that the $2^{nd}$ access module is deactivated by using a probe request signal. According to another embodiment of the present disclosure, the UE 620 may indicate that the $2^{nd}$ access module is deactivated by using a PDCP feedback signal for indicating a sequence number of a received last packet. According to another embodiment of the present disclosure, the UE 620 may not transmit the signal for indicating that the $2^{nd}$ access module is deactivated.

Upon receiving the signal for indicating that the $2^{nd}$ access module is deactivated, in operation 1017, the $1^{st}$ access eNB 600 stores the state information for the $2^{nd}$ access module of the UE 620 by changing its state to a deactivation state. According to another embodiment of the present disclosure, the signal for indicating that the $2^{nd}$ access module is deactivated may not be received from the UE 620. In this case, the $1^{st}$ access eNB 600 may determine whether the UE 620 receives a last packet based on an automatic repeat request (ARQ) response signal for a downlink data packet received from the UE 620, and may store the state information for the $2^{nd}$ access module of the UE 620 by changing its state to the deactivation state. Herein, the ARQ response signal may be received directly from the UE 620 via the $1^{st}$ access link or may be received via the $2^{nd}$ access eNB 610.

In various embodiments of the present disclosure, when the UE 620 deactivates the $2^{nd}$ access module, it implies that the $2^{nd}$ access module is changed to a sleep mode and is kept persistently in the sleep mode. For example, when the $2^{nd}$ access module is in the deactivation state, the UE 620 does not perform an operation of monitoring a presence of downlink traffic for the $2^{nd}$ access link until the $2^{nd}$ access module activation instruction signal is received.

The UE 620 according to the embodiment of the present disclosure may perform any one of the following operations 1 to 3 to deactivate the $2^{nd}$ access module.

Operation 1: If the $2^{nd}$ access eNB 610 is an eNB of a licensed band LTE system, the UE 620 may prohibit to perform a periodic on-duration operation of an RRC connected state performed generally in a state where the $2^{nd}$ access module is connected to the $2^{nd}$ access system, and may allow the $2^{nd}$ access module to immediately transition to an RRC idle state. For example, according to an LTE standard, the UE 620 in the RRC connected state must periodically monitor a PDCCH based on a long discontinuous reception (DRX) or a short DRX via the $2^{nd}$ access module. However, according to the embodiment of the present disclosure, the UE 620 in the RRC connected state may prohibit the $2^{nd}$ access module to periodically monitor the PDCCH based on the long DRX or the short DRX, and may control it to transition to the idle state.

Operation 2: If the $2^{nd}$ access eNB 610 is an eNB in a licensed band LTE system, the UE 620 sets a period for an on-duration in the existing RRC connected state to be much longer, and operates in an RRC mediate state for avoiding a loss of UE context while decreasing an overhead caused by monitoring of a random access channel (RACH), paging, and the like, for synchronization. For example, if the UE 620 operates in the RRC idle state for longer than a specific time, a warming-up time is increased when transitioning from the sleep status to the activation state due to the loss of the UE context. However, since the context is maintained in the embodiment of the present disclosure, the warming-up time can be prevented from being increased.

Operation 3: If the $2^{nd}$ access eNB 610 is an AP of an unlicensed band WLAN system, the UE 620 may prohibit the $2^{nd}$ access module to perform a periodic on-duration operation for receiving a beacon according to a PSM mechanism.

Referring to FIG. 10A described above, it is described that, if a PDCP SN of a last downlink packet for the UE 620 is included in the $2^{nd}$ access module deactivation instruction signal, the UE 620 determines whether to receive the last downlink packet reception based on the PDCP SN, and transmits the signal for indicating that the $2^{nd}$ access module is deactivated by including the PDCP SN of the last downlink packet received by the UE 620.

However, the UE 620 and the $1^{st}$ access eNB 600 may operate based on any one scenario among four types of scenarios as shown in FIG. 10B according to various embodiments of the present disclosure. For example, it is described under the assumption that the $2^{nd}$ access module deactivation instruction signal is a WLAN sleep request signal, and the signal for indicating that $2^{nd}$ access module is deactivated is a WLAN sleep response signal.

According to a first scenario as shown in FIG. 10B, the $1^{st}$ access eNB 600 transmits to the UE 620 a WLAN sleep request signal not including PDCP SN information of the last downlink packet to be received by the UE 620. The UE 620 does not know information regarding the last downlink packet, and thus may deactivate the $2^{nd}$ access module immediately after the WLAN sleep request signal is received. Thereafter, the UE 620 transmits a WLAN sleep response signal to the $1^{st}$ access eNB 600. In this case, the WLAN sleep response signal does not include the PDCP SN information of the last downlink packet. Therefore, the $1^{st}$ access eNB 600 and the UE 620 cannot recognize a difference between the PDCP SN of the last downlink packet to be received by the UE 620 and a PDCP SN of a last downlink packet actually received by the UE 620, which may result in a packet loss.

According to a second scenario, the $1^{st}$ access eNB 600 transmits to the UE 620 the WLAN sleep request signal not including the PDCP SN information of the last downlink packet to be received by the UE 620. The UE 620 does not know information regarding the last downlink packet, and thus may deactivate the $2^{nd}$ access module immediately after the WLAN sleep request signal is received. Thereafter, the UE 620 transmits a WLAN sleep response signal to the $1^{st}$ access eNB 600. In this case, the WLAN sleep response signal may include the PDCP SN information of the downlink packet last received by the UE 620. Therefore, the $1^{st}$ access eNB 600 may recognize the difference between the PDCP SN of the last downlink packet to be received by the UE 620 and a PDCP SN of a last downlink packet actually received by the UE 620. If it is determined that the UE 620 has failed to receive up to the last downlink packet as a result of comparing the PDCP SN of the last downlink packet to be received by the UE 620 and the PDCP SN of the last downlink packet actually received by the UE 620, the $1^{st}$ access eNB 600 may transmit downlink packets, which are not received by the UE 620, to the UE 620 via the $1^{st}$ access link. Therefore, the UE 620 may receive downlink data, which has a PDCP SN greater than the PDCP SN transmitted to the $1^{st}$ access eNB, via the $1^{st}$ access link.

According to a third scenario, the $1^{st}$ access eNB 600 transmits to the UE 620 the WLAN sleep request signal including the PDCP SN information of the last downlink packet to be received by the UE 620. Therefore, the UE 620 can know information regarding the last downlink packet, and thus keeps an activation state of the $2^{nd}$ access module until the last downlink packet is received, and deactivates the $2^{nd}$ access module when the last downlink packet is received. Thereafter, the UE 620 may not transmit a response signal to the $1^{st}$ access eNB 600. For example, according to the third scenario, the UE 620 may recognize a difference between a PDCP SN of a last downlink packet to be received and a PDCP SN of a received downlink packet. Thereafter, the UE 620 may receive up to the last downlink packet based on the PDCP SN included in the WLAN sleep request signal, and may deactivate the $2^{nd}$ access module after detecting that up to the last downlink packet is received.

According to a fourth scenario, the $1^{st}$ access eNB 600 transmits to the UE 620 the WLAN sleep request signal including the PDCP SN information of the last downlink packet to be received by the UE 620. Therefore, the UE 620 may know information regarding the last downlink packet. In this case, the UE 620 may deactivate the $2^{nd}$ access module after receiving all packets including up to the last downlink packet, and may transmit to the $1^{st}$ access eNB 600 a WLAN sleep response signal including the PDCP SN information of the downlink packet last received by the UE 620. Further, the UE 620 may deactivate the $2^{nd}$ access module immediately when the WLAN sleep request signal is received, and may transmit to the $1^{st}$ access eNB 600 the WLAN sleep response signal including the PDCP SN information of the downlink packet last received by the UE 620. Therefore, the $1^{st}$ access eNB 600 and the UE 620 may recognize the difference between the PDCP SN of the last downlink packet to be received by the UE 620 and a PDCP SN of a last downlink packet actually received by the UE 620. If it is determined that the UE 620 has failed to receive up to the last downlink packet as a result of comparing the PDCP SN of the last downlink packet to be received by the UE 620 and the PDCP SN of the last downlink packet actually received by the UE 620, the $1^{st}$ access eNB 600 may transmit downlink packets, which are not received by the UE 620, to the UE 620 via the $1^{st}$ access link.

Figure 11A:
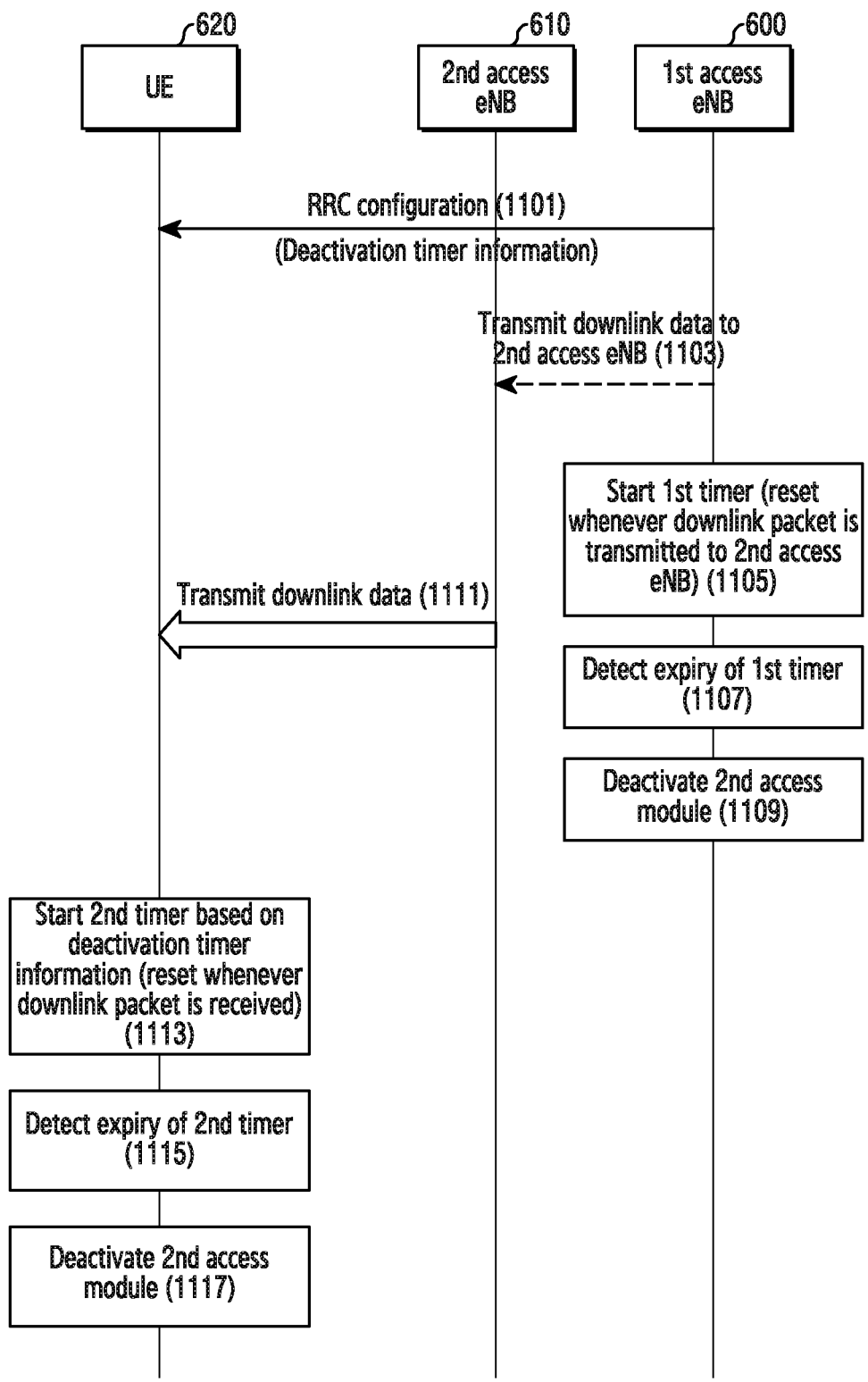
FIG. 11A illustrates a signal flow for deactivating a $2^{nd}$ access module autonomously by a UE based on initial deactivation timer information of the UE according to an embodiment of the present disclosure.

FIG. 11A illustrates a signal flow for deactivating a $2^{nd}$ access module autonomously by a UE based on initial deactivation timer information of the UE according to an embodiment of the present disclosure. It is assumed herein that the $2^{nd}$ access module is in an activation state.

Referring to FIG. 11A, in operation 1101, a $1^{st}$ access eNB 600 may transmit an RRC configuration message including deactivation timer information in an initial setup process for an RRC connection with a UE 620. According to the embodiment of the present disclosure, the deactivation timer information includes time information used to determine whether the $2^{nd}$ access module is deactivated. The deactivation timer information may be determined according to a type of a $2^{nd}$ access module activation signal transmitted by the $1^{st}$ access eNB to the UE 620. For example, time information of a deactivation timer may be determined by considering which one is used to transmit a $2^{nd}$ access module activation instruction among an RRC reconfiguration message, an MAC CE, and a PDCCH.

In operation 1103, the $1^{st}$ access eNB 600 transmits downlink data for the UE 620 to a $2^{nd}$ access eNB 610. For example, the $1^{st}$ access eNB 600 may recognize that the $2^{nd}$ access module of the UE 620 is in an activation state, and may transmit the downlink data for the UE 620 to the $2^{nd}$ access eNB 610.

In operation 1105, the $1^{st}$ access eNB 600 measures a pre-set time by starting a $1^{st}$ timer at a time when downlink data is transmitted. If downlink data to be transmitted to the UE 620 via the $2^{nd}$ access eNB 610 is additionally detected before the $1^{st}$ timer expires or before a pre-set time elapses, returning to operation 1103, the $1^{st}$ access eNB 600 transmits downlink data for the UE 620 to the $2^{nd}$ access eNB 610. In this case, the $1^{st}$ timer is reset at a time when the additionally detected downlink data is transmitted, and thus the pre-set time is measured again. According to the embodiment of the present disclosure, the set time of the $1^{st}$ time may be determined based on deactivation timer information transmitted to the UE 620 in operation 1101. According to the embodiment of the present disclosure, the set time of the $1^{st}$ timer may be equal to or different from time information of the deactivation timer.

In operation 1107, the $1^{st}$ access eNB 600 may detect an expiry of the $1^{st}$ timer. If the $1^{st}$ timer expires since additional downlink data is not detected within a pre-set time from the time when the downlink data for the UE 620 is transmitted to the $2^{nd}$ access eNB 160, the $1^{st}$ access eNB 600 may determine that last downlink data is transmitted. In operation 1109, the $1^{st}$ access eNB 600 stores the state information for the $2^{nd}$ access module by changing its state to a deactivation state.

Meanwhile, in operation 1111, the $2^{nd}$ access eNB 610 transmits to the UE 620 the downlink data received from the $1^{st}$ access eNB 600.

The UE 620 receives downlink data from the $2^{nd}$ access eNB 610 in operation 1111, and starts a $2^{nd}$ timer at a time when downlink data is received in operation 1113, thereby measuring a pre-set time. The $2^{nd}$ timer may be set based on deactivation timer information included in an RRC configuration message. According to the embodiment of the present disclosure, the set time of the $2^{nd}$ timer may be equal to or different from the time information of the deactivation timer.

Further, according to the embodiment of the present disclosure, the set time of the $2^{nd}$ timer may be equal to or different from the set time of the $1^{st}$ timer operated by the $1^{st}$ access eNB 600. The set time of the $2^{nd}$ timer may be set by considering a delivery delay between the $1^{st}$ access eNB 600 and the $2^{nd}$ access eNB 610 and/or a delivery delay between the $2^{nd}$ access eNB 610 and the UE 620. When downlink data is additionally detected by the $2^{nd}$ access module via a $2^{nd}$ access link before the $2^{nd}$ timer expires, that is, before a pre-set time elapses, the UE 620 receives the downlink data. In this case, the $2^{nd}$ timer is reset at a time when the additionally detected downlink data is received, and thus the pre-set time is measured again.

In operation 1115, the UE 620 may detect an expiry of the $2^{nd}$ timer. The UE 620 may determine that last downlink data is received if the $2^{nd}$ timer expires since additional data downlink is not detected within a pre-set time from a time of receiving downlink data via the $2^{nd}$ access link by using the $2^{nd}$ access module. In operation 1117, the UE 620 stores the state information for the $2^{nd}$ access module by changing its state to a deactivation state.

In the aforementioned embodiment of FIGS. 10A and 10B, the $1^{st}$ access eNB 600 transmits deactivation timer information to the UE 620 during an initial connection establishment of the UE 620 and the $1^{st}$ access eNB 600, and thus a deactivation state change time for the $2^{nd}$ access module of the UE 620 is determined by each of the $1^{st}$ access eNB 600 and the UE 620 based on the deactivation timer information. However, in another embodiment of the present disclosure, the $1^{st}$ access eNB 600 may not transmit the deactivation timer information to the UE 600, but the UE 620 may transmit timer information which is pre-set in the UE 620 to the $1^{st}$ access eNB 600. In this case, each of the $1^{st}$ access eNB 600 and the UE 620 may determine the deactivation state change time for the $2^{nd}$ access module of the UE 620. In another embodiment of the present disclosure, the $1^{st}$ access eNB 600 and the UE 620 may not exchange timer information for deactivation of the $2^{nd}$ access module, but may determine the deactivation state change time for the $2^{nd}$ access module of the UE 620 based on timer information which is pre-set in each of the $1^{st}$ access eNB 600 and the UE 620.

In various embodiments of the present disclosure, when the UE 620 deactivates the $2^{nd}$ access module, it implies that the $2^{nd}$ access module is changed to a sleep mode and is kept persistently in the sleep mode. For example, when the $2^{nd}$ access module is in the deactivation state, the UE 620 does not perform an operation of monitoring a presence of downlink traffic for the $2^{nd}$ access link until the $2^{nd}$ access module activation instruction signal is received. According to the embodiment of the present disclosure, the UE 620 may perform any one of the aforementioned operations 1 to 3 to deactivate the $2^{nd}$ access module.

In various embodiments of the present disclosure, there may be a situation in which state information of the $2^{nd}$ access module managed by the $1^{st}$ access eNB 600 is not matched to a state of the $2^{nd}$ access module of the UE 620. For example, state information of the $2^{nd}$ access module recognized by the $1^{st}$ access eNB 600 may be not matched to an actual state of the $2^{nd}$ access module of the UE 620 due to a clock draft in each entity, a control signal transmission delay in each entity, and the like.

FIG. 11B illustrates a situation in which a state for a $2^{nd}$ access module of a UE is determined in the UE and a $1^{st}$ access eNB according to an embodiment of the present disclosure.

Referring to FIG. 11B, state information of a $2^{nd}$ access module managed by a $1^{st}$ access eNB 600 and a state of a $2^{nd}$ access module of a UE 620 are shown in FIG. 11B. In FIG. 11B, 'ON' indicates an activation state of the $2^{nd}$ access module, and 'OFF' indicates an inactivate state of the $2^{nd}$ access module.

If a state of the $2^{nd}$ access module of the UE 620 is 'ON' and state information of the $2^{nd}$ access module managed by the $1^{st}$ access eNB 600 is 'ON', the UE 620 may transmit/receive data without any problem.

If the state of the $2^{nd}$ access module of the UE 620 is 'ON' and the state information of the $2^{nd}$ access module managed by the $1^{st}$ access eNB 600 is 'OFF', the state information of the $2^{nd}$ access module is mismatched, but the UE 620 may receive downlink data without any problem. For example, upon detecting downlink data in a state where the state information of the $2^{nd}$ access module is 'OFF', since the $1^{st}$ access eNB 600 transmits a signal for changing the $2^{nd}$ access module to an activation state and transmits downlink data via the $2^{nd}$ access eNB 610, the downlink data can be transmitted without any problem. However, when the state information of the $2^{nd}$ access module managed by the $1^{st}$ access eNB 600 is 'OFF', it implies a situation in which downlink data for the HE 620 is not generated. Therefore, since the $2^{nd}$ access module of the UE 620 operates in the activation state in the situation in which the downlink data for the UE 620 is not generated, power of the UE 620 may be wasted.

If the state of the $2^{nd}$ access module of the UE 620 is 'OFF' and the state information of the $2^{nd}$ access module managed by the $1^{st}$ access eNB 600 is 'ON', the UE 620 may be unable to receive downlink data due to a mismatch of the state information of the $2^{nd}$ access module. For example, upon detecting downlink data in a state where the state information of the $2^{nd}$ access module is 'ON', the $1^{st}$ access eNB 600 does not transmit a signal for changing the $2^{nd}$ access module of the UE 620 to the activation state but transmits downlink data via the $2^{nd}$ access eNB 610. However, in this case, since the state of the $2^{nd}$ access module of the UE 620 is 'OFF', the UE 620 is unable to receive downlink data transmitted from the $2^{nd}$ access eNB 610 via the $2^{nd}$ access link.

If the state of the $2^{nd}$ access module of the UE 620 is 'OFF' and the state information of the $2^{nd}$ access module managed by the $1^{st}$ access eNB 600 is 'OFF', it implies a state where there is no downlink data for the UE 620. The UE 620 may decrease unnecessary power consumption by deactivating the $2^{nd}$ access module in a situation in which the downlink data does not exist.

As described above, if the state of the $2^{nd}$ access module of the UE 620 is 'OFF' and the state information of the $2^{nd}$ access module managed by the $1^{st}$ access eNB 600 is 'ON', the UE 620 may be unable to receive downlink data due to a mismatch of the state information of the $2^{nd}$ access module. Therefore, in the embodiment of the present disclosure, the $2^{nd}$ access eNB 610 may detect a situation in which the state information of the $2^{nd}$ access module is mismatched and then may match the state information of the $2^{nd}$ access module.

Figure 12A:
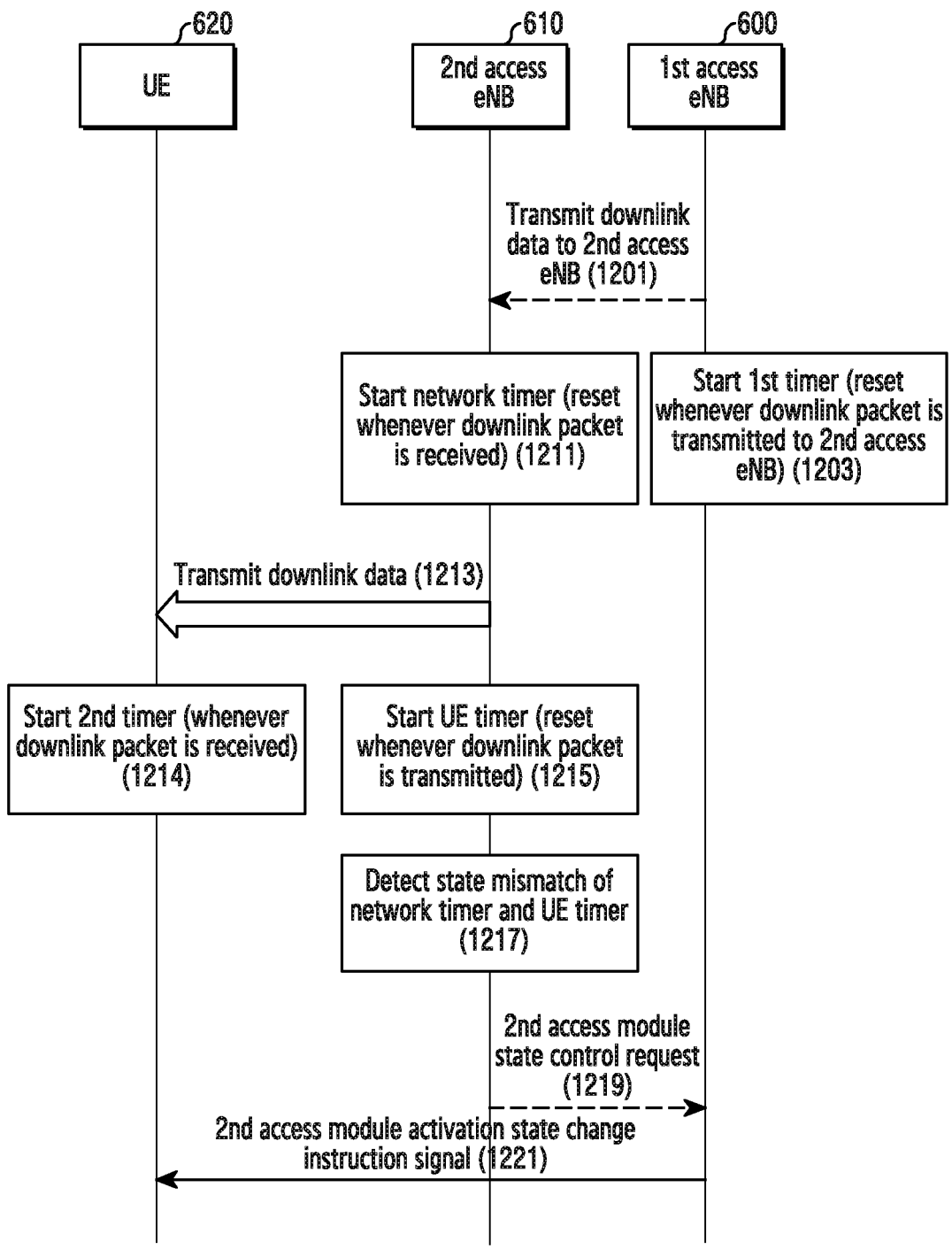
FIG. 12A illustrates a signal flow for controlling a state of a $2^{nd}$ access module by a $2^{nd}$ access eNB based on a timer mismatch of a UE and a $1^{st}$ access eNB according to an embodiment of the present disclosure.

FIG. 12A illustrates a signal flow for controlling a state of a $2^{nd}$ access module by a $2^{nd}$ access eNB based on a timer mismatch of a UE and a $1^{st}$ access eNB according to an embodiment of the present disclosure. It is assumed herein that the $2^{nd}$ access module of the UE is in an activation state.

Referring to FIG. 12A, in operation 1201, a $1^{st}$ access eNB 600 transmits downlink data for a UE 620 to a $2^{nd}$ access eNB 610. For example, the $1^{st}$ access eNB 600 may recognize that a $2^{nd}$ access module of the UE 620 is in an activation state, and may transmit the downlink data for the UE 620 to the $2^{nd}$ access eNB 610.

In operation 1203, the $1^{st}$ access eNB 600 measures a pre-set time by starting a $1^{st}$ timer at a time when downlink data is transmitted. If downlink data to be transmitted to the UE 620 via the $2^{nd}$ access eNB 610 is additionally detected before the $1^{st}$ timer expires or before a pre-set time elapses, returning to operation 1201, the $1^{st}$ access eNB 600 transmits downlink data for the UE 620 to the $2^{nd}$ access eNB 610. In this case, the $1^{st}$ timer is reset at a time when the additionally detected downlink data is transmitted, and thus the pre-set time is measured again.

Meanwhile, if downlink data for the UE 620 is received from the $1^{st}$ access eNB 600 in operation 1201, the $2^{nd}$ access eNB 610 starts a network timer in operation 1211 to measure a pre-set time. According to the embodiment of the present disclosure, the network timer may be set based on deactivation timer information received in advance from the $1^{st}$ access eNB 600. The deactivation timer information may include information for a set time of the $1^{st}$ timer of the $1^{st}$ access eNB. For another example, the network timer may be set based on information pre-stored in the $2^{nd}$ access eNB. The set time of the network timer may be equal to or different from the set time of the $1^{st}$ timer. The set time of the network timer may be set by considering a delivery delay between the $1^{st}$ access eNB 600 and the $2^{nd}$ access eNB 610. If downlink data for the UE 620 is additionally received from the $1^{st}$ access eNB 600 before the network timer expires, the $2^{nd}$ access eNB 610 measures again the pre-set time by resetting the network timer.

In operation 1213, the $2^{nd}$ access eNB 610 transmits the downlink data to the UE 620 via the $2^{nd}$ access link. In operation 1215, the $2^{nd}$ access eNB 610 measures a pre-set time by starting the $1^{st}$ timer at a time when downlink data is transmitted. According to the embodiment of the present disclosure, a UE timer may be set based on deactivation timer information previously received from the $1^{st}$ access eNB 600. The deactivation timer information may include information regarding the set time of the $1^{st}$ timer of the $1^{st}$ access eNB. For another example, the UE timer may be set based on information pre-stored in the $2^{nd}$ access eNB. The set time of the UE timer may be equal to or different from the set time of the $1^{st}$ timer and/or the set time of the network timer. The set time of the UE timer may be set by considering a delivery delay between the $1^{st}$ access eNB 600 and the $2^{nd}$ access eNB 610 and/or a delivery delay between the $2^{nd}$ access eNB 610 and the UE 620. If downlink data for the UE 620 is additionally received from the $1^{st}$ access eNB 600 before the UE timer expires, and if the additionally received downlink data is additionally transmitted to the UE 602, the $2^{nd}$ access eNB 610 measures again the pre-set time by resetting the UE timer.

If downlink data is received through the $2^{nd}$ access link from the $2^{nd}$ access eNB 610 in operation 1213, the UE 620 measures the pre-set time by starting a $2^{nd}$ timer in operation 1214. According to the embodiment of the present disclosure, the $2^{nd}$ timer may be set based on the deactivation timer information previously received from the $1^{st}$ access eNB 600. According to the embodiment of the present disclosure, the set time of the $2^{nd}$ timer may be equal to or different from the time information of the deactivation timer. Further, according to the embodiment of the present disclosure, the set time of the $2^{nd}$ timer may be equal to or different from the set time of the $1^{st}$ timer operated by the $1^{st}$ access eNB 600. Furthermore, the set time of the $2^{nd}$ timer may be equal to or different from the set time of the UE timer operated by the $2^{nd}$ access eNB 610. The set time of the $2^{nd}$ timer may be set by considering a delivery delay between the $1^{st}$ access eNB 600 and the $2^{nd}$ access eNB 610 and/or a delivery delay between the $2^{nd}$ access eNB 610 and the UE 620. If downlink data is additionally received from the $2^{nd}$ access module via the $2^{nd}$ access link before the $2^{nd}$ timer expires, the UE 620 measures again the pre-set time by resetting the $2^{nd}$ timer.

Meanwhile, in operation 1217, the $2^{nd}$ access eNB 610 may monitor a state of the UE timer and the network timer to detect a mismatch occurrence. For example, if the network timer is in a running state (e.g., an ON state) and the UE timer is in an expiry state (e.g., an OFF state), the $2^{nd}$ access eNB 610 may detect that the mismatch occurs due to the timer. In this case, the $2^{nd}$ access eNB 610 may recognize that a state of the $2^{nd}$ access module of the UE 620 is a deactivation state and that state information of the $2^{nd}$ access module managed by the $1^{st}$ access eNB 600 indicates an activation state. For another example, if the network timer is in the expiry state (e.g., the OFF state) and the UE timer is in the running state (e.g., the ON state), the $2^{nd}$ access eNB may detect that the mismatch occurs due to the timer. In this case, the $2^{nd}$ access eNB 610 may recognize that the state of the $2^{nd}$ access module of the UE 620 is the activation state, and the state information of the $2^{nd}$ access module managed by the $1^{st}$ access eNB 600 indicates a deactivation state.

In operation 1219, the $2^{nd}$ access eNB 610 transmits to the $1^{st}$ access eNB 600 a signal for requesting to control a state of the $2^{nd}$ access module of the UE 620. For example, the $2^{nd}$ access eNB 610 may transmit the signal for requesting to control the state of the $2^{nd}$ access module based on the state information of the $1^{st}$ access eNB 600. For example, if the state of the $2^{nd}$ access module of the UE 620 is the deactivation state and the state information of the $2^{nd}$ access module managed by the $1^{st}$ access eNB 600 indicates the activation state, the $2^{nd}$ access eNB 610 may transmit a signal for requesting to change the state of the $2^{nd}$ access module of the UE 620 from the deactivation state to the activation state. For another example, if the state of the $2^{nd}$ access module of the UE 620 is the activation state and the state information of the $2^{nd}$ access module managed by the $1^{st}$ access eNB 600 indicates the deactivation state, the $2^{nd}$ access eNB 610 may transmit the signal for requesting to change the state of the $2^{nd}$ access module of the UE 620 from the activation state to the deactivation state. In another embodiment of the present disclosure, the $2^{nd}$ access eNB 610 may transmit only information indicating that the state of the $2^{nd}$ access module of the UE 620 is the activation state. In another embodiment of the present disclosure, the $2^{nd}$ access eNB 610 may transmit only information indicating that the state of the 2$^{nd}$ access module of the UE 620 is different from the state information of the 2$^{nd}$ access module managed by the 1$^{st}$ access eNB 600.

Based on the state control request signal for the 2$^{nd}$ access module of the UE 620, in operation 1221, the 1$^{st}$ access eNB 600 transmits a signal for instructing a state change of the 2$^{nd}$ access module of the UE 620. The signal for instructing the state change of the 2$^{nd}$ access module may be a signal for instructing activation of the 2$^{nd}$ access module or a signal for instructing deactivation of the 2$^{nd}$ access module. The signal for instructing the state change of the 2$^{nd}$ access module may be transmitted by using any one of an RRC reconfiguration message, an MAC CE, and a PDCCH.

The UE 620 may receive the signal for instructing the state change of the 2$^{nd}$ access module from the 1$^{st}$ access eNB 600, and may change the state of the 2$^{nd}$ access module based on the received signal. Although not shown, the UE 620 may transmit a signal for indicating that the state of the 2$^{nd}$ access module is changed to the 1$^{st}$ access eNB 600 via the 1$^{st}$ access link, or may transmit it to the 2$^{nd}$ access eNB 610 via the 2$^{nd}$ access link.

Meanwhile, although not shown, after detecting that the mismatch occurs due to the timer, the 2$^{nd}$ access eNB 610 may buffer downlink data from the 1$^{st}$ access eNB 600 instead of transmitting it to the UE 620. Upon receiving a signal for indicating that the 2$^{nd}$ access module of the UE 620 is activated from the UE 620 or from the 1$^{st}$ access eNB 600, the 2$^{nd}$ access eNB 610 may start transmission of the buffered downlink data. Further, when a specific time elapses from a time at which the state control of the 2$^{nd}$ access module is requested to the 1$^{st}$ access eNB 600, the 2$^{nd}$ access eNB 610 may start transmission of the buffered downlink data.

In the embodiment of FIG. 12A described above, the 2$^{nd}$ access eNB 610 requests the 1$^{st}$ access eNB 600 to change the state of the 2$^{nd}$ access module of the UE 620. However, according to various embodiments of the present disclosure, if the state of the 2$^{nd}$ access module of the UE 620 is the activation state and the state information of the 2$^{nd}$ access module managed by the 1$^{st}$ access eNB 600 indicates the deactivation state, the 2$^{nd}$ access eNB 610 may transmit a signal for requesting to change the state of the 2$^{nd}$ access module from the activation state to the deactivation state to the UE 620 via the 2$^{nd}$ access link. An operation for matching the state of the 2$^{nd}$ access module by the 2$^{nd}$ access eNB based on a timer mismatch of the UE and the 1$^{st}$ access eNB is described above with reference to FIG. 12A. However, even if the state information of the 2$^{nd}$ access module is mismatched due to a control signal delay, and the like, the 2$^{nd}$ access eNB may transmit the signal for requesting to control the state of the 2$^{nd}$ access module to the 1$^{st}$ access eNB 600 or the UE 620.

Figure 12B:
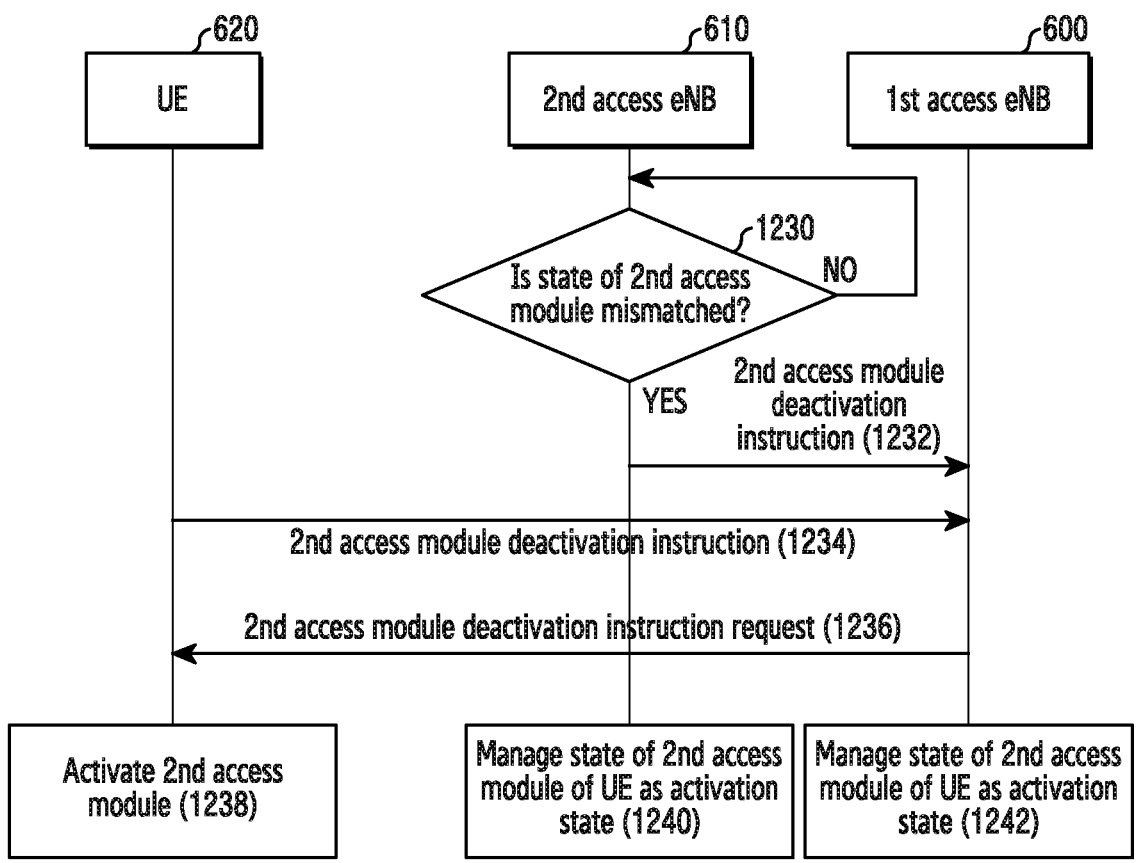
FIG. 12B illustrates a signal flow for controlling a state of a $2^{nd}$ access module of a UE according to an embodiment of the present disclosure.

FIG. 12B illustrates a signal flow for controlling a state of a 2$^{nd}$ access module of a UE according to an embodiment of the present disclosure.

Various embodiments for controlling a state of a 2$^{nd}$ access module are shown in FIG. 12B when a state mismatch occurs in the 2$^{nd}$ access module of the UE. More particularly, as shown in FIG. 11B, if a state of the 2$^{nd}$ access module of a UE 620 is 'OFF' and state information of a 2$^{nd}$ access module managed by a 1$^{st}$ access eNB 600 is 'ON' among various states, a situation may occur in which the UE 620 is unable to receive downlink data due to a mismatch of the state information of the 2$^{nd}$ access module. Therefore, various embodiments for a method for addressing this issue are described.

Referring to FIG. 12B, in operation 1230, a 2$^{nd}$ access eNB 610 may detect whether a state mismatch occurs in the 2$^{nd}$ access module for the UE 620. For example, the 2$^{nd}$ access eNB 610 may detect that the 2$^{nd}$ access module of the UE 620 is in a deactivation state or the 2$^{nd}$ access module of the UE 620 managed by the 1$^{st}$ access eNB 600 is in an activation state. This may be detected by managing the timers described with reference to FIG. 12A. When the state mismatch of the 2$^{nd}$ access module for the UE 620 occurs, in operation 1232, the 2$^{nd}$ access eNB 610 may transmit a signal for instructing deactivation of the 2$^{nd}$ access module to the 1$^{st}$ access eNB 600. Accordingly, the 1$^{st}$ access eNB 600 may recognize that the 2$^{nd}$ access module of the UE 620 is in the deactivation state, and may manage the state information of the 2$^{nd}$ access module of the UE 620 as the deactivation state.

For another option, when the state mismatch occurs in the 2$^{nd}$ access module for the UE 620, in operation 1234, the UE 620 may transmit to the 1$^{st}$ access eNB 600 a signal for indicating that the state of the 2$^{nd}$ access module is the deactivation state. Of course, in this case, the UE 620 cannot recognize that the occurrence of the state mismatch of the 2$^{nd}$ access module for the UE 620 is detected by the 2$^{nd}$ access eNB 610. Therefore, the UE 620 must periodically transmit to the 1$^{st}$ access eNB 600 the signal for indicating that the state of the 2$^{nd}$ access module is the deactivation state, or must transmit to the 1$^{st}$ access eNB 600 the signal for indicating that the state of the 2$^{nd}$ access module is the deactivation state whenever the state of the 2$^{nd}$ access module is deactivated. Accordingly, the 1$^{st}$ access eNB 600 may recognize that the 2$^{nd}$ access module of the UE 620 is in the deactivation state, and may manage the state information of the 2$^{nd}$ access module of the UE 620 as the deactivation state.

Upon recognizing that the 2$^{nd}$ access module of the UE 620 is in the deactivation state through operation 1232 or 1234, the 1$^{st}$ access eNB 600 may detect a presence of downlink data for the UE 620 via the 2$^{nd}$ access eNB 610. In this case, the 1$^{st}$ access eNB 600 may transmit a signal for requesting to activate the 2$^{nd}$ access module to the UE 620 in operation 1236. As described above, the signal for requesting to activate the 2$^{nd}$ access module may include beacon option information for indicating whether a short beacon is transmitted and uplink resource allocation information for transmission of an activation response signal.

Accordingly, the 2$^{nd}$ access module of the UE 620 is activated in operation 1238, and 2$^{nd}$ access module state information of the UE 620, which is stored in the 1$^{st}$ access eNB 600 and the 2$^{nd}$ access eNB 610, may be matched as an activation state in operations 1242 and 1240, respectively.

Referring to FIG. 12B described above, in case of using a method in which the 2$^{nd}$ access eNB 610 detects a state mismatch as to the 2$^{nd}$ access module of the UE 620 by using a timer and transmits a signal for controlling the state mismatch to the 1$^{st}$ access eNB 600, a latency may occur to some extents due to an X2 interface between the 2$^{nd}$ access eNB 610 and the 1$^{st}$ access eNB. However, this method has an advantage in that a system load is small since the 2$^{nd}$ access eNB 610 transmits the signal for controlling the state mismatch to the 1$^{st}$ access eNB only when the state mismatch occurs.

Meanwhile, in FIG. 12B described above, in case of using a method in which the UE 620 transmits the signal for controlling the state mismatch to the 2$^{nd}$ access eNB 610, there is an advantage in that a latency is very short since the 1$^{st}$ access link is used. However, in this method, a system load may be increased since the UE 620 transmits the signal for controlling the state mismatch to the 1st access eNB either periodically or whenever the state of the 2nd access module changes.

Referring to FIGS. 12A and 12B described above, an operation for matching the state of the 2nd access module has been described based on the state mismatch for the 2nd access module of the UE. However, according to another embodiment of the present disclosure, instead of transmitting the signal for requesting to control the state of the 2nd access module, the 2nd access eNB 610 may not transmit downlink data but buffer it until the state of the 2nd access module of the UE 620 is matched to the state information of the 2nd access module managed by the 1st access eNB 600. For example, if the 1st access eNB 600 transmits a signal for instructing activation of the 2nd access module to the UE 620 to activate the 2nd access module, a transmission delay may occur in the signal for instructing activation of the 2nd access module. Accordingly, although the state information of the 2nd access module managed by the 1st access eNB 600 is an activation state, the 2nd access module of the UE 620 may be actually in a deactivation state. In this case, the 2nd access eNB 610 may transmit downlink data to the UE 620 after buffering the downlink data for a specific period of time based on an expected time at which the 2nd access module is activated.

For another example, when it is expected that the 2nd access module of the UE 620 is changed to the deactivation state within a specific period of time in a state where downlink data to be transmitted to the UE 620 is buffered, the 2nd access eNB 610 may explicitly transmit a signal for prohibiting deactivation of the 2nd access module to the UE 620.

Figure 12C:
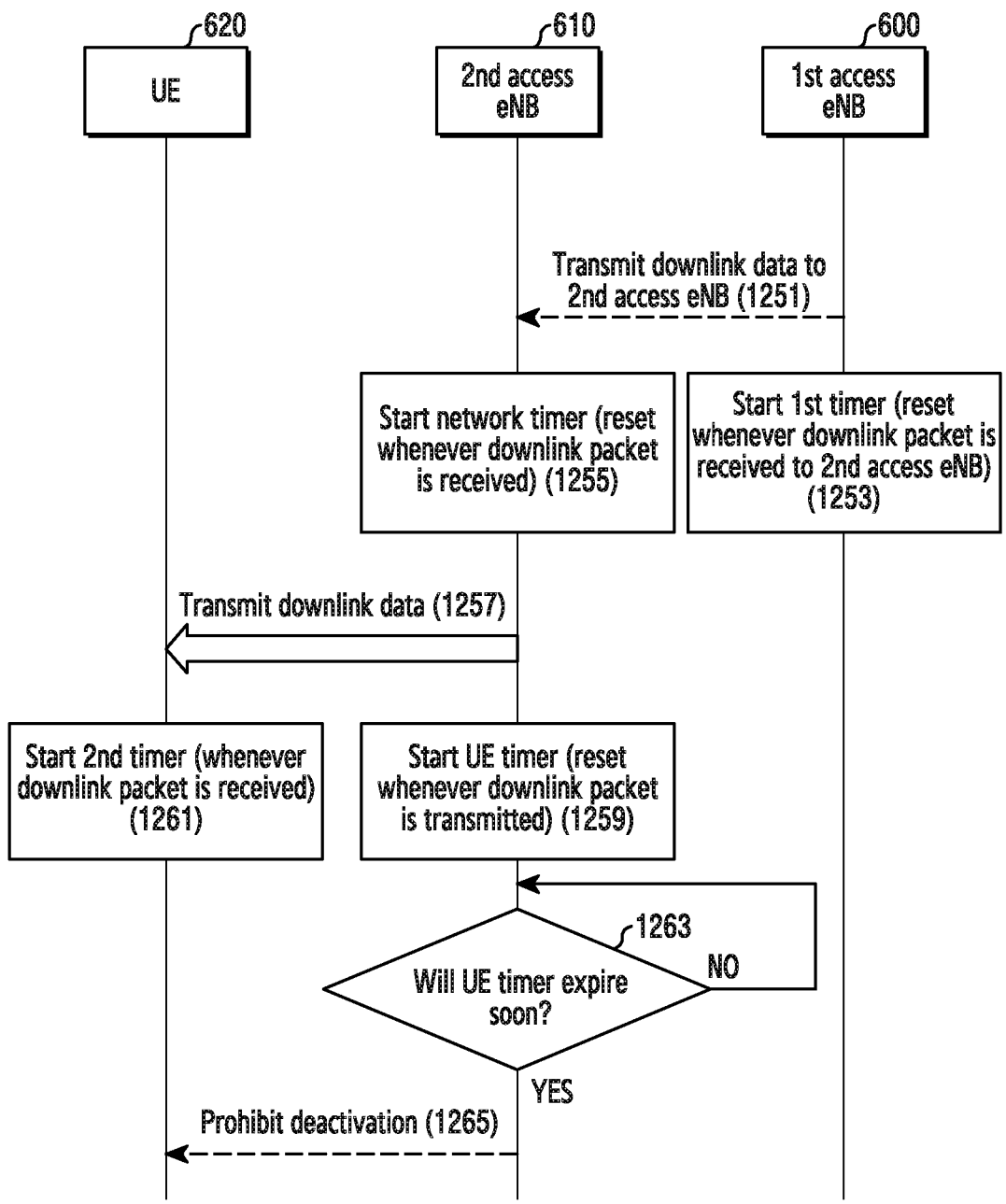
FIG. 12C illustrates a signal flow for prohibiting deactivation of a UE by a $2^{nd}$ access eNB according to an embodiment of the present disclosure.

FIG. 12C illustrates a signal flow for prohibiting deactivation of a UE by a 2nd access eNB according to an embodiment of the present disclosure.

Referring to FIG. 12C, in operation 1251, a 1st access eNB 600 transmits downlink data for a UE 620 to a 2nd access eNB 610. For example, the 1st access eNB 600 may recognize that a 2nd access module of the UE 620 is in an activation state, and may transmit the downlink data for the UE 620 to the 2nd access eNB 610.

In operation 1253, the 1st access eNB 600 measures a pre-set time by starting a 1st timer at a time when downlink data is transmitted. If downlink data to be transmitted to the UE 620 via the 2nd access eNB 610 is additionally detected before the 1st timer expires or before a pre-set time elapses, returning to operation 1251, the 1st access eNB 600 transmits downlink data for the UE 620 to the 2nd access eNB 610. In this case, the 1st timer is reset at a time when the additionally detected downlink data is transmitted, and thus the pre-set time is measured again.

Meanwhile, if downlink data for the UE 620 is received from the 1st access eNB 600 in operation 1251, the 2nd access eNB 610 starts a network timer in operation 1255 to measure a pre-set time. According to the embodiment of the present disclosure, the network timer may be set based on deactivation timer information received in advance from the 1st access eNB 600. The deactivation timer information may include information for a set time of the 1st timer of the 1st access eNB. For another example, the network timer may be set based on information pre-stored in the 2nd access eNB. The set time of the network timer may be equal to or different from the set time of the 1st timer. The set time of the network timer may be set by considering a delivery delay between the 1st access eNB 600 and the 2nd access eNB 610. If downlink data for the UE 620 is additionally received from the 1st access eNB 600 before the network timer expires, the 2nd access eNB 610 measures again the pre-set time by resetting the network timer.

In operation 1257, the 2nd access eNB 610 transmits the downlink data to the UE 620 via the 2nd access link. In operation 1259, the 2nd access eNB 610 measures a pre-set time by starting the 1st timer at a time when downlink data is transmitted. According to the embodiment of the present disclosure, a UE timer may be set based on deactivation timer information previously received from the 1st access eNB 600. The deactivation timer information may include information regarding the set time of the 1st timer of the 1st access eNB. For another example, the UE timer may be set based on information pre-stored in the 2nd access eNB. The set time of the UE timer may be equal to or different from the set time of the 1st timer and/or the set time of the network timer. The set time of the UE timer may be set by cindering a delivery delay between the 1st access eNB 600 and the 2nd access eNB 610 and/or a delivery delay between the 2nd access eNB 610 and the UE 620. If downlink data for the UE 620 is additionally received from the 1st access eNB 600 before the UE timer expires, and if the additionally received downlink data is additionally transmitted to the UE 602, the 2nd access eNB 610 measures again the pre-set time by resetting the UE timer.

If downlink data is received through the 2nd access link from the 2nd access eNB 610 in operation 1257, the UE 620 measures the pre-set time by starting a 2nd timer in operation 1261. According to the embodiment of the present disclosure, the 2nd timer may be set based on the deactivation timer information previously received from the 1st access eNB 600. According to the embodiment of the present disclosure, the set time of the 2nd timer may be equal to or different from the time information of the deactivation timer. Further, according to the embodiment of the present disclosure, the set time of the 2nd timer may be equal to or different from the set time of the 1st timer operated by the 1st access eNB 600. Furthermore, the set time of the 2nd timer may be equal to or different from the set time of the UE timer operated by the 2nd access eNB 610. The set time of the 2nd timer may be set by considering a delivery delay between the 1st access eNB 600 and the 2nd access eNB 610 and/or a delivery delay between the 2nd access eNB 610 and the UE 620. If downlink data is additionally received from the 2nd access module via the 2nd access link before the 2nd timer expires, the UE 620 measures again the pre-set time by resetting the 2nd timer.

Meanwhile, in operation 1263, the 2nd access eNB 610 detects whether the UE timer will expire within a specific time. For example, the 2nd access eNB 610 detects whether the UE timer will expire within the specific time in a state where the downlink data for the UE 620 is not transmitted to the UE 620 but is buffered. If it is determined that the UE timer will expire within the specific time, in operation 1265, the 2nd access eNB 610 may transmit the signal for prohibiting deactivation of the 2nd access module to the UE 620. In this case, the signal for prohibiting deactivation of the 2nd access module may include information regarding a time of prohibiting deactivation of the 2nd access module. Therefore, during the time of prohibiting deactivation of the 2nd access module, the UE 620 may not deactivate the 2nd access module but may receive downlink data from the 2nd access eNB 610 via the 2nd access module. The signal for prohibiting deactivation of the 2nd access module may be a signal for requesting to keep the activation state of the 2nd access module.

According to the embodiment of the present disclosure, instead of transmitting the signal for prohibiting deactivation of the 2$^{nd}$ access module, the 2$^{nd}$ access eNB 610 may increase a priority for downlink data transmission of the UE 620. For example, if there is downlink data for a plurality of UEs, the 2$^{nd}$ access eNB 610 may transmit downlink data for the UE 620 expected to be deactivated within a specific time by preferentially scheduling it.

FIG. 12D illustrates a cause of a state mismatch occurrence on a 2$^{nd}$ access module of a UE and a method of correcting the state mismatch according to an embodiment of the present disclosure.

Referring to FIG. 12D, a state mismatch for the 2$^{nd}$ access module of the UE 620 may occur due to a channel access delay of an unlicensed band. For example, since a channel occupation for transmitting downlink data to the UE 620 is delayed in the 2$^{nd}$ access eNB 610 which uses the unlicensed band, the state mismatch may occur for the 2$^{nd}$ access module of the UE. In this case, the state for the 2$^{nd}$ access module of the UE may be matched by the 2$^{nd}$ access eNB 610 by using the method described above with reference to FIGS. 12A and 12B.

Further, the state mismatch for the 2$^{nd}$ access module of the UE 620 may occur when control signal transmission is delayed due to an interface between the 2$^{nd}$ access eNB 610 and the 1$^{st}$ access eNB 600. In this case, the state for the 2$^{nd}$ access module of the UE may be matched by the 2$^{nd}$ access eNB 610 by using a method of buffering downlink data.

Further, the state mismatch for the 2$^{nd}$ access module of the UE 620 may occur when downlink data using the 2$^{nd}$ access module is generated in the UE 620 and thus the 2$^{nd}$ access module is activated. In this case, the state for the 2$^{nd}$ access module may be matched by the UE 620 by using a method of transmitting a signal for indicating activation of the 2$^{nd}$ access module to the 1$^{st}$ access eNB.

Further, the state mismatch for the 2$^{nd}$ access module of the UE 620 may occur due to a clock draft of the UE 620 and the 1$^{st}$ access eNB 600. In this case, the state for the 2$^{nd}$ access module of the UE may be matched by using a method of applying an activation margin to a time of a timer managed in the UE 620, the 1$^{st}$ access eNB 600, and/or the 2$^{nd}$ access eNB 610.

In addition, in the embodiment of the present disclosure, upon detecting that the 2$^{nd}$ access module needs to be changed from the activation state to the deactivation state, the UE 620 may use a WLAN 802.11 MAC header to indicate that the 2$^{nd}$ access module will operate by being changed to the deactivation state.

Figure 13:
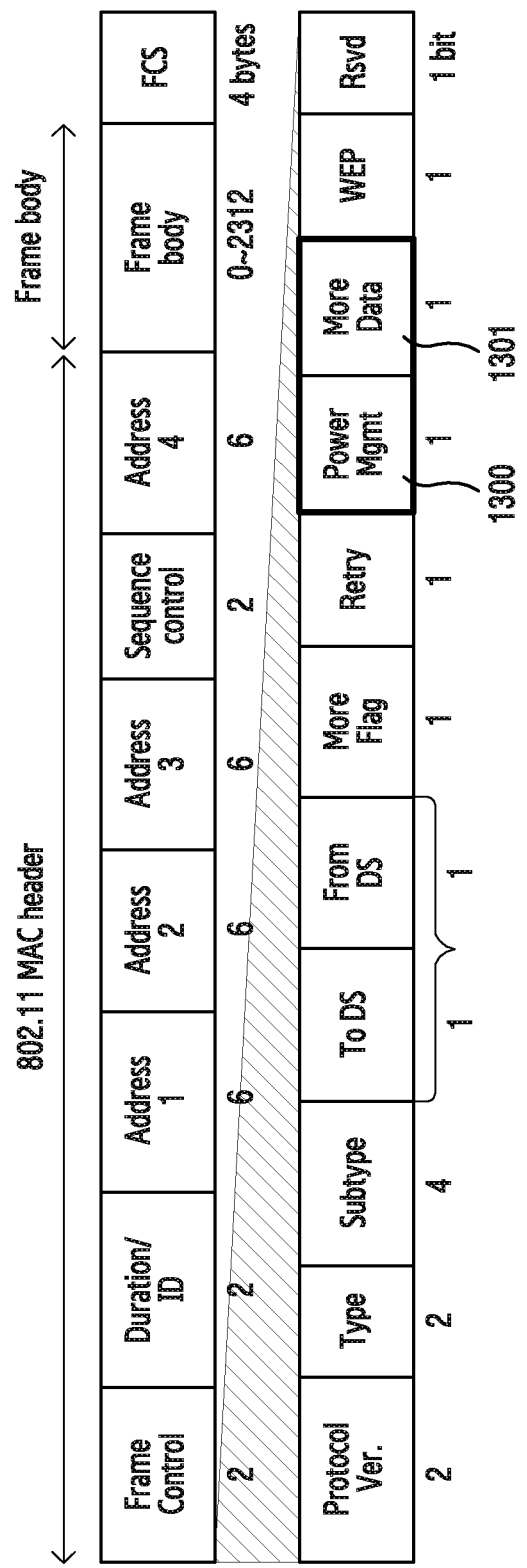
FIG. 13 illustrates a media access control (MAC) header for indicating a state of a $2^{nd}$ access module by a UE according to an embodiment of the present disclosure.

FIG. 13 illustrates a media access control (MAC) header for indicating a state of a 2$^{nd}$ access module by a UE according to an embodiment of the present disclosure.

Referring to FIG. 13, the UE 620 may set values of a Power Mgmt 1300 and More Data 1301 in a frame control field of the WLAN 802.11 MAC header respectively to 1 and 1, and may transmit the values to the 2$^{nd}$ access eNB 610. According to a WLAN 802.11 standard, 'Power Mgmt=0' indicates an activation mode, 'Power Mgmt=1' indicates a PSM mode, and the More Data 1301 is in a state of not being defined for a specific usage. Therefore, in the present disclosure, it may be set to 'Power Mgmt=1, More Data=1' to indicate that the 2$^{nd}$ access module of the UE 620 will operate by being changing to the inactive module. The 2$^{nd}$ access eNB 610 may analyze the Power Mgmt 1300 and More Data 1301 included in the WLAN 802.11 MAC header received from accessed UEs, and thus may determine whether all of the accessed UEs indicate the change to the deactivation state of the 2$^{nd}$ access module. If all of the accessed UEs indicate the change to the deactivation state of the 2$^{nd}$ access module, the 2$^{nd}$ access eNB 610 may not perform an operation of periodically transmitting a beacon signal. In this case, the 2$^{nd}$ access eNB 610 may perform the operation of transmitting the beacon signal under the control of the 1$^{st}$ access eNB. For example, upon receiving downlink data to be transmitted to the UE 620 from the 1$^{st}$ access eNB, the 2$^{nd}$ access eNB 610 may detect that it is required to resume the operation of periodically transmitting the beacon signal, and may periodically transmit the beacon signal.

The aforementioned embodiments of the present disclosure have been described under the assumption that the 1$^{st}$ access eNB receives downlink data for a 2$^{nd}$ access system of the UE 620 from a higher network node, and transmits the received downlink data to the 2$^{nd}$ access system. However, according to an embodiment of the present disclosure, the 2$^{nd}$ access eNB may receive the downlink data for the 2$^{nd}$ access system of the UE 620 from the higher network node and may transmit it to the UE 620. In this case, the 2$^{nd}$ access eNB 610 may transmit a signal for indicating a presence/absence of downlink data to be transmitted to the UE 620 or a signal for requesting to control the activation state for the 2$^{nd}$ access module of the UE 620, so that the 1$^{st}$ access eNB can control the activation state of the 2$^{nd}$ access module of the UE 620.

Further, the aforementioned embodiments of the present disclosure may also be equally applied to a case where downlink data is delivered to a 2$^{nd}$ access eNB to distribute a load caused by downlink data to be transmitted to a UE by a 1$^{st}$ access eNB via a link of a 1$^{st}$ access system.

Figure 14A:
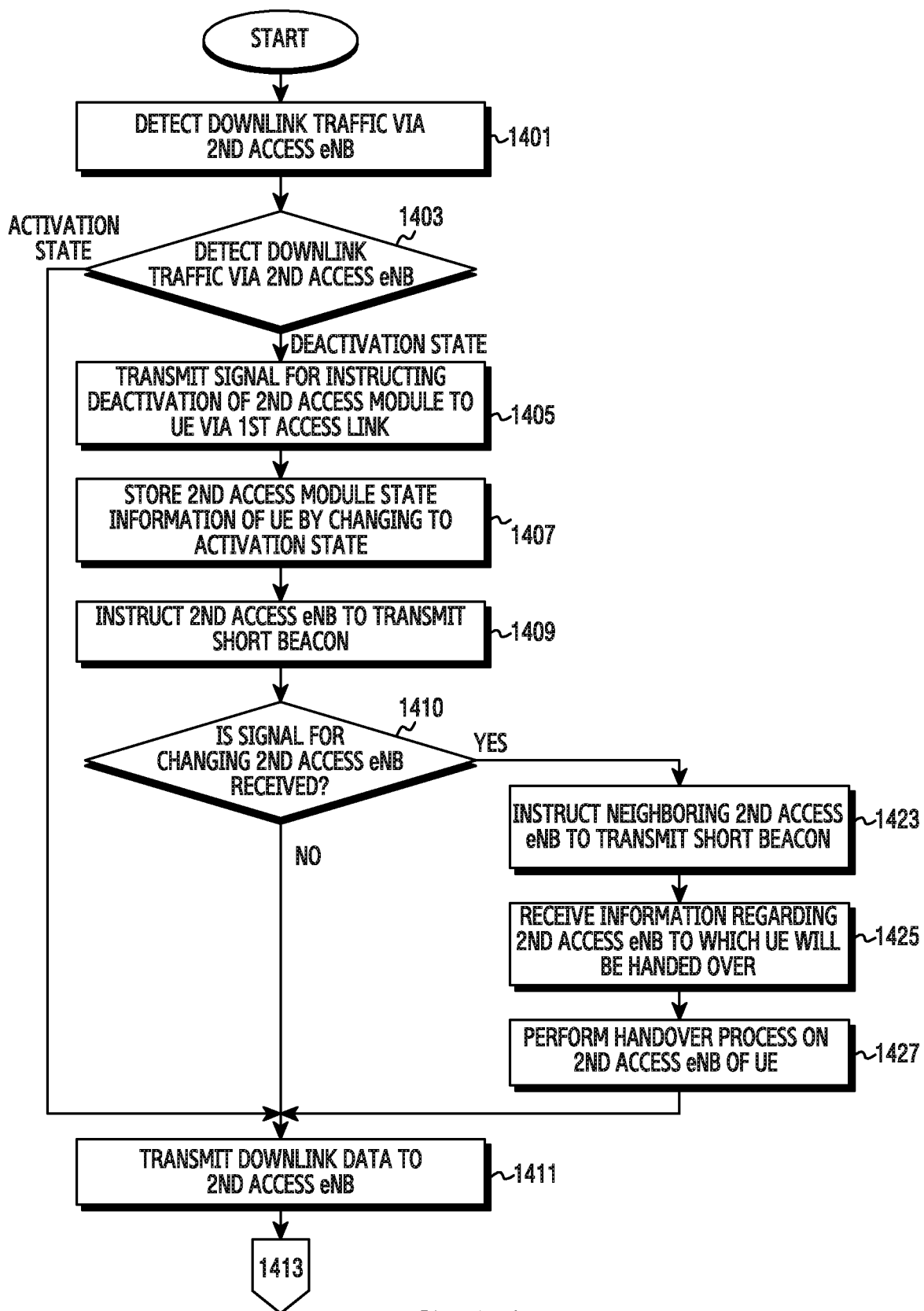
FIGS. 14A and 14B illustrate a procedure of operating a $1^{st}$ access eNB according to an embodiment of the present disclosure.
Figure 14B:
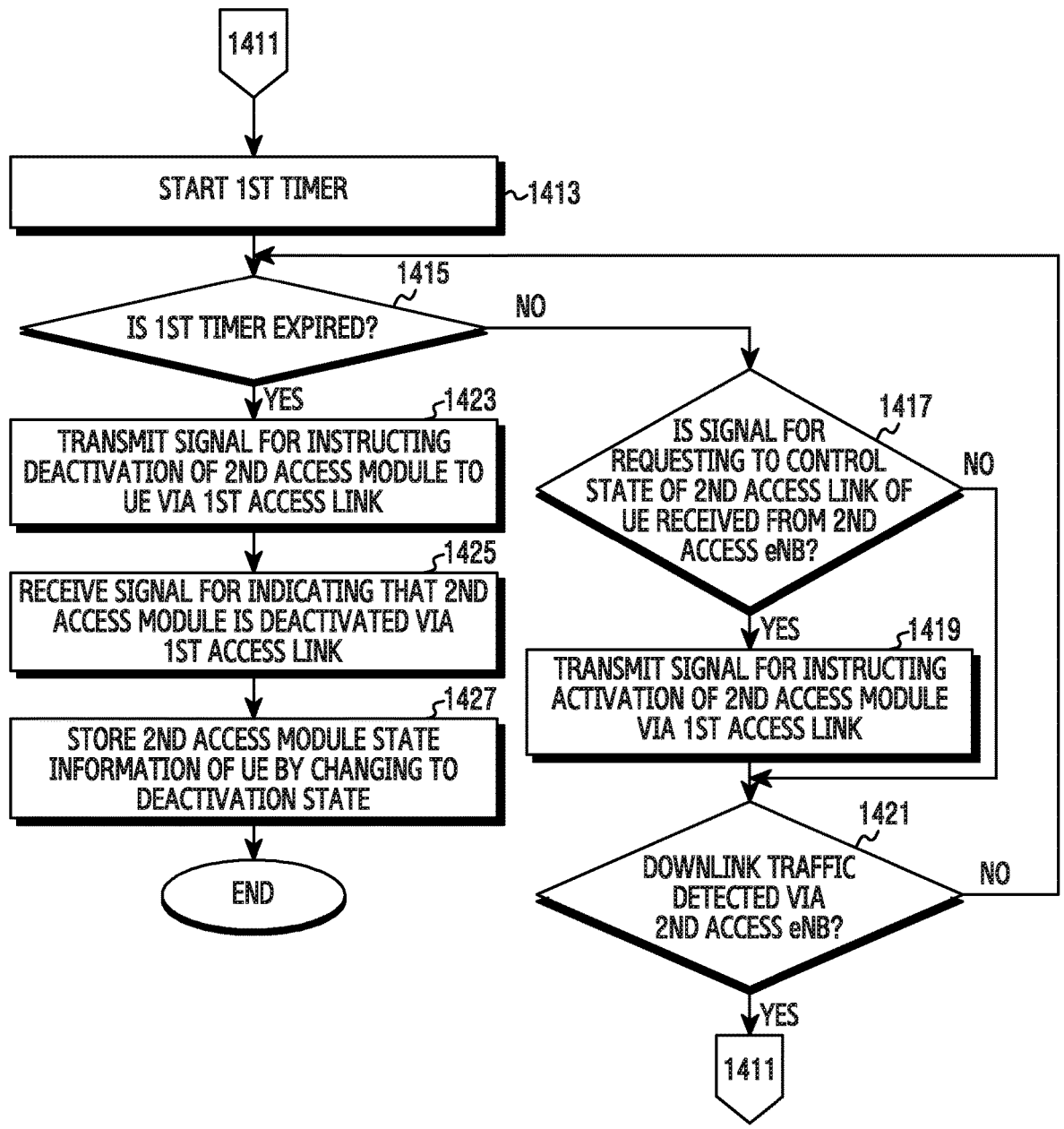

FIGS. 14A and 14B illustrate a procedure of operating a 1$^{st}$ access eNB according to an embodiment of the present disclosure.

Referring to FIGS. 14A and 14B, in operation 1401, the 1$^{st}$ access eNB 600 detects traffic to be transmitted to the UE 620 via a 2$^{nd}$ access eNB. According to the embodiment of the present disclosure, the 1$^{st}$ access eNB 600 may detect traffic to be transmitted to the UE 620 via the 2$^{nd}$ access eNB from a higher network node. According to another embodiment of the present disclosure, the 1$^{st}$ access eNB 600 may receive a downlink traffic generation report signal from the 2$^{nd}$ access eNB 610, and thus may detect a presence of the traffic to be transmitted to the UE 620 via the 2$^{nd}$ access eNB. According to another embodiment of the present disclosure, to distribute a load for a 1$^{st}$ access link, the 1$^{st}$ access eNB 600 may determine to transmit to the 2$^{nd}$ access eNB 610 downlink data to be transmitted to the UE 620, and may detect the generation of the traffic to be transmitted to the UE 620 via the 2$^{nd}$ access eNB.

In operation 1403, the 1$^{st}$ access eNB 600 identifies state information of the 2$^{nd}$ access module of the UE 620. If the state information of the 2$^{nd}$ access module of the UE 620, which is stored in the 1$^{st}$ access eNB 600, indicates an activation state, the 1$^{st}$ access eNB 600 directly proceeds to operation 1411.

On the other hand, if the state information of the 2$^{nd}$ access module of the UE 620, which is stored in the 1$^{st}$ access eNB 600, indicates a deactivation state, in operation 1405, the 1$^{st}$ access eNB 600 transmits a signal for instructing activation of the 2$^{nd}$ access module to the UE via the 1$^{st}$ access link. The signal for instructing activation of the 2$^{nd}$ access module may be transmitted by using any one of an RRC reconfiguration message, a MAC CE, and a PDCCH based on how quickly the 2$^{nd}$ access module of the UE 620 must be activated. Further, the signal for instructing activation of the 2$^{nd}$ access module may include information for indicating whether the 2$^{nd}$ access eNB 610 transmits a short beacon.

In operation 1407, the 1$^{st}$ access eNB 600 stores the state information of the 2$^{nd}$ access module of the UE 620 by changing from the deactivation state to the activation state.

Thereafter, in operation 1409, the 1$^{st}$ access eNB 600 instructs the 2$^{nd}$ access eNB 610 to transmit a short beacon. According to the embodiment of the present disclosure, operation 1409 may be skipped.

In operation 1410, the 1$^{st}$ access eNB 600 examines whether a signal for changing the 2$^{nd}$ access eNB is received. For example, the 1$^{st}$ access eNB 600 may receive from the UE 620 a signal including information for indicating whether there is a need to change the 2$^{nd}$ access eNB. If the signal for changing the 2$^{nd}$ access eNB is not received, the 1$^{st}$ access eNB 600 proceeds to operation 1411. For example, if the 1$^{st}$ access eNB 600 receives a signal for indicating that there is no need to change the 2$^{nd}$ access eNB, the 1$^{st}$ access eNB 600 may proceed to operation 1411.

Meanwhile, if the signal for changing the 2$^{nd}$ access eNB is received, in operation 1423, the 1$^{st}$ access eNB 600 instructs a neighboring 2$^{nd}$ access eNB to transmit a short beacon signal. Herein, the signal for instructing transmission of the short beacon signal may be transmitted to the 2$^{nd}$ access eNB to which the UE 620 has access and/or at least one different 2$^{nd}$ access eNB neighboring to the 2$^{nd}$ access eNB. The 1$^{st}$ access eNB 600 may select at least one 2$^{nd}$ access eNB based on a pre-registered 2$^{nd}$ access eNB list, and may transmit the signal for instructing transmission of the short beacon signal to the selected as least one 2$^{nd}$ access eNB. The 2$^{nd}$ access eNB list may include location information of each of 2$^{nd}$ access eNBs and/or information of a 2$^{nd}$ access eNB neighboring to each of the 2$^{nd}$ access eNBs. Further, the 1$^{st}$ access eNB 600 may select at least one 2$^{nd}$ access eNB based on a location of the UE 620.

Thereafter, the 1$^{st}$ access eNB 600 receives information regarding a 2$^{nd}$ access eNB to which the UE 620 will be handed over in operation 1425, and performs a handover process on the 2$^{nd}$ access eNB 610 of the UE 620 in operation 1427. Thereafter, the 1$^{st}$ access eNB 600 may proceed to operation 1411. According to the embodiment of the present disclosure, operations 1410, 1426, 1425, and 1427 may be skipped. Further, operations 1410, 1426, 1425, and 1427 are not necessarily performed after operation 1409, but may be performed during the UE 620 receives downlink data from the 2$^{nd}$ access eNB 610.

The 1$^{st}$ access eNB 600 transmits downlink traffic to the 2$^{nd}$ access eNB 610 in operation 1411, and starts an operation of a 1$^{st}$ timer in operation 1413. If downlink data of the UE 620 is additionally detected via the 2$^{nd}$ access eNB 610 during the 1$^{st}$ timer is running, the 1$^{st}$ access eNB 600 may transmit the additionally detected downlink traffic to the 2$^{nd}$ access eNB 610, and may reset the 1$^{st}$ timer.

Thereafter, proceeding to operation 1415, the 1$^{st}$ access eNB 600 examines whether the timer expires. For example, when the downlink data of the UE 620 is not additionally detected via the 2$^{nd}$ access eNB 610 during the 1$^{st}$ timer is running, it is examined whether the 1$^{st}$ timer expires by measuring a pre-set time.

If the 1$^{st}$ timer does not expire, in operation 1417, the 1$^{st}$ access eNB 600 examines whether a signal for requesting to control a state of the 2$^{nd}$ access module of the UE 620 is received from the 2$^{nd}$ access eNB 610. If the signal for requesting to control the state of the 2$^{nd}$ access module is not received, in operation 1421, the 1$^{st}$ access eNB 600 examines whether downlink traffic to be transmitted to the UE 620 is additionally detected via the 2$^{nd}$ access eNB 610. If the downlink traffic to be transmitted to the UE 620 is additionally detected via the 2$^{nd}$ access eNB 610, returning to operation 1411, the 1$^{st}$ access eNB 600 transmits the additionally detected downlink data to the 2$^{nd}$ access eNB 610, and starts the operation of the 1$^{st}$ timer in operation 1413. For example, the 1$^{st}$ access eNB 600 resets the 1$^{st}$ timer. On the other hand, if the downlink traffic to be transmitted to the UE 620 is not additionally detected via the 2$^{nd}$ access eNB 610, returning to 1413, the 1$^{st}$ access eNB 600 re-examines whether the 1$^{st}$ timer expires.

Meanwhile, if an examination result of operation 1417 shows that the signal for requesting to control the 2$^{nd}$ access module state of the UE 620 is received, in operation 1419, the 1$^{st}$ access eNB 600 transmits the signal for instructing activation of the 2$^{nd}$ access module of the UE 620 to the UE 620 via the 1$^{st}$ access link. For example, if the state information stored in the 1$^{st}$ access eNB 600 and regarding the 2$^{nd}$ access module of the UE 620 is not matched to the actual state of the 2$^{nd}$ access module of the UE 620, the 1$^{st}$ access eNB 600 may receive the signal for requesting to control the state of the 2$^{nd}$ access module from the 2$^{nd}$ access eNB 610. According to the embodiment of the present disclosure, the signal for instructing activation of the 2$^{nd}$ access module may include information for indicating whether a short beacon of the 2$^{nd}$ access eNB 610 is transmitted.

If the 1$^{st}$ timer expires, in operation 1423, the 1$^{st}$ access eNB 600 may transmit a signal for instructing deactivation of the 2$^{nd}$ access module to the UE 620 via the 1$^{st}$ access link. The signal for instructing deactivation of the 2$^{nd}$ access module may be a probe request signal. The signal for instructing deactivation of the 2$^{nd}$ access module may include a sequence number of a last downlink packet transmitted by the 1$^{st}$ access eNB 600 to the 2$^{nd}$ access eNB 610. According to various embodiments of the present disclosure, if the 1$^{st}$ access eNB 600 transmits timer information for deactivation to the UE 620 during an initial setup process with respect to the UE 620 or if the UE 620 has timer information pre-stored therein for deactivation, the 1$^{st}$ access eNB 600 may not perform operations 1423 and/or 1425 but may directly proceed to operation 1427.

In operation 1425, the 1$^{st}$ access eNB 600 may receive a signal for indicating that the 2$^{nd}$ access module is deactivated from the UE 620 via the 1$^{st}$ access link. The signal for indicating that the 2$^{nd}$ access module is deactivated may be a probe response signal. According to the embodiment of the present disclosure, a process in which the 1$^{st}$ access eNB 600 receives the signal for indicating that the 2$^{nd}$ access link is deactivated may be skipped. In this case, the 1$^{st}$ access eNB 600 may determine whether the UE 620 has received a last packet based on an ARQ response signal received from the UE 620.

The 1$^{st}$ access eNB 600 stores state information of the 2$^{nd}$ access module of the UE 620 by changing to a deactivation state in operation 1427, and then ends the procedure according to the embodiment of the present disclosure.

Figure 15:
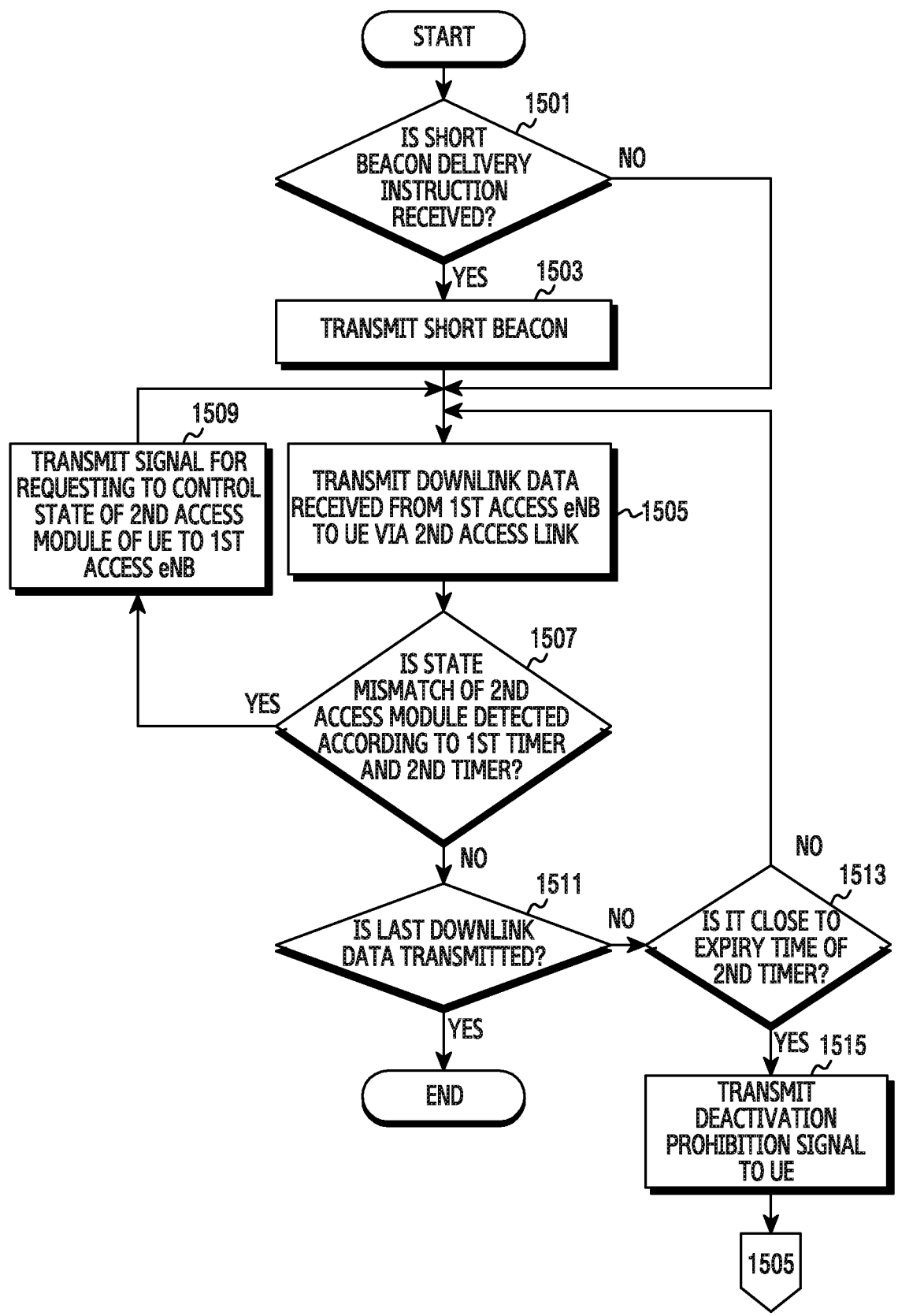
FIG. 15 illustrates a procedure of operating a $2^{nd}$ access eNB according to an embodiment of the present disclosure.

FIG. 15 illustrates a procedure of operating a 2$^{nd}$ access eNB according to an embodiment of the present disclosure.

Referring to FIG. 15, in operation 1501, the 2$^{nd}$ access eNB 610 examines whether a short beacon delivery instruction is received. If the short beacon delivery instruction is not received, the 2$^{nd}$ access eNB 610 directly proceeds to operation 1505.

In operation 1503, the 2$^{nd}$ access eNB 610 transmits a short beacon to the UE 620. The short beacon may be configured by including only some pieces of information among a plurality of pieces of information included in a well-known beacon signal. Further, as shown in FIG. 8B, a short beacon 852 is not transmitted at a time of transmitting the periodically repeated beacon 850 but is transmitted at a time point between beacon transmission periods. This is for allowing the UE 620 to activate the $2^{nd}$ access module, thereafter to receive the short beacon 852 instead of waiting until a next beacon reception duration, and thereafter to immediately receive downlink data. According to the embodiment of the present disclosure, the $2^{nd}$ access eNB 610 may skip operations 1501 and 1503.

In operation 1505, the $2^{nd}$ access eNB 610 transmits downlink data received from the $1^{st}$ access eNB, to the UE 620 via the $2^{nd}$ access link. Thereafter, in operation 1507, the $2^{nd}$ access eNB 610 determines whether a state mismatch of the $2^{nd}$ access module is detected according to a $1^{st}$ timer and a $2^{nd}$ timer. Herein, the $1^{st}$ timer starts an operation at a time when the $2^{nd}$ access eNB 610 receives downlink data from the $1^{st}$ access eNB 600. Further, the $2^{nd}$ timer starts an operation at a time when the $2^{nd}$ access eNB 610 transmits downlink data to the UE 620. For example, the $1^{st}$ timer and the $2^{nd}$ timer may be respectively the aforementioned network timer or UE timer of FIGS. 12A, 12B, 12C, and 12D. If the $1^{st}$ timer is in a running state (e.g., an ON state) and the $2^{nd}$ timer is in an expiry state (e.g., an OFF state), the $2^{nd}$ access eNB 610 may determine that a state mismatch of the $2^{nd}$ access module is detected. In this case, the $2^{nd}$ access eNB 610 may recognize that a state of the $2^{nd}$ access module of the UE 620 is a deactivation state and that state information of the $2^{nd}$ access module managed by the $1^{st}$ access eNB 600 indicates an activation state.

Upon detecting the state mismatch of the $2^{nd}$ access module according to the $1^{st}$ timer and the $2^{nd}$ timer, in operation 1509, the $2^{nd}$ access eNB 610 transmits to the $1^{st}$ access eNB 600 a signal for requesting to control the state of the $2^{nd}$ access module of the UE 620. For example, if the state of the $2^{nd}$ access module of the UE 620 is the deactivation state and the state information of the $2^{nd}$ access module managed by the $1^{st}$ access eNB 600 indicates the activation state, the $2^{nd}$ access eNB 610 may transmit a signal for requesting to change the state of the $2^{nd}$ access module of the UE 620 from the deactivation state to the activation state. Thereafter, returning to operation 1505, the $2^{nd}$ access eNB 610 repeats the subsequent operations. If the state of the $2^{nd}$ access module of the UE 620 is the deactivation state and the state information of the $2^{nd}$ access module managed by the $1^{st}$ access eNB 600 indicates the activation state, the $2^{nd}$ access eNB 610 may not transmit downlink data to the UE 620 and may buffer the downlink data, until the state of the $2^{nd}$ access module is changed to the activation state.

On the other hand, if the state mismatch of the $2^{nd}$ access module is not detected according to the $1^{st}$ timer and the $2^{nd}$ timer, in operation 1511, the $2^{nd}$ access eNB 610 determines whether a last downlink packet is transmitted. For example, if additional downlink data is not received until the $1^{st}$ timer expires, the $2^{nd}$ access eNB 610 determines that the last downlink data is received, and examines whether the downlink data is transmitted to the UE 620. For another example, if the additional downlink data is detected before the $1^{st}$ timer expires, the $2^{nd}$ access eNB 610 may determine that the last downlink traffic is not transmitted.

If it is determined that the last downlink traffic is not transmitted, in operation 1513, the $2^{nd}$ access eNB 610 determines whether the $2^{nd}$ timer for determining a time at which the $2^{nd}$ access module for the UE 620 is deactivated is close to an expiry time. For example, the $2^{nd}$ access eNB 610 may determine whether the $2^{nd}$ timer expires within a threshold time. If it is determined that the $2^{nd}$ timer expires within the threshold time, the $2^{nd}$ access eNB 610 determines that the $2^{nd}$ access module of the UE 620 is deactivated within the threshold time, and proceeding to operation 1515, transmits a signal for prohibiting deactivation of the $2^{nd}$ access module to the UE 620. For example, the $2^{nd}$ access eNB 610 may transmit the signal for prohibiting deactivation of the $2^{nd}$ access module to the UE 620 so that the $2^{nd}$ access module of the UE 620 is kept in an activation state. In this case, the signal for prohibiting deactivation of the $2^{nd}$ access module may include information regarding a time of prohibiting deactivation. According to the embodiment of the present disclosure, instead of transmitting the signal for prohibiting deactivation of the $2^{nd}$ access module in operation 1515, the $2^{nd}$ access eNB 610 may increase a priority for downlink data transmission of the UE 620. For example, if there is downlink data for a plurality of UEs, the $2^{nd}$ access eNB 610 may transmit downlink data for the UE 620 expected to be deactivated within a specific time by preferentially scheduling it.

If it is determined that the $2^{nd}$ timer does not expire within the threshold time, returning to operation 1505, the $2^{nd}$ access eNB 610 repeats the subsequent operations, and otherwise if it is determined that last downlink traffic is transmitted, ends the procedure according to the embodiment of the present disclosure.

Figure 16A:
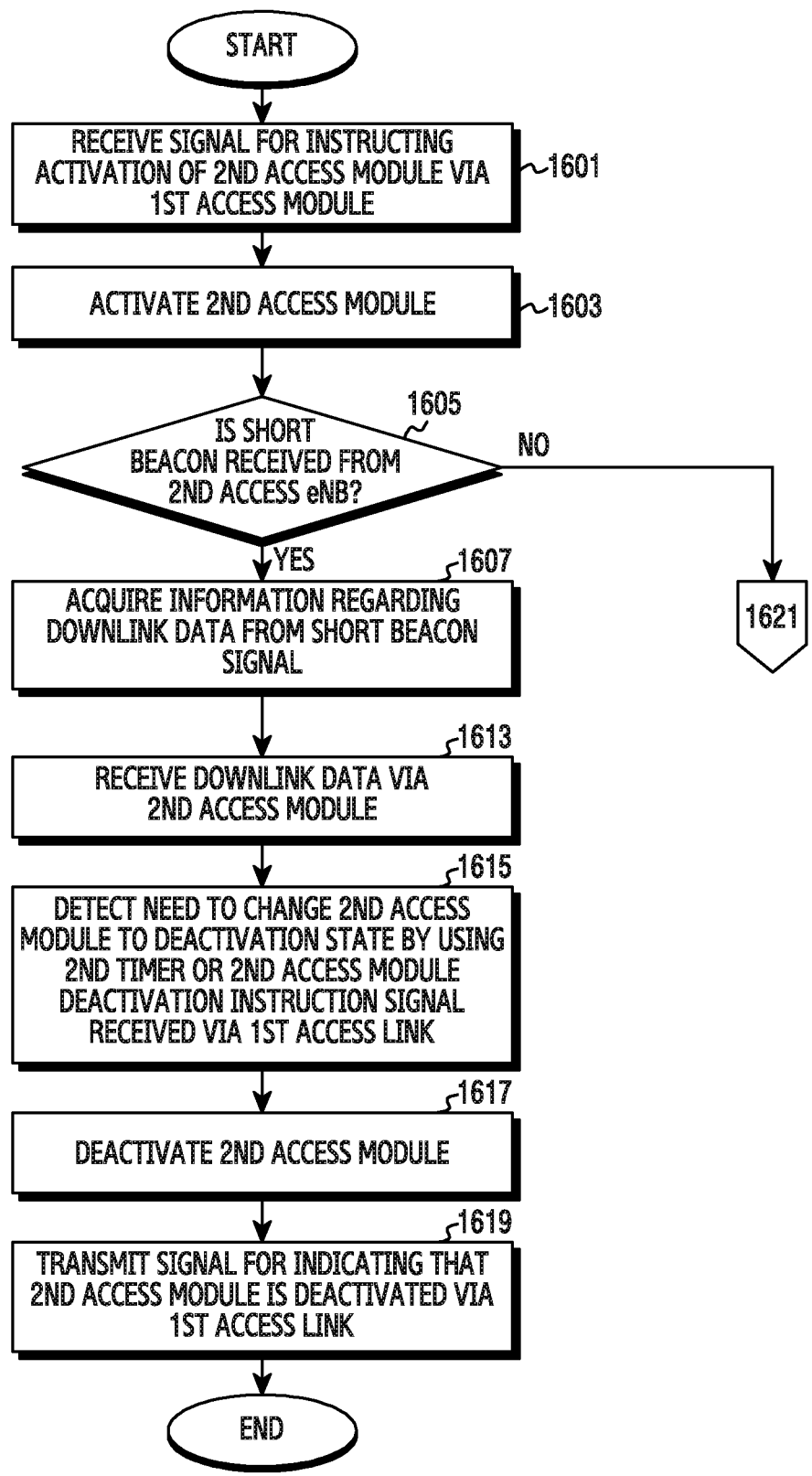
FIGS. 16A and 16B illustrate a procedure of operating a UE according to an embodiment of the present disclosure.
Figure 16B:
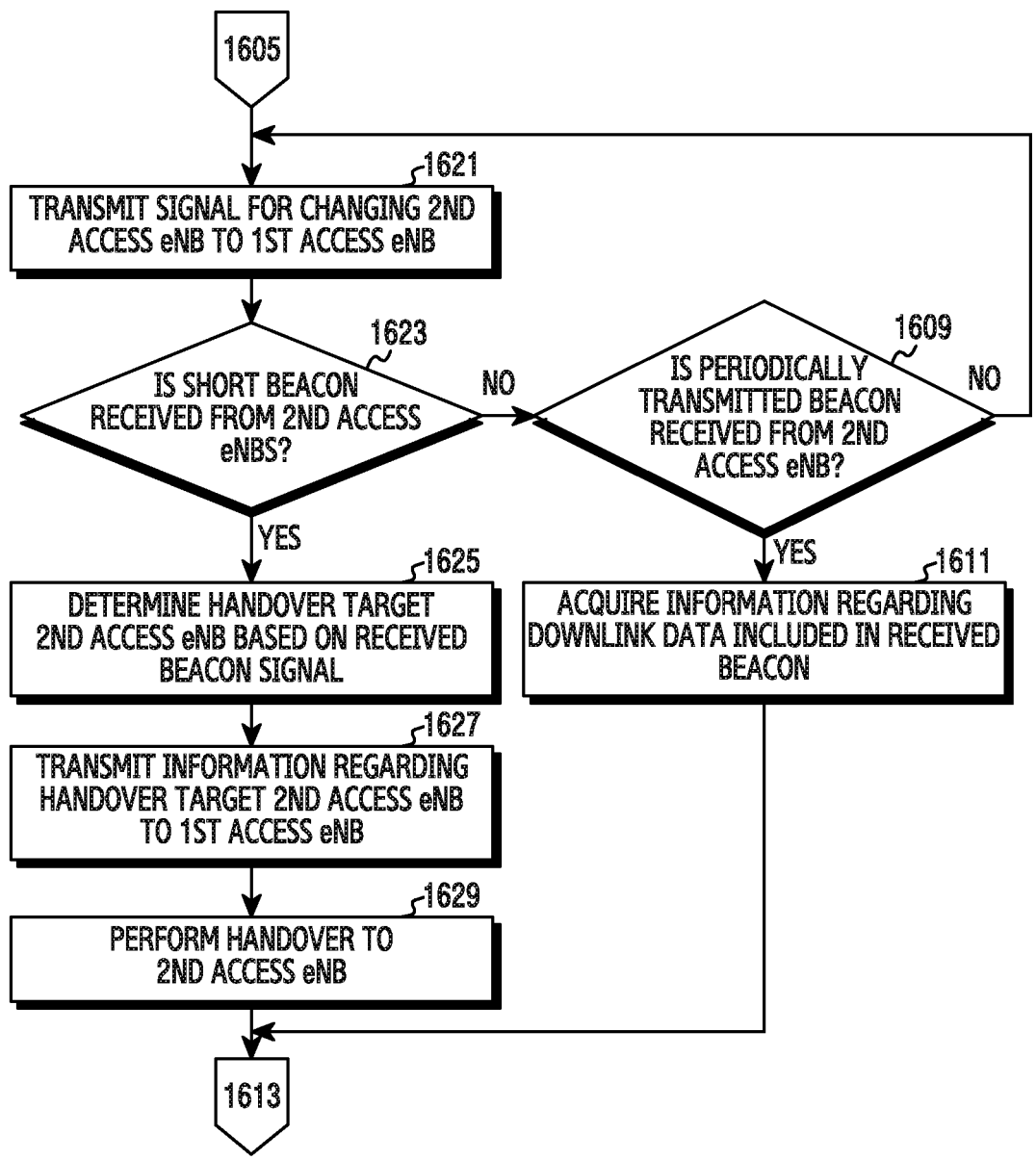

FIGS. 16A and 16B illustrate a procedure of operating a UE according to an embodiment of the present disclosure.

Referring to FIGS. 16A and 16B, in operation 1601, the UE 620 receives a signal for instructing activation of a $2^{nd}$ access module via a $1^{st}$ access module. For example, the UE 620 may receive the $2^{nd}$ access module activation instruction signal transmitted via a $1^{st}$ access link from the $1^{st}$ access eNB 600 by using the $1^{st}$ access module. In this case, the $2^{nd}$ access module of the UE 620 may be in a deactivation state.

In operation 1603, the UE 620 may activate the $2^{nd}$ access module. For example, the UE 620 may control the $2^{nd}$ access module 1920 operating in the deactivation state to operate in the activation state.

In operation 1605, the UE 620 examines whether a short beacon signal is received from the $2^{nd}$ access eNB 610. If the short beacon signal is received, the UE 620 may acquire information required to receive downlink data from the short beacon signal in operation 1607, and may proceed to operation 1613. According to various embodiments of the present disclosure, operations 1605 and 1607 may be skipped.

On the other hand, if the short beacon signal is not received, in operation 1621, the UE 620 may transmit to the $1^{st}$ access eNB a signal for changing the $2^{nd}$ access eNB. For example, if the short beacon signal is not received within a short beacon reception time from a time of activating the $2^{nd}$ access module, the UE 620 may determine that it is difficult to receive a signal of the $2^{nd}$ access eNB, and thus may transmit to the $1^{st}$ access eNB a signal for indicating that there is a need to change the $2^{nd}$ eNB.

Thereafter, in operation 1623, the UE 620 examines whether the short beacon signal is received from at least one $2^{nd}$ access eNB. If the short beacon signal is not received from the at least one $2^{nd}$ access eNB, the UE 620 proceeds to operation 1609.

Otherwise, upon receiving the short beacon signal from the at least one $2^{nd}$ access eNB, proceeding to operation 1625, the UE 620 determines a $2^{nd}$ access eNB as a handover target based on the received short beacon signal, and in operation 1627, transmits information regarding the $2^{nd}$ access eNB as the handover target to the $1^{st}$ access eNB 600. Thereafter, in operation 1629, the UE 620 performs a handover process on the $2^{nd}$ access eNB, and proceeds to operation 1613.

Meanwhile, in operation 1609, the UE 620 detects whether a periodically transmitted beacon is received from the $2^{nd}$ access eNB. If the beacon is not received from the $2^{nd}$ access eNB 610, the UE 620 returns to operation 1605.

Otherwise, if the beacon is received from the $2^{nd}$ access eNB 610, in operation 1611, the UE 620 acquires information required to receive downlink data included in the received beacon.

In operation 1613, the UE 620 receives downlink data from the $2^{nd}$ access eNB 610 via the $2^{nd}$ access module.

In operation 1615, the UE 620 detects that the $2^{nd}$ access module needs to be changed to a deactivation state by using the $2^{nd}$ timer or the $2^{nd}$ access module deactivation instruction signal received via the $1^{st}$ access link. For example, the UE 620 may receive the signal for instructing deactivation of the $2^{nd}$ access module via the $1^{st}$ access link from the $1^{st}$ access eNB 600. The signal for instructing deactivation of the $2^{nd}$ access module may be a probe request signal. Further, the signal for instructing deactivation of the $2^{nd}$ access module may include a sequence number of a last downlink packet. For example, the UE 620 may deactivate the $2^{nd}$ access module immediately after the $2^{nd}$ access module deactivation instruction signal is received. For another example, the UE 620 may acquire the sequence number of the last downlink packet from the $2^{nd}$ access module deactivation instruction signal, and may deactivate the $2^{nd}$ access module after detecting that up to the last packet is received based on the acquired sequence number for the last packet. For another example, the UE 620 may detect that the $2^{nd}$ access module needs to be changed to the deactivation state based on the $2^{nd}$ timer which measures a pre-set time at a time when downlink data is received via the $2^{nd}$ access link from the $2^{nd}$ access eNB 610. For example, the UE 620 may determine that the $2^{nd}$ access module needs to be changed to the deactivation state if the downlink data is not additionally received until the pre-set time measured by the $2^{nd}$ timer expires. Herein, the $2^{nd}$ timer may be set to the same manner as the $2^{nd}$ timer of FIGS. 10A and 10B.

Upon detecting that the $2^{nd}$ access module needs to be changed to the deactivation state, in operation 1617, the UE 620 may deactivate the $2^{nd}$ access module. For example, the UE 620 may perform at least one of the aforementioned operations 1 to 3. According to the embodiment of the present disclosure, before changing the $2^{nd}$ access module to the deactivation state, as shown in FIG. 13, the UE 620 may set values of the Power Mgmt 1300 and More Data 1301 in the frame control field in the WLAN 802.11 MAC header to 1 and 1 respectively, and may transmit the values to the $2^{nd}$ access eNB 610.

In operation 1619, the UE 620 may transmit a signal for indicating that the $2^{nd}$ access module is deactivated to the $1^{st}$ access eNB 600 via the $1^{st}$ access link. According to the embodiment of the present disclosure, the UE 620 may indicate that the $2^{nd}$ access module is deactivated to the $1^{st}$ access eNB 600 by using a probe response signal. According to another embodiment of the present disclosure, the UE 620 may indicate that the $2^{nd}$ access module is deactivated by using a PDCP feedback signal for indicating a sequence number of a received last packet. According to another embodiment of the present disclosure, the UE 620 may not transmit the signal for indicating that the $2^{nd}$ access module is deactivated.

Thereafter, the UE 620 ends the procedure according to the embodiment of the present disclosure.

Figure 17:
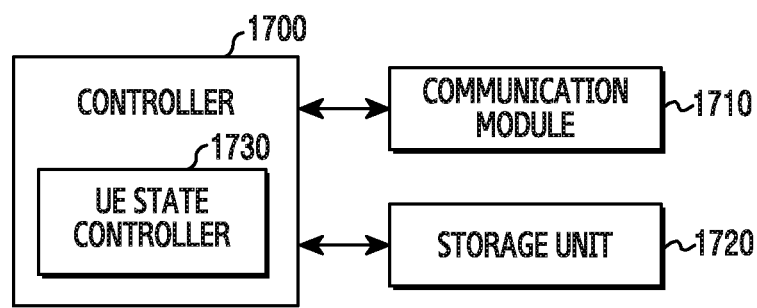
FIG. 17 illustrates a block diagram of a $1^{st}$ access eNB according to an embodiment of the present disclosure.

FIG. 17 illustrates a block diagram of a $1^{st}$ access eNB according to an embodiment of the present disclosure.

Referring to FIG. 17, the $1^{st}$ access eNB 600 may include a controller 1700, a communication module 1710, and a storage unit 1720.

The controller 1700 may control and process an overall operation of the $1^{st}$ access eNB 600. For example, the controller 1700 controls and processes a function for providing a communication service for a $1^{st}$ access system to the UE 620, and controls and processes a function for effectively managing communication for a $2^{nd}$ access system of the UE 620. For example, the controller 1700 may include a UE state controller 1730 for controlling a state of a $2^{nd}$ access module.

The controller 1700 detects traffic to be transmitted to the UE 620 via the $2^{nd}$ access eNB. According to the embodiment of the present disclosure, the controller 1700 may detect traffic to be transmitted to the UE 620 via the $2^{nd}$ access eNB from a higher network node. According to another embodiment of the present disclosure, the controller 1700 may receive a downlink traffic generation report signal from the $2^{nd}$ access eNB 610, and thus may detect a presence of the traffic to be transmitted to the UE 620 via the $2^{nd}$ access eNB. According to another embodiment of the present disclosure, to distribute a load for a $1^{st}$ access link, the controller 1700 may determine to transmit to the $2^{nd}$ access eNB 610 downlink data to be transmitted to the UE 620, and may detect the generation of the traffic to be transmitted to the UE 620 via the $2^{nd}$ access eNB.

Further, the controller 1700 stores and manages state information of the $2^{nd}$ access module of the UE 620. If the state information of the $2^{nd}$ access module of the UE 620, which is stored in the storage unit 1720, indicates an activation state, the controller 1700 may identify that it is a state in which the UE 620 can receive downlink data via the $2^{nd}$ access module, and may perform a function for transmitting the downlink data to the $2^{nd}$ access eNB 610.

If the state information of the $2^{nd}$ access module of the UE 620, which is stored in the storage unit 1720, indicates the deactivation state, the controller 1700 may perform a function for transmitting a signal for instructing activation of the $2^{nd}$ access module to the UE 620 via the $1^{st}$ access link. The signal for instructing activation of the $2^{nd}$ access module may be transmitted by using any one of an RRC reconfiguration message, a MAC CE, and a PDCCH based on how quickly the $2^{nd}$ access module of the UE 620 must be activated. The signal for instructing activation of the $2^{nd}$ access module may include information for indicating whether the $2^{nd}$ access eNB 610 transmits a short beacon.

After transmitting the signal for instructing activation of the $2^{nd}$ access module to the UE 620 via the $1^{st}$ access link, the controller 1700 may store the state information of the $2^{nd}$ access module of the UE 620 by changing from the deactivation state to the activation state.

According to the embodiment of the present disclosure, the controller 1700 may instruct to transmit the short beacon to the $2^{nd}$ access eNB 610. The short beacon may be configured by including only some pieces of information among a plurality of pieces of information included in a well-known beacon signal.

Further, according to the embodiment of the present disclosure, the controller 1700 may receive from the UE 620 a signal for indicating that there is a need to change the $2^{nd}$ access eNB. In this case, the controller 1700 may select at least one $2^{nd}$ access eNB, and may instruct to transmit the short beacon to the selected $2^{nd}$ access eNB. The selected $2^{nd}$ access eNB may include a $2^{nd}$ access eNB to which the UE 620 previously has access, and may include a $2^{nd}$ access eNB neighboring to the $2^{nd}$ access eNB to which the UE 620 previously has access. The controller 1700 may instruct to transmit the short beacon by selecting at least one $2^{nd}$ access eNB, based on a pre-stored $2^{nd}$ access eNB list. Further, the controller 1700 may receive information regarding the $2^{nd}$ access eNB as a handover target from the UE 620, and may perform a handover process for the $2^{nd}$ access eNB of the UE 620 based on the received information. For example, the controller 1700 may transmit an additional request signal including information of the UE 620 to the target $2^{nd}$ access eNB, may receive an additional request response signal from the target $2^{nd}$ access eNB, and may configure a data path for the target $2^{nd}$ access eNB and the UE 620. Further, the controller 1700 may transmit a radio resource control connection reconfiguration signal to the UE 620, and may control and process a function for receiving a radio resource control connection reconfiguration complete signal from the UE 620. Herein, the radio resource controller connection reconfiguration complete signal may include information (e.g., PDCP SN) for last downlink data received from the $2^{nd}$ access eNB to which the UE previously has access. Upon receiving the radio resource control connection reconfiguration complete signal, the controller 1700 transmits downlink data for the UE 620 to the $2^{nd}$ access eNB to which the UE 620 is handed over. In this case, upon receiving the PDCP SN for the last downlink data from the UE 620, the controller 1700 may deliver downlink data subsequent to the PDCP SN to the $2^{nd}$ access eNB to which the UE 620 is handed over.

The controller 1700 transmits downlink data to the $2^{nd}$ access eNB 610, and starts an operation of the $1^{st}$ timer at a time of transmitting the downlink data. If downlink data of the UE 620 is additionally detected via the $2^{nd}$ access eNB 610 during the $1^{st}$ timer is running, the controller 1700 may transmit the additionally detected downlink traffic to the $2^{nd}$ access eNB 610, and may reset the $1^{st}$ timer. The controller 1700 examines whether the $1^{st}$ timer expires. For example, when the downlink data of the UE 620 is not additionally detected via the $2^{nd}$ access eNB 610 during the $1^{st}$ timer is running, it is examined whether the $1^{st}$ timer expires by measuring a pre-set time. If the $1^{st}$ timer does not expire, the controller 1700 examines whether a signal for requesting to control a state of the $2^{nd}$ access module of the UE 620 is received from the $2^{nd}$ access eNB 610.

If the signal for requesting to control the state of the $2^{nd}$ access module is not received, the controller 1700 examines whether downlink traffic to be transmitted to the UE 620 is additionally detected via the $2^{nd}$ access eNB 610. If the downlink traffic to be transmitted to the UE 620 is additionally detected via the $2^{nd}$ access eNB 610, the controller 1700 transmits the additionally detected downlink data to the $2^{nd}$ access eNB 610, and resets the $1^{st}$ timer. On the other hand, if the downlink traffic to be transmitted to the UE 620 is not additionally detected via the $2^{nd}$ access eNB 610, the controller 1700 re-examines whether the $1^{st}$ timer expires.

If the signal for requesting to control the $2^{nd}$ access module state of the UE 620 is received from the $2^{nd}$ access eNB 610, the controller 1700 transmits the signal for instructing activation of the $2^{nd}$ access module of the UE 620 to the UE 620 via the $1^{st}$ access link. For example, if the state information stored in the controller 1700 and regarding the $2^{nd}$ access module of the UE 620 is not matched to the actual state of the $2^{nd}$ access module of the UE 620, the controller 1700 may receive the signal for requesting to control the state of the $2^{nd}$ access module from the $2^{nd}$ access eNB 610.

If the $1^{st}$ timer expires, the controller 1700 may transmit a signal for instructing deactivation of the $2^{nd}$ access module to the UE 620 via the $1^{st}$ access link. The signal for instructing deactivation of the $2^{nd}$ access module may be a probe request signal. The signal for instructing deactivation of the $2^{nd}$ access module may include a sequence number of a last downlink packet transmitted by the $1^{st}$ access eNB 600 to the $2^{nd}$ access eNB 610.

According to various embodiments of the present disclosure, if the $1^{st}$ access eNB 600 transmits timer information for deactivation to the UE 620 during an initial setup process with respect to the UE 620 or if the UE 620 has timer information pre-stored therein for deactivation, the controller 1700 may skip the operation of transmitting the signal for instructing deactivation of the $2^{nd}$ access module.

The controller 1700 may receive a signal for indicating that the $2^{nd}$ access module is deactivated from the UE 620 via the $1^{st}$ access link. The signal for indicating that the $2^{nd}$ access module is deactivated may be a probe response signal. According to the embodiment of the present disclosure, a process in which the controller 1700 receives the signal for indicating that the $2^{nd}$ access link is deactivated may be skipped. In this case, the controller 1700 may determine whether the UE 620 has received a last packet based on an ARQ response signal received from the UE 620.

The controller 1700 may store $2^{nd}$ access module state information of the UE 620 by changing to a deactivation state. For example, after a signal for indicating deactivation is transmitted, or after the $1^{st}$ timer expires, or after the signal for indicating the $2^{nd}$ access module is deactivated is received from the UE 620, the controller 1700 may store the $2^{nd}$ access module state information by changing to the deactivation state.

The communication module 1710 may transmit/receive a signal to/from the UE 620 via a link of the $1^{st}$ access system under the control of the controller 1700. Further, the communication module 1710 may transmit/receive a signal to/from the $2^{nd}$ access eNB 610 via a backhaul under the control of the controller 1700.

The storage unit 1720 stores a variety of data and programs required for an operation of the $1^{st}$ access eNB 600 under the control of the controller 1700. The storage unit 1720 stores state information of the $2^{nd}$ access module of the UE currently having access to the $1^{st}$ access eNB 600 under the control of the controller 1700. The storage unit 1720 may store a rule (e.g., deactivation timer information, $2^{nd}$ timer information) for deactivating the $2^{nd}$ access module of the UE 620 under the control of the controller 1700.

Figure 18:
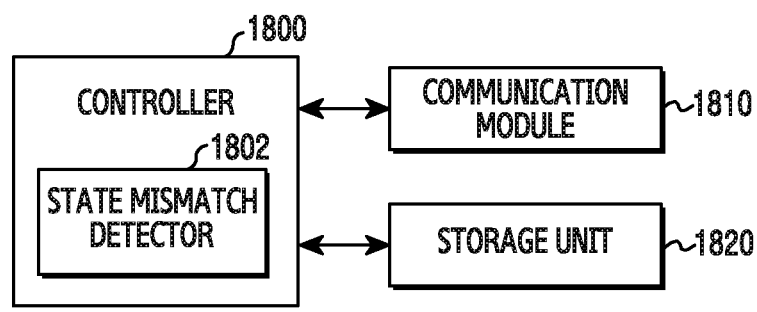
FIG. 18 illustrates a block diagram of a $2^{nd}$ access eNB according to an embodiment of the present disclosure.

FIG. 18 illustrates a block diagram of a $2^{nd}$ access eNB according to an embodiment of the present disclosure.

Referring to FIG. 18, the $2^{nd}$ access eNB 610 may include a controller 1800, a communication module 1810, and a storage unit 1820.

The controller 1800 may control and process an overall operation of the $2^{nd}$ access eNB 610. For example, the controller 1800 controls and processes a function for providing a communication service for a $2^{nd}$ access system to the UE 620, and controls and processes a function for effectively managing communication for the $2^{nd}$ access system of the UE 620. For example, the controller 1800 may include a state mismatch sensor 1802 for providing control such that a state of the $2^{nd}$ access module of the UE 620 is matched to state information of the $2^{nd}$ access module of the UE 620, which is managed by the $1^{st}$ access eNB 600.

Upon receiving a short beacon delivery instruction from the $1^{st}$ access eNB 600, the controller 1800 may transmit a short beacon to the UE 620. The short beacon may be configured by including only some pieces of information among a plurality of pieces of information included in a well-known beacon signal. As shown in FIG. 8B, a short beacon 852 is not transmitted at a time of transmitting a periodically repeated beacon 850 but is transmitted at a time point between beacon transmission periods. This is for allowing the UE 620 to activate the $2^{nd}$ access module, thereafter to receive the short beacon 852 instead of waiting until a next beacon reception duration, and thereafter to immediately receive downlink data. According to the embodiment of the present disclosure, the controller 1800 may not transmit the short beacon.

The controller 1800 transmits downlink data, received from the $1^{st}$ access eNB, to the UE 620 via the $2^{nd}$ access link, and determines whether a state mismatch of the $2^{nd}$ access module is detected based on a $1^{st}$ timer and a $2^{nd}$ timer. Herein, the $1^{st}$ timer starts an operation at a time when the $2^{nd}$ access eNB 610 receives downlink data from the $1^{st}$ access eNB 600. Further, the $2^{nd}$ timer starts an operation at a time when the $2^{nd}$ access eNB 610 transmits downlink data to the UE 620. For example, the $1^{st}$ timer and the $2^{nd}$ timer may be respectively the aforementioned network timer or UE timer of FIGS. 12A, 12B, 12C, and 12D. If the $1^{st}$ timer is in a running state (e.g., an ON state) and the $2^{nd}$ timer is in an expiry state (e.g., an OFF state), the controller 1800 may determine that a state mismatch of the $2^{nd}$ access module is detected. In this case, the controller 1800 is in a state in which the $2^{nd}$ access module of the UE 620 is in a deactivation state and state information of the $2^{nd}$ access module managed by the $1^{st}$ access eNB 600 indicates an activation state.

Upon detecting the state mismatch of the $2^{nd}$ access module based on the $1^{st}$ timer and the $2^{nd}$ timer, the controller 1800 transmits to the $1^{st}$ access eNB 600 a signal for requesting to control the state of the $2^{nd}$ access module. For example, if the state of the $2^{nd}$ access module of the UE 620 is the deactivation state and the state information of the $2^{nd}$ access module managed by the $1^{st}$ access eNB 600 indicates the activation state, the controller 1800 may transmit a signal for requesting to change the state of the $2^{nd}$ access module of the UE 620 from the deactivation state to the activation state. If the state of the $2^{nd}$ access module of the UE 620 is the deactivation state and the state information of the $2^{nd}$ access module managed by the $1^{st}$ access eNB 600 indicates the activation state, the controller 1800 may not transmit downlink data to the UE 620 and may buffer the downlink data, until the state of the $2^{nd}$ access module is changed to the activation state.

The controller 1800 may detect whether a last downlink packet is transmitted in a state where the state mismatch of the $2^{nd}$ access module is not detected based on the $1^{st}$ timer and the $2^{nd}$ timer. For example, if additional downlink data is not received until the $1^{st}$ timer expires, the controller 1800 determines that the last downlink data is received, and examines whether the downlink data is transmitted to the UE 620. For another example, if the additional downlink data is detected before the $1^{st}$ timer expires, the controller 1800 may determine that the last downlink traffic is not transmitted.

According to the embodiment of the present disclosure, if it is determined that the last downlink traffic is not transmitted, the controller 1800 determines whether the $2^{nd}$ timer for determining a time at which the $2^{nd}$ access module for the UE 620 is deactivated is close to an expiry time. For example, the controller 1800 may determine whether the $2^{nd}$ timer (or a UE timer) expires within a threshold time. If it is determined that the $2^{nd}$ timer expires within the threshold time, the controller 1800 may determine that the $2^{nd}$ access module of the UE 620 is deactivated within the threshold time, and may transmit a signal for prohibiting deactivation of the $2^{nd}$ access module to the UE 620. For example, the controller 1800 may transmit the signal for prohibiting deactivation of the $2^{nd}$ access module to the UE 620 so that the $2^{nd}$ access module of the UE 620 is kept in an activation state. In this case, the signal for prohibiting deactivation of the $2^{nd}$ access module may include information regarding a time of prohibiting deactivation. According to the embodiment of the present disclosure, instead of transmitting the signal for prohibiting deactivation of the $2^{nd}$ access module, the controller 1800 may increase a priority for downlink data transmission of the UE 620. For example, if there is downlink data for a plurality of UEs, the controller 1800 may transmit downlink data for the UE 620 expected to be deactivated within a specific time by preferentially scheduling it.

If it is determined that the last downlink data is not transmitted, the controller 1800 may continuously determine whether the state of the $2^{nd}$ access module is mismatched, while transmitting downlink data to the UE 620 until transmission of the last downlink data is detected.

In addition, the controller 1800 may analyze the Power Mgmt 1300 and More Data 1301 included in the WLAN 802.11 MAC header received from accessed UEs, and thus may determine whether all of the accessed UEs indicate the change to the deactivation state of the $2^{nd}$ access module. If all of the accessed UEs indicate the change to the deactivation state of the $2^{nd}$ access module, the controller 1800 may not perform an operation of periodically transmitting a beacon signal. In this case, the controller 1800 may perform the operation of transmitting the beacon signal under the control of the $1^{st}$ access eNB 600. For example, upon receiving downlink data to be transmitted to the UE 620 from the $1^{st}$ access eNB 600, the controller 1800 may detect that it is required to resume the operation of periodically transmitting the beacon signal, and may periodically transmit the beacon signal.

The communication module 1810 may transmit/receive a signal to/from the UE 620 via a link of the $2^{nd}$ access system under the control of the controller 1800. Further, the communication module 1810 may transmit/receive a signal to/from the $1^{st}$ access eNB 600 via a backhaul under the control of the controller 1800.

The storage unit 1820 stores a variety of data and programs required for an operation of the $2^{nd}$ access eNB 610 under the control of the controller 1800. The storage unit 1820 may store state information of the $2^{nd}$ access module of the UE 620, which is received from the $1^{st}$ access eNB. The storage unit 1820 may store state information of the $2^{nd}$ access module of the UE 620, which is received from the UE 620. Further, the storage unit 1820 may store a rule (e.g., deactivation timer information, $2^{nd}$ timer information) for deactivating the $2^{nd}$ access module of the UE 620 under the control of the controller 1800.

Figure 19:
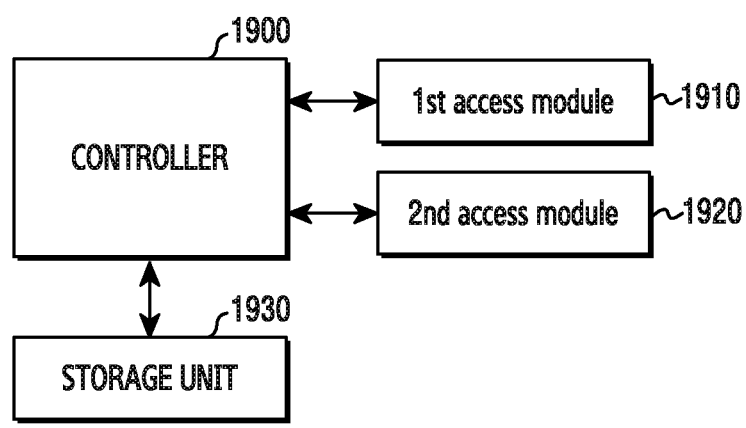
FIG. 19 illustrates a block diagram of a UE according to an embodiment of the present disclosure.

FIG. 19 illustrates a block diagram of a UE according to an embodiment of the present disclosure.

Referring to FIG. 19, the UE 620 may include a controller 1900, a $1^{st}$ access module 1910, a $2^{nd}$ access module 1920, and a storage unit 1930.

The controller 1900 controls and processes an overall operation of the UE 620. According to the embodiment of the present disclosure, the controller 1900 controls and processes a function for controlling and changing an activation state of the $2^{nd}$ access module 1920 in a state where the $1^{st}$ access module 1910 is kept in an activation state.

The controller 1900 receives the signal for instructing activation of the $2^{nd}$ access module via the $1^{st}$ access module 1910. For example, the controller 1900 may process a function for receiving the $2^{nd}$ access module activation instruction signal transmitted via a $1^{st}$ access link from the $1^{st}$ access eNB 600 by using the $1^{st}$ access module 1910. In this case, the $2^{nd}$ access module 1920 of the UE 620 may be in an inactive state.

The controller 1900 may activate the $2^{nd}$ access module 1920 based on the signal for instructing activation of the $2^{nd}$ access module. For example, the controller 1900 may control the $2^{nd}$ access module 1920 operating in the deactivation state to operate in the activation state.

The controller 1900 examines whether a short beacon signal is received from the $2^{nd}$ access eNB 610 via the $2^{nd}$ access module 1920. If the short beacon signal is received, the controller 1900 may acquire information required to receive downlink data from the short beacon signal. Otherwise, if the short beacon signal is not received, the controller 1900 examines whether a beacon transmitted periodically from the $2^{nd}$ access eNB 610 is received via the $2^{nd}$ access module 1920. If the beacon is received from the $2^{nd}$ access eNB 610, the controller 1900 may acquire information required to receive downlink data from a TIM included in the received beacon. Further, if the short beacon signal is not received, the controller 1900 may transmit to the $1^{st}$ access eNB a signal for indicating that there is a need to change the $2^{nd}$ access eNB. For example, if the short beacon signal is not received within a short beacon reception time from a time of activating the $2^{nd}$ access module, the controller 1900 may determine that it is difficult to receive a signal of the $2^{nd}$ access eNB, and thus may transmit to the $1^{st}$ access eNB a signal for indicating that there is a need to change the $2^{nd}$ eNB is. If the short beacon signal is received from at least one $2^{nd}$ access eNB, the controller 1900 may determine a handover target $2^{nd}$ access eNB based on the received short beacon signal. The controller 1900 may transmit information regarding the target $2^{nd}$ access eNB to the $1^{st}$ access eNB 600, and may perform a handover to the target $2^{nd}$ access eNB. Further, the controller 1900 may receive downlink data via the $2^{nd}$ access module 1920 from the $2^{nd}$ access eNB 610.

The controller 1900 detects that the $2^{nd}$ access module 1920 needs to be changed to a deactivation state by using the $2^{nd}$ timer or the $2^{nd}$ access module deactivation instruction signal received by the $1^{st}$ access module 1910 via the $1^{st}$ access link. For example, the controller 1900 may receive the signal for instructing deactivation of the $2^{nd}$ access module via the $1^{st}$ access link from the $1^{st}$ access eNB 600 by using the $1^{st}$ access module 1910. The signal for instructing deactivation of the $2^{nd}$ access module may be a probe request signal. Further, the signal for instructing deactivation of the $2^{nd}$ access module may include a sequence number of a last downlink packet. According to the embodiment of the present disclosure, the controller 1900 may deactivate the $2^{nd}$ access module 1920 immediately after the $2^{nd}$ access module deactivation instruction signal is received. In another embodiment of the present disclosure, the controller 1900 may acquire the sequence number of the last downlink packet from the $2^{nd}$ access module deactivation instruction signal, and may deactivate the $2^{nd}$ access module 1920 after detecting that up to the last packet is received based on the acquired sequence number for the last packet. According to another embodiment of the present disclosure, the controller 1900 may detect that the $2^{nd}$ access module 1920 needs to be changed to the deactivation state based on the $2^{nd}$ timer which measures a pre-set time at a time when downlink data is received via the $2^{nd}$ access module 1920 from the $2^{nd}$ access eNB 610. For example, the controller 1900 may determine that the $2^{nd}$ access module 1920 needs to be changed to the deactivation state if the downlink data is not additionally received until the pre-set time measured by the $2^{nd}$ timer expires. Herein, the $2^{nd}$ timer may be set to the same manner as the $2^{nd}$ timer of FIGS. 10A and 10B.

Upon detecting that the $2^{nd}$ access module 1920 needs to be changed to the deactivation state, the controller 1900 may deactivate the $2^{nd}$ access module 1920. For example, the controller 1900 may perform at least one of the aforementioned operations 1 to 3. According to the embodiment of the present disclosure, before changing the $2^{nd}$ access module 1920 to the deactivation state, as shown in FIG. 13, the controller 1900 may set values of the Power Mgmt 1300 and More Data 1301 in the frame control field in the WLAN 802.11 MAC header to 1 and 1 respectively, and may transmit the values to the $2^{nd}$ access eNB 610.

The controller 1900 may transmit a signal for indicating that the $2^{nd}$ access module is deactivated to the $1^{st}$ access eNB 600 via the $1^{st}$ access module 1910. According to the embodiment of the present disclosure, the controller 1900 may indicate that the $2^{nd}$ access module is deactivated to the $1^{st}$ access eNB 600 by using a probe response signal. According to another embodiment of the present disclosure, the controller 1900 may indicate that the $2^{nd}$ access module is deactivated by using a PDCP feedback signal for indicating a sequence number of a received last packet. According to another embodiment of the present disclosure, the controller 1900 may not transmit the signal for indicating that the $2^{nd}$ access module is deactivated.

The $1^{st}$ access module 1910 may transmit/receive a signal to/from the $1^{st}$ access eNB 600 via the $1^{st}$ access link under the control of the controller 1900. According to the embodiment of the present disclosure, the $1^{st}$ access module 1910 is kept in the activation state.

The $2^{nd}$ access module 1920 may transmit/receive a signal to/from the $2^{nd}$ access eNB 610 via the $2^{nd}$ access link under the control of the controller 1900. According to the embodiment of the present disclosure, the $2^{nd}$ access module 1920 may operate in an active statue or a deactivation state under the control of the controller 1900.

The storage unit 1930 stores a variety of data and programs required for an operation of the UE 620 under the control of the controller 1900. The storage unit 1930 may store a rule (e.g., deactivation timer information, $2^{nd}$ timer information) for deactivating the $2^{nd}$ access module 1920 under the control of the controller 1900.

In the aforementioned embodiment of the present disclosure, if the $2^{nd}$ access system is a WLAN, an operator AP may be managed together with the $2^{nd}$ access eNB 610 described in the aforementioned embodiment. However, it may be difficult to manage a private AP together with the aforementioned $2^{nd}$ access eNB 610. Therefore, hereinafter, it is described a case where the embodiment of the present disclosure is applied to a situation in which the operator AP and the private AP coexist. Hereinafter, for convenience of explanation, according to the aforementioned embodiments of the present disclosure, an operation of changing and controlling an activation state of the $2^{nd}$ access module (e.g., a WLAN module) while keeping activation of the $1^{st}$ access module (e.g., an LTE module) of the UE 620 is called an 'LTE-WLAN Interworking/Integration (I/I) operation'.

Figure 20:
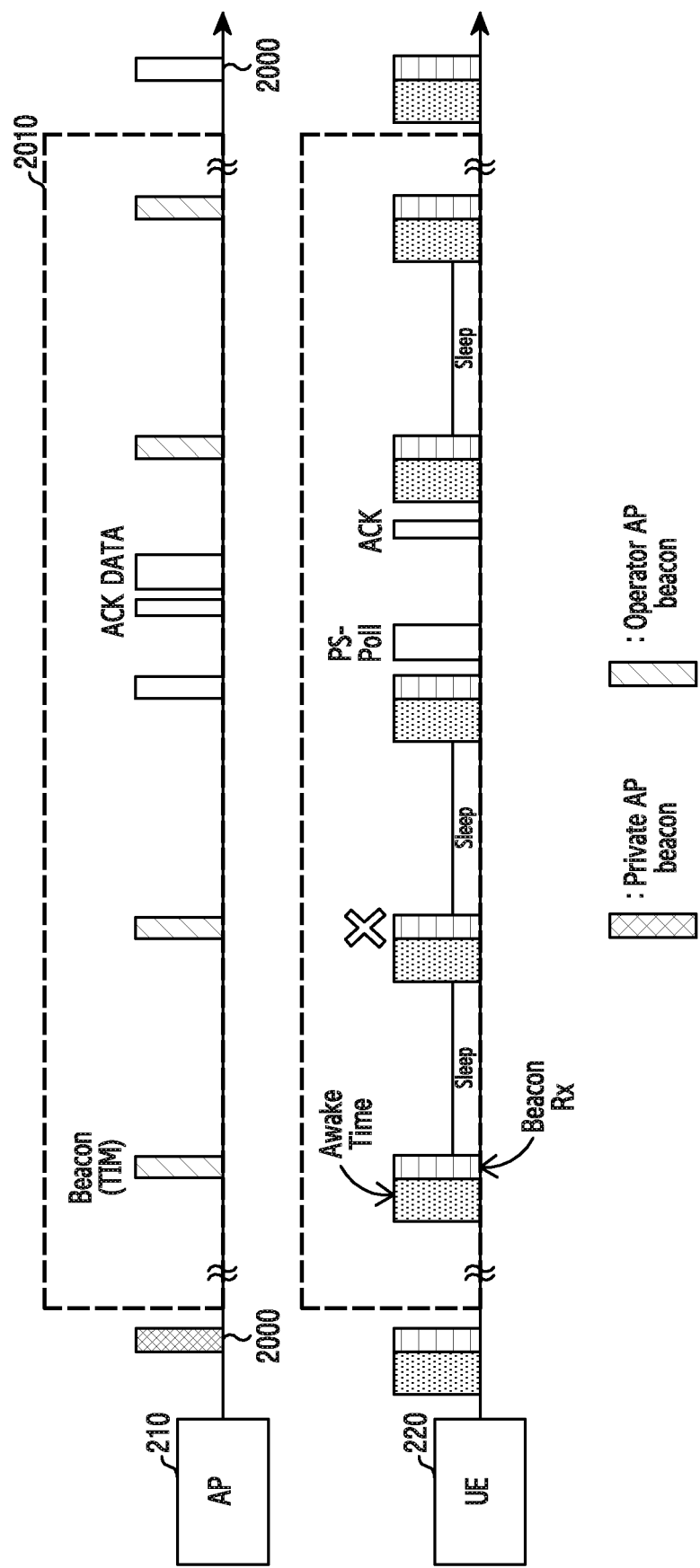
FIG. 20 illustrates an operation of a UE and each AP in an environment in which an operator AP and a private AP coexist according to an embodiment of the present disclosure.

FIG. 20 illustrates an operation of a UE and each AP in an environment in which an operator AP and a private AP coexist according to an embodiment of the present disclosure.

Figure 21:
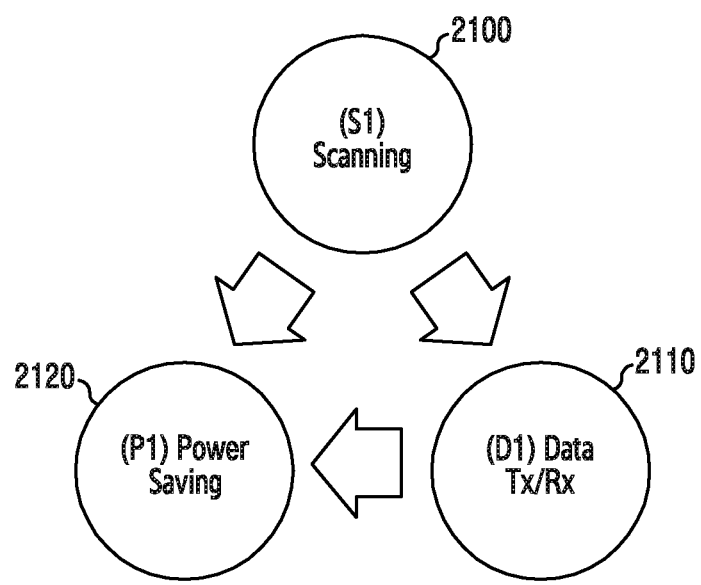
FIG. 21 illustrates an operation state of an AP according to an embodiment of the present disclosure.

FIG. 21 illustrates an operation state of an AP according to an embodiment of the present disclosure.

Referring to FIGS. 20 and 21, in general, a beacon 2000 of a private AP (PA) has a longer period than a beacon of an operator AP 210. Therefore, in a situation in which the operator AP 210 and the private AP coexist, a UE 220 or 620 may perform an LTE-WLAN I/I operation in a duration 2010 between periods in which the beacon 2000 is transmitted from the private AP. For example, the UE 620 may deactivate a WLAN module while keeping activation of an LTE module during the duration 2010 in which the beacon 2000 is not transmitted from the private AP. For another example, while keeping activation of the LTE module for the duration 2010 in which the beacon 2000 is not transmitted from the private AP, the UE 620 may operate the WLAN module in an activation state in a part of a duration in which downlink data via the operator AP 210 is present and may operate the WLAN module in a deactivation state in a part of the duration in which the downlink data via the operator AP 210 is not present.

In the environment in which the operator AP 210 and the private AP coexist, the LTE-WLAN I/I operation of the UE 620 may vary depending on an operation state for the private AP as shown in FIG. 21. It is assumed herein that the UE 620 has access to the operator AP 210.

For example, the UE 620 may perform scanning to have access to the private AP in a state of accessing the operator AP 210. If the UE 620 is in a state (S1) 2100 for periodically performing scanning to discover the private AP, the UE 620 may perform scanning on the private AP according to a pre-set period, and may perform the LTE-WLAN I/I operation in a duration in which the scanning is not performed. For example, the UE 620 may deactivate the WLAN module while keeping activation of the LTE module during scanning is not performed on the private AP. For another example, while keeping activation of the LTE module during scanning is not performed on the private AP, the UE 620 may operate the WLAN module in an activation state in a part of a duration in which downlink data via the operator AP 210 is present, and may operate the WLAN module in a deactivation state in a part of a duration in which the downlink data via the operator AP 210 is not present.

For another example, the UE 620 may have access to the private AP in a state of having access to the operator AP 210 by using a time division multiple access (TDMA) scheme. In this case, if the UE 620 is in a state (D1) 2110 of transmitting/receiving data to/from the private AP, the UE 620 activates the WLAN module to transmit/receive data to/from the private AP, and stops the LTE-WLAN I/I operation for the operator AP 210 for a duration in which data is transmitted/received to/from the private AP.

For another example, the UE 620 may operate with a PSM mode for the private AP in a state of having access simultaneously to the operator AP 210 and the private AP by using the TDMA scheme. In case of a state (P1) 2120 of operating with the PSM mode for the private AP, the UE 620 may activate the WLAN module to receive a beacon of the private AP in a beacon transmission period of the private AP, and may perform the LTE-WLAN I/I operation for the operator AP 210 for a duration (e.g., 2010) in which the beacon of the private AP is not transmitted. For example, the UE 620 may deactivate the WLAN module while keeping activation of the LTE module for a duration in which the beacon of the private AP is not transmitted. For another example, while keeping activation of the LTE module for the duration in which the beacon is not transmitted from the private AP, the UE 620 may operate the WLAN module in an activation state in a part of a duration in which downlink data via the operator AP 210 is present and may operate the WLAN module in a deactivation state in a part of the duration in which the downlink data via the operator AP 210 is not present.

In the environment in which the operator AP 210 and the private AP coexist, the UE 620 may provide a user interface as shown in FIGS. 22A to 22D.

FIGS. 22A to 22D illustrate a user interface for an operation of a UE in an environment in which an operator AP and a private AP coexist according to an embodiment of the present disclosure.

Figure 22A:
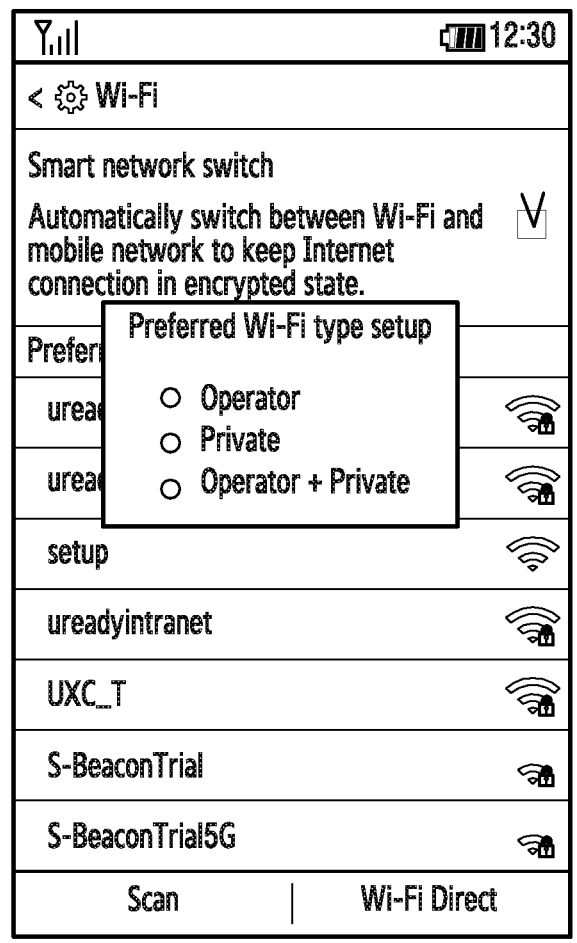
FIGS. 22A to 22D illustrate a user interface for an operation of a UE in an environment in which an operator AP and a private AP coexist according to an embodiment of the present disclosure.

Referring to FIG. 22A, the UE 620 may display a message for requesting to determine a preferred Wi-Fi type when a Wi-Fi function is on to have access to an AP. For example, a message may be displayed to inquire whether it is preferred to use the operator AP, or whether it is preferred to use the private AP, or whether it is preferred to simultaneously use the operator AP and the private AP. In this case, based on the preferred Wi-Fi type determined by a user, the UE 620 may discover the operator AP to have access thereto, may discover the private AP to have access thereto, and may simultaneously have access to the operator AP and the private AP.

Figure 22B:
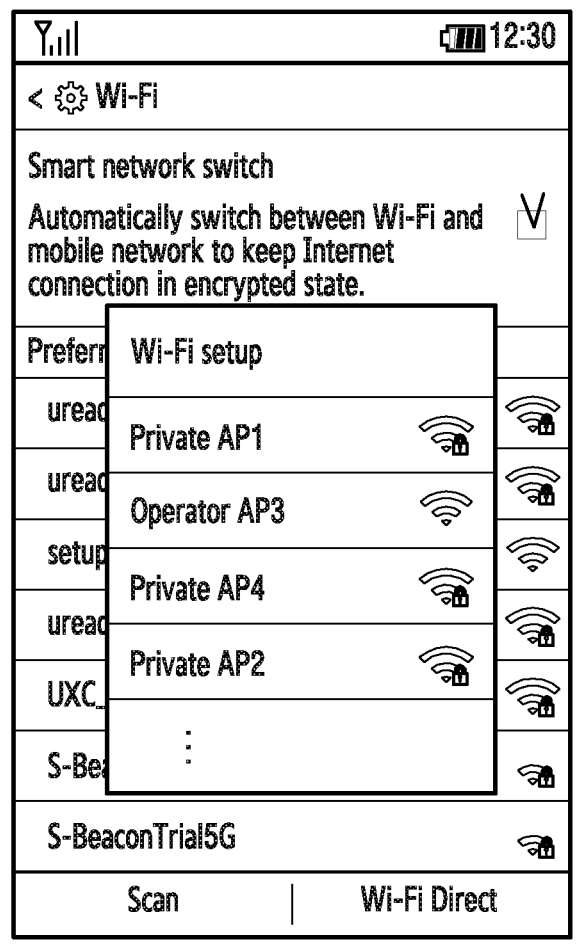

Referring to FIG. 22B, the UE 620 may display a list of discovered APs, and may indicate whether each AP is the private AP or the operator AP. Further, the UE 620 may provide a user interface to allow the user to select one or two APs. For example, if the operator AP is selected from the AP list, it may be provided a user interface capable of additionally selecting one of the private APs. For another example, if the private AP is selected from the AP list, it may be provided a user interface capable of additionally selecting one of the operator APs.

Figure 22C:
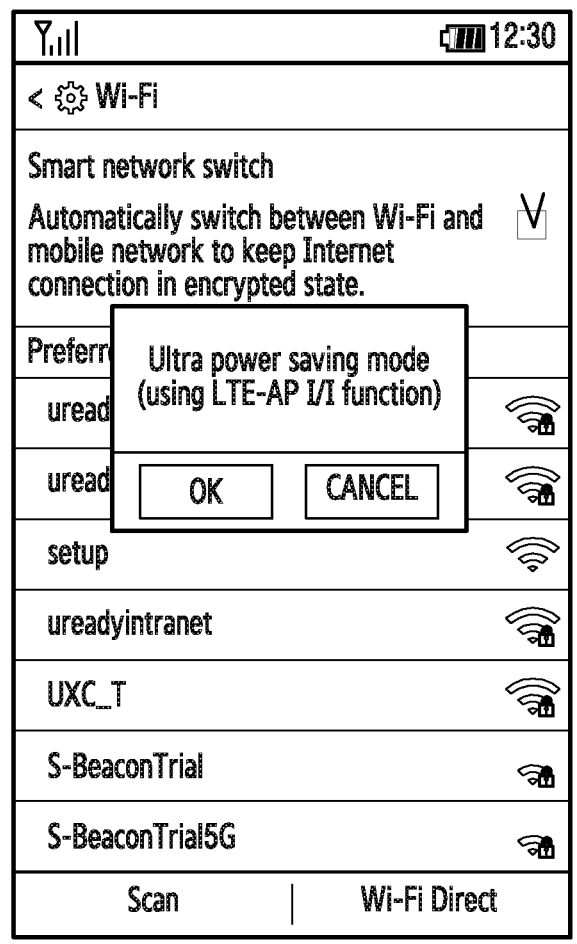

Referring to FIG. 22C, the UE 620 may display a message for inquiring whether to perform ultra power saving by using an LTE-WLAN I/I function for the operator AP in a state of having access to the operator AP or in a state of attempting the access to the operator AP. If it is determined to use the LTE-WLAN I/I function by a user input, an operation described above with reference to FIG. 20 and FIG. 21 may be performed.

Figure 22D:
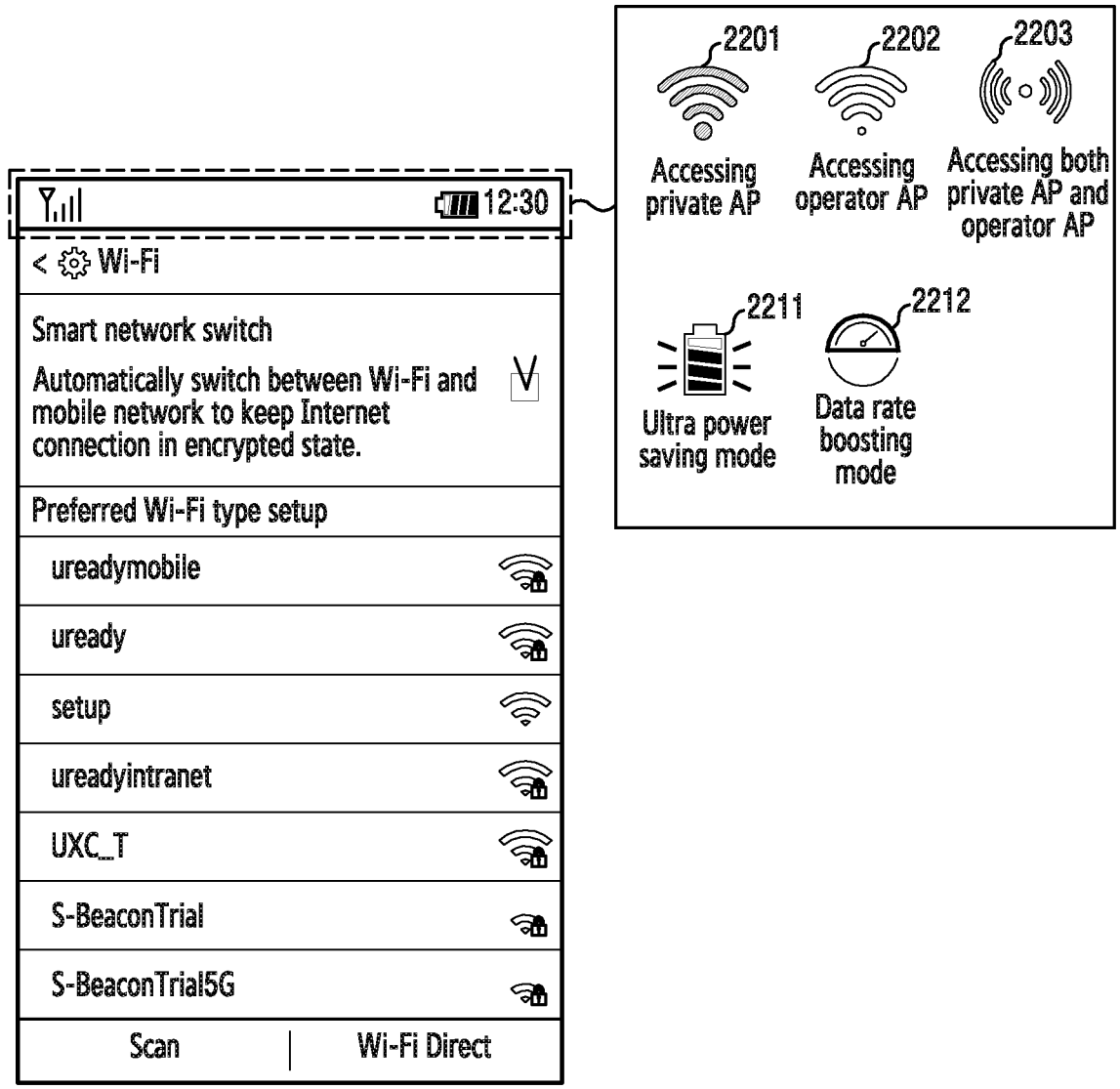

Referring to FIG. 22D, the UE 620 may display an icon for indicating a currently accessed AP in a portion of a screen. For example, the UE 620 may display any one icon among an icon 2201 for indicating that it has currently access to the private AP, an icon 2202 for indicating that it has currently access to the operator AP, and an icon 2203 for indicating that it has access simultaneously to the private AP and the operator AP, so that the user can recognize a type of the currently accessed AP.

Further, as shown in FIG. 22D, the UE 620 may display icons 2211 and 2212 in a portion of a screen according to the current usage of the LTE-WLAN I/I function. For example, if the WLAN module is in a deactivation state during the LTE-WLAN I/I function is used, the UE 620 may display the icon 2211 for indicating that it is operating with an ultra power saving mode of the UE. For another example, if the LTE module and the WLAN module are simultaneously activated during the LTE-WLAN I/I function is used, the UE 620 may display the icon 2212 for indicating that it is operating in a 'Data Rate Boosting mode'.

In the aforementioned embodiment of the present disclosure, it is described a case where a UE supporting a multi-radio access technology keeps an activation state of some access modules among a plurality of access modules included in the UE, and controls an activation state of the other access modules. For example, it has been described in the embodiment of the present disclosure that the UE keeps an activation state of only one access module and deactivates the remaining other access modules, and thereafter monitors downlink traffic for other different radio access technologies by using the activated one access module so that the access module operates in the activation state only during the downlink traffic is present. In the following description, an access technology includes the meaning of the radio access technology.

However, according to various embodiments of the present disclosure, one UE may perform downlink monitoring on at least one different UE, and may control an activation state of at least one access module for the at least one different UE based on a result of the downlink monitoring. For example, a plurality of UEs may form a group, a representative UE in the group may perform downlink monitoring on different UEs in the group, and an activation state of an access module for the different UEs in the group may be controlled according to a result of the downlink monitoring.

Figure 23:
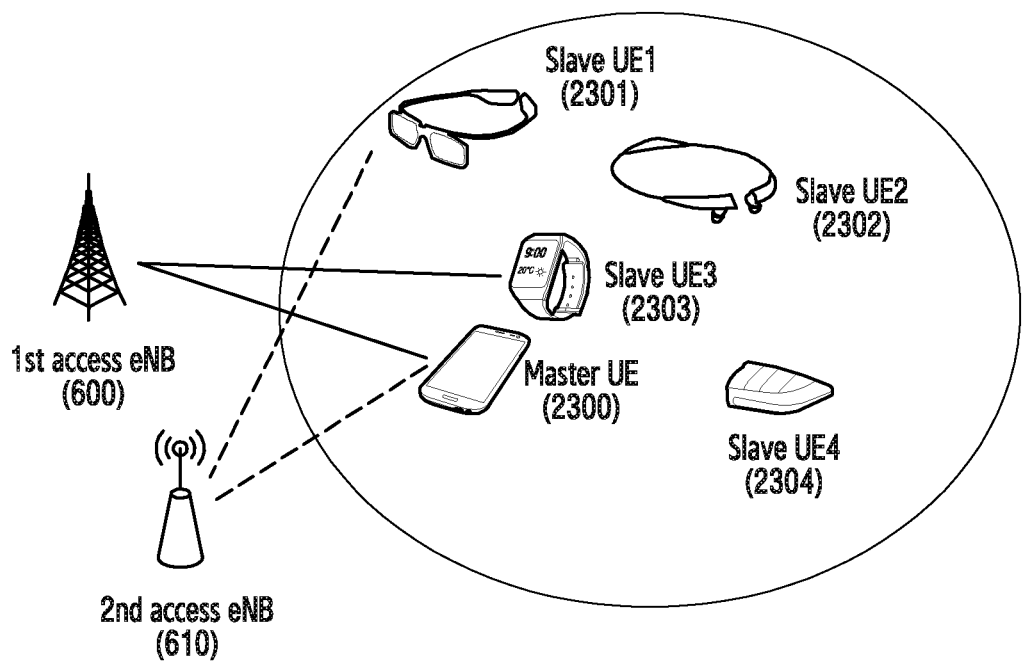
FIG. 23 illustrates a system structure in which a UE controls an activation state of an access module for at least one different UE according to an embodiment of the present disclosure.

FIG. 23 illustrates a system structure in which a UE controls an activation state of an access module for at least one different UE according to an embodiment of the present disclosure.

Referring to FIG. 23, each of a plurality of UEs 2300 to 2304 may support a multi-radio access technology. The plurality of UEs 2300 to 2304 may form a group by a user request. Each of the plurality of UEs 2300 to 2304 may form the group through mutual detection based on information pre-registered to each UE by a user, association history information with respect to a different UE, signal transmission/reception information with respect to neighboring UEs, and the like.

According to the embodiment of the present disclosure, each of the plurality of UEs 2300 to 2304 which have formed one group may determine a master UE (or a representative UE) based on information pre-registered by a user and information acquired through signal transmission/reception to/from a different UE in the group. For example, each of the plurality of UEs 2300 to 2304 may determine the master UE based on at least one of a multi-radio access technology supported by each UE, capacity of an access module of each UE, a remaining power level of each UE, reception signal quality for a $1^{st}$ access eNB and/or a $2^{nd}$ access eNB, and a topology. Herein, the topology may indicate a connection relation between the plurality of UEs, and may indicate a UE to/from which signals can be transmitted/received directly by each UE and a UE to/from which signals cannot be transmitted directly. For example, the topology may indicate the number of UEs to/from which signals can be transmitted/received by each UE via one-hop among UEs in the group. An operation of determining the master UE (or the representative UE) may be performed by only one UE among the plurality of UEs in the group or may be performed by each of the plurality of UEs. When the master UE is determined by each of the plurality of UEs, each of the plurality of UEs may determine the master UE in the same manner, and may not transmit/receive information regarding the master UE to/from different UEs in the group. On the other hand, if the master UE is determined only by one UE among the plurality of UEs in the group, the UE needs to transmit information regarding the determined master UE to different UEs in the group. Further, if the master UE is determined only by one UE among the plurality of UEs in the group, the UE may be determined by a user input or may be determined through signal transmission/reception to/from UEs in the group. Hereinafter, for convenience of explanation, a UE which performs downlink monitoring of different UEs in a group is called a master UE, and a UE of which at least one access module is controlled under the control of the master UE is called a slave UE.

Further, according to the embodiment of the present disclosure, a master UE 2300 in a group may determine a management access module for monitoring whether downlink traffic is generated for slave UEs 2301 to 2304 among access modules included in the master UE 2300. Herein, the management access module may be determined based on information pre-registered by a user or information acquired through signal transmission/reception to/from a different UE in the group. For example, the master UE 2300 may determine the management access module based on at least one of a multi-radio access technology supported by the master UE 2300, capacity of each access module supporting a different multi-access technology, reception signal quality with respect to each access module for a $1^{st}$ access eNB and/or a $2^{nd}$ access eNB, a channel occupation probability for the $1^{st}$ access eNB and/or the $2^{nd}$ access eNB, a type of currently accessed eNB (e.g., an operator AP or a private AP), whether downlink traffic monitoring of different devices in a group for each access module is possible, a power consumption amount of each access module, and a topology. Herein, the topology may indicate a connection relation between the plurality of UEs, and may indicate a UE to/from which signals can be transmitted/received directly by each UE and a UE to/from which signals cannot be transmitted directly. For example, the topology may indicate the number of UEs to/from which signals can be transmitted/received via one-hop among UEs in the group when each UE transmits/receives the signals by using a specific access module.

The master UE 2300 may select a control access module for controlling an activation state of an access module of the slave UEs 2301 to 2304. For example, the control access module may be used to transmit/receive a control signal for activating or deactivating a $1^{st}$ access module of the slave UE 2301 by the master UE 2300. The control access module may be identical to or different from the management access module. For example, the management access module may be a $1^{st}$ access module which transmits/receives a signal to/from a $1^{st}$ access eNB, and the control access module may be an access module (e.g., a Bluetooth low energy (BLE) module) capable of transmitting/receiving a signal with low power to/from a neighboring UE.

The master UE 2300 may transmit radio access technology information corresponding to the determined management access module and/or radio access technology information corresponding to the control access module to the slave UEs 2301 to 2304.

As described above, after the plurality of UEs 2300 to 2304 form one group, the master UE 2300 is determined, and if the management access module and the control access module are determined, the master UE 2300 may activate only the management access module and may deactivate the other access modules. If the management access module and the control access module are different in the master UE 2300, the master UE 2300 may persistently keep the control access module in an ON state, or only when there is a need to transmit/receive a signal for controlling an access module of a slave UE, may keep the control access module in the ON state. Further, the slave UEs 2301 to 2304 may keep only the control access module in an activation state, and may deactivate the other access modules. Herein, if the management access module of the master UE 2300 is a WLAN module supporting an unlicensed band, the management access module may be repetitively in an awake status and a sleep status according to a pre-set PSM mode, instead of continuously operating in the activation state. On the other hand, if the management access module of the master UE 2300 is an LTE module supporting a licensed band, the management access module may be continuously kept in the activation state.

According to the embodiment of the present disclosure, the master UE 2300 may transmit identification information of the master UE 2300 and identification information of the slave UEs 2301 to 2304 to the $1^{st}$ access eNB 600 and/or the $2^{nd}$ access eNB 610. In this case, based on the identification information of the master UE 2300 and the identification information of the slave UEs 2301 to 2304, the $1^{st}$ access eNB 600 and/or the $2^{nd}$ access eNB 610 may detect whether downlink traffic is generated for UEs in a corresponding group, and if the downlink traffic is generated for the UEs in the group, may report this to the master UE 2300. For example, the $1^{st}$ access eNB 600 may detect that downlink traffic is generated for a $1^{st}$ access module for the slave UE 2301 based on the identification information of the slave UE 2301, and may transmit to the master UE 2300 a signal for indicating that the downlink traffic of the $1^{st}$ access module for the slave UE 2301 is generated. For another example, based on the identification information of the slave UE 2301, the $1^{st}$ access eNB 600 may detect that downlink traffic is generated for the $2^{nd}$ access module for the slave UE 2301, and may transmit to the master UE 2300 a signal for indicating that the downlink traffic of the $2^{nd}$ access module for the slave UE 2301 is generated. For example, the $1^{st}$ access eNB 600 may detect generation of downlink traffic which uses not only a $1^{st}$ access technology for UEs in the group but also other access technologies.

Figure 24:
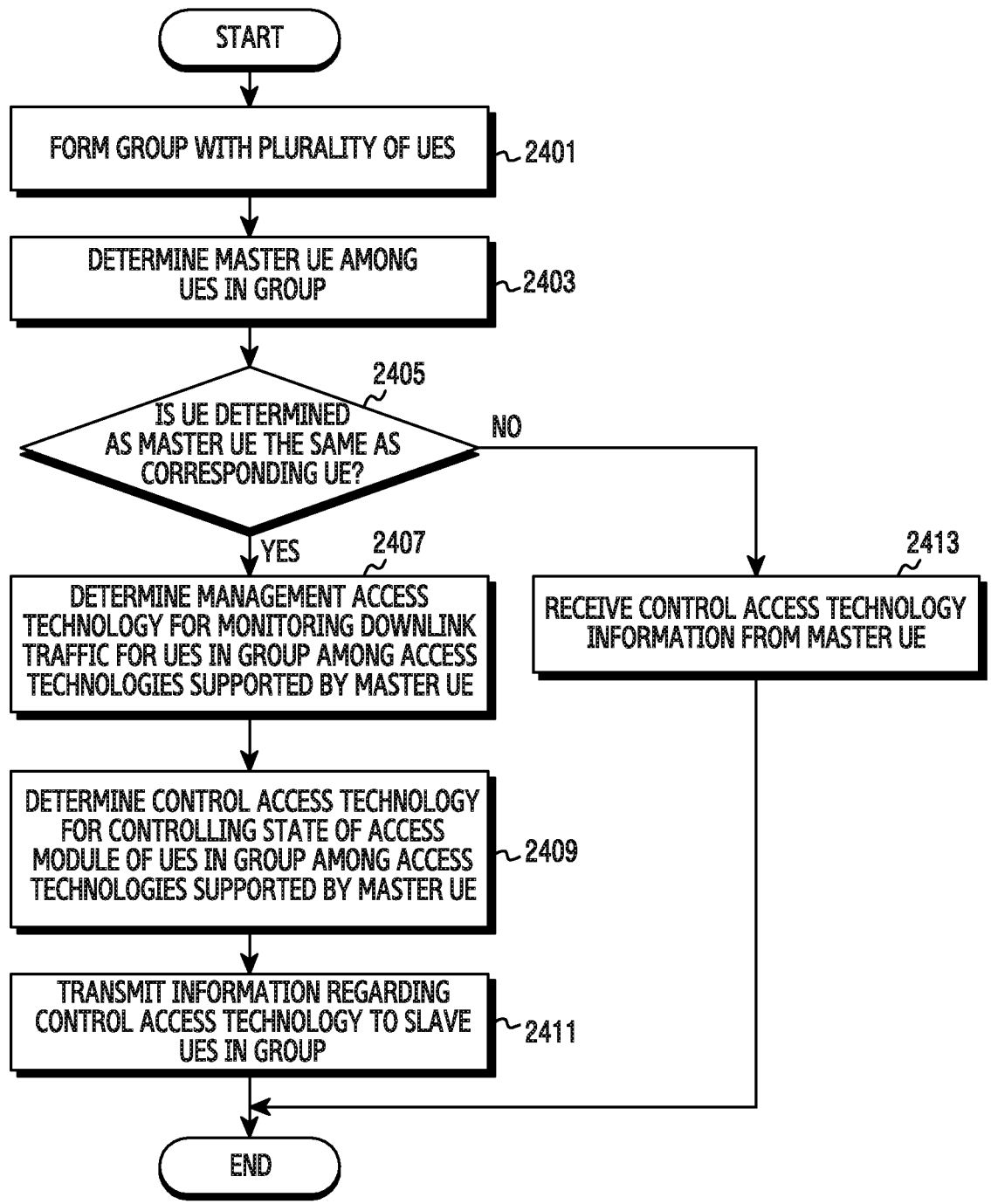
FIG. 24 illustrates an operation of forming a group of a UE according to an embodiment of the present disclosure.

FIG. 24 illustrates an operation of forming a group of a UE according to an embodiment of the present disclosure.

Figure 27:
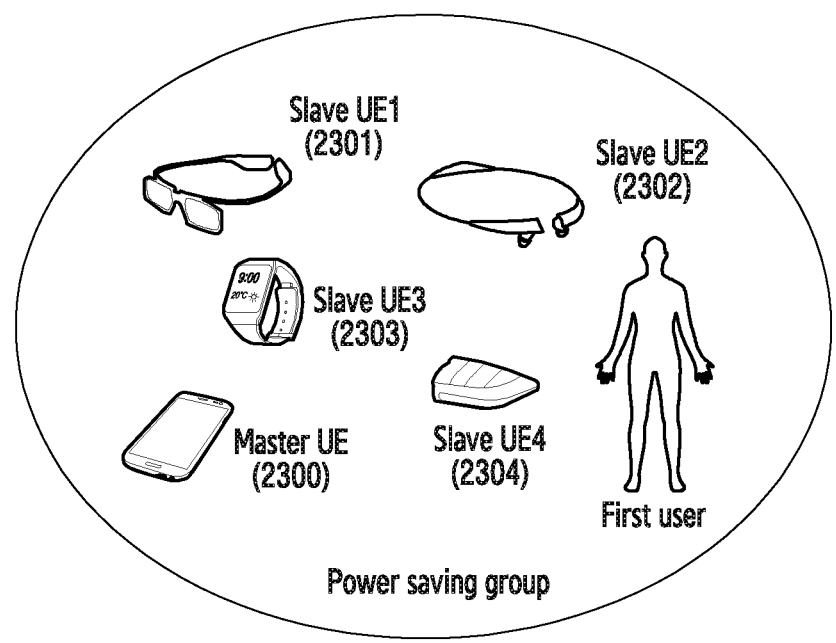
FIG. 27 illustrates a situation in which one group is formed of a plurality of UEs owned by a user according to an embodiment of the present disclosure.

FIG. 27 illustrates a situation in which one group is formed of a plurality of UEs owned by a user according to an embodiment of the present disclosure.

Referring to FIGS. 24 and 27, in operation 2401, the UE forms a group with a plurality of UEs. For example, referring to FIG. 27, a UE 2300 may form a group with different UEs 2301 to 2304 by a user request, and may exchange information. For example, the UE 2300 and the different UEs 2301 to 2304 may be UEs owned by a $1^{st}$ user. For example, the UE 2300 and the different UEs 2301 to 2304 may be in-door UEs of the $1^{st}$ user. The UE 2300 may recognize the different UEs 2301 to 2304 owned by the user based on association information for indicating recent association history, information of a device registered for payment, and the like. The UE 2300 may scan neighboring UEs through a $1^{st}$ radio access technology which is decided as being supported commonly by a plurality of UEs, and may attempt the association with the scanned UEs. If there is a specific UE not supporting the $1^{st}$ radio access technology among the plurality of UEs, the UE 2300 may attempt the association with the specific UE not supporting the $1^{st}$ radio access technology through a different radio access technology. In this case, the UE 2300 may transmit information regarding the specific UE to different UEs through the $1^{st}$ radio access technology. The UE 2300 may detect the different UEs 2301 to 2304 through at least one radio access technology, and may form a group with the detected different UEs 2301 to 2304. Further, the UE 2300 may exchange information based on flooding with the plurality of UEs 2301 to 2304. For example, the UE 2300 may broadcast a signal including capacity and remaining power information for each radio access technology supported by the UE 2300. Further, the UE 2300 may acquire capacity and remaining power information for an access module for each multi-access technology supported by a corresponding UE by receiving a signal which is broadcast from the different UEs 2301 to 2304 in the group, and may acquire information, such as channel state information and information, such as a topology, and the like, from the broadcast signal.

In operation 2403, the UE determines a master UE among UEs in a group. For example, the UE 2403 may determine a master UE (or a representative UE) based on information pre-registered by a user and information acquired through signal transmission/reception to/from a different UE in the group. For example, the UE 2300 may determine the master UE based on at least one of a multi-radio access technology supported by each UE, capacity of an access module of each UE, a remaining power level of each UE, reception signal quality for a $1^{st}$ access eNB and/or a $2^{nd}$ access eNB, and a topology. Herein, the topology may indicate a connection relation between the plurality of UEs, and may indicate a UE to/from which signals can be transmitted/received directly by each UE and a UE to/from which signals cannot be transmitted directly. For example, the topology may indicate the number of UEs to/from which signals can be transmitted/received by each UE via one-hop among UEs in the group. More specifically, the UE 2300 may identify a radio access technology supported by the maximum number of UEs among a plurality of radio access technologies supported by the UEs 2300 to 2304 in the group, and may determine one UE among UEs having the identified radio access technology as a master UE. For another example, the UE 2300 may identify capacity of an access module of each of the UEs 2300 to 2304 of the group, and may determine a UE having an access module of which capacity is greatest as the master UE. For another example, the UE 2300 may determine a UE of which a remaining power level is highest or a UE to which power is supplied in a wired manner as the master UE among the UEs 2300 to 2304 in the group. For another example, the UE 2300 may determine a UE of which reception signal quality for the $1^{st}$ access eNB and/or the $2^{nd}$ access eNB is highest among the UEs 2300 to 2304 in the group as the master UE. Herein, the reception signal quality may include reception power of the received signal or reception quality of the received signal. For another example, the UE 2300 may determine a UE which can transmit a control signal to the maximum number of UEs via one hop among the UEs 2300 to 2304 in the group as the master UE.

In operation 2405, the UE examines whether a UE determined as the master UE is the UE itself. If the UE determined as the master UE is not the UE itself, in operation 2413, the UE receives information regarding a control access technology from the master UE. It is assumed herein that an operation of determining the master UE is performed in each of the UEs in the group, and thus the UE does not transmit to a different UE a signal for reporting that it is determined as the master UE. However, according to a design rule, the UE may transmit to the different UE the signal for reporting that it is determined as the master UE.

On the other hand, if the UE determined as the master UE is the UE itself, in operation 2407, the UE determines a management access technology for monitoring downlink traffic for the UEs in the group among access technologies supported by the master UE. For example, the master UE 2300 may determine an access technology to be used for monitoring whether downlink traffic is generated for the slave UEs 2301 to 2304 in the group among access technologies supported by the master UE 2300. The master UE 2300 may determine a management access technology based on information pre-registered by a user and information acquired through signal transmission/reception to/from a different UE in the group. For example, the master UE 2300 may determine the master UE based on at least one of access technologies supported by the master UE 2300, capacity of each access module supporting a different multi-access technology, reception signal quality with respect to each access module for a $1^{st}$ access eNB and/or a $2^{nd}$ access eNB, a channel occupation probability for the $1^{st}$ access eNB and/or the $2^{nd}$ access eNB, a type of currently accessed eNB (e.g., an operator AP or a private AP), whether downlink traffic monitoring of different devices in a group for each access module is possible, a power consumption amount of each access module, and a topology. For example, the master UE 2300 may determine an access technology supported by the maximum number of UEs among a plurality of access technologies supported by the UEs 2300 to 2304 in the group as the management access technology. For another example, the master UE 2300 may determine an access technology corresponding to an eNB for which downlink traffic monitoring of the UEs 2300 to 2304 in the group is possible as the management access technology. For example, as shown in FIGS. 2A and 2B, in case of a system structure in which the eNB 200 receives a report on traffic generation from the AP 210 or the eNB 200 controls traffic offloading of the AP 210, an access technology corresponding to the eNB 200 may be determined as the management access technology. For another example, the master UE 2300 may determine an access technology corresponding to an access module of which power consumption is lowest as the management access technology. For another example, the master UE 2300 may determine the management access technology by considering a channel occupation probability with respect to an eNB which can perform downlink traffic monitoring and/or an eNB which transmits downlink data. The master UE 2300 may determine the management access technology by considering an instantaneous traffic load, an average traffic load, and the like, of the eNB which can perform the downlink traffic monitoring and/or the eNB which transmits the downlink data. For another example, the master UE 2300 may determine an access technology of a UE which can transmit a control signal to the maximum number of slave UEs via one hop as the management access technology. For another example, the master UE 2300 may determine the management access technology based on a type of an eNB to which the UEs 2300 to 2304 in the group have access. For example, if the UEs 2300 to 2304 in the group have access to the operator AP, the master UE 2300 may determine an access technology corresponding to an eNB which controls downlink offloading for the operator AP as the management access technology. Further, if the UEs 2300 to 2304 in the group have access to the private AP, the master UE 2300 may determine an access technology corresponding to the private AP as the management access technology.

Thereafter, in operation 2409, the UE determines a control access technology for controlling a state of an access module of the UEs in the group among the access technologies supported by the master UE. For example, the master UE 2300 may select a control access technology for controlling an activation state of an access module of the slave UEs 2301 to 2304 based on a downlink monitoring result via the management access module corresponding to the management access technology. For example, the master UE 2300 may determine a master UE based on at least one of access technologies supported by the master UE 2300, capacity of each access module supporting a different multi-access technology, reception signal quality with respect to each access module for a $1^{st}$ access eNB and/or a $2^{nd}$ access eNB, a channel occupation probability for the $1^{st}$ access eNB and/or the $2^{nd}$ access eNB, a type of currently accessed eNB (e.g., an operator AP or a private AP), a power consumption amount of each access module, and a topology. For example, the master UE 2300 may determine an access technology supported by the maximum number of UEs as the control access technology among a plurality of access technologies supported by the UEs 2300 to 2304 in the group. For another example, the master UE 2300 may determine an access technology corresponding to an access module of which power consumption is lowest as the management access technology. For another example, the master UE 2300 may determine an access technology of a UE which can transmit a control signal to the maximum number of slave UEs via one hop as the management access technology. The control access technology may be identical to or different from the management access technology. For example, the management access module may be a $1^{st}$ access module which can transmit/receive a signal to/from a $1^{st}$ access eNB, and the control access module may be an access module (e.g., a BLE module) capable of transmitting/receiving a signal with low power to/from a neighboring UE. Further, according to a design rule, the control access technology may be determined to be the same as the management access technology, and in this case, operation 2409 for determining the control access technology may be skipped.

In operation 2411, the UE may transmit information regarding the determined control access technology to the slave UEs 2301 to 2304. In this case, the UE may transmit a signal including the information regarding the control access technology to the slave UEs by using a control access module corresponding to the control access technology. Further, the UE may transmit the signal including the information regarding the control access technology to the slave UEs by using a management access module corresponding to a management access technology. Further, the UE may transmit the signal including the information regarding the control access technology to the slave UEs by using an access module corresponding to a different access technology other than the control access technology and the management access technology.

Thereafter, the UE ends the operation of forming the group according to the embodiment of the present disclosure.

Figure 25:
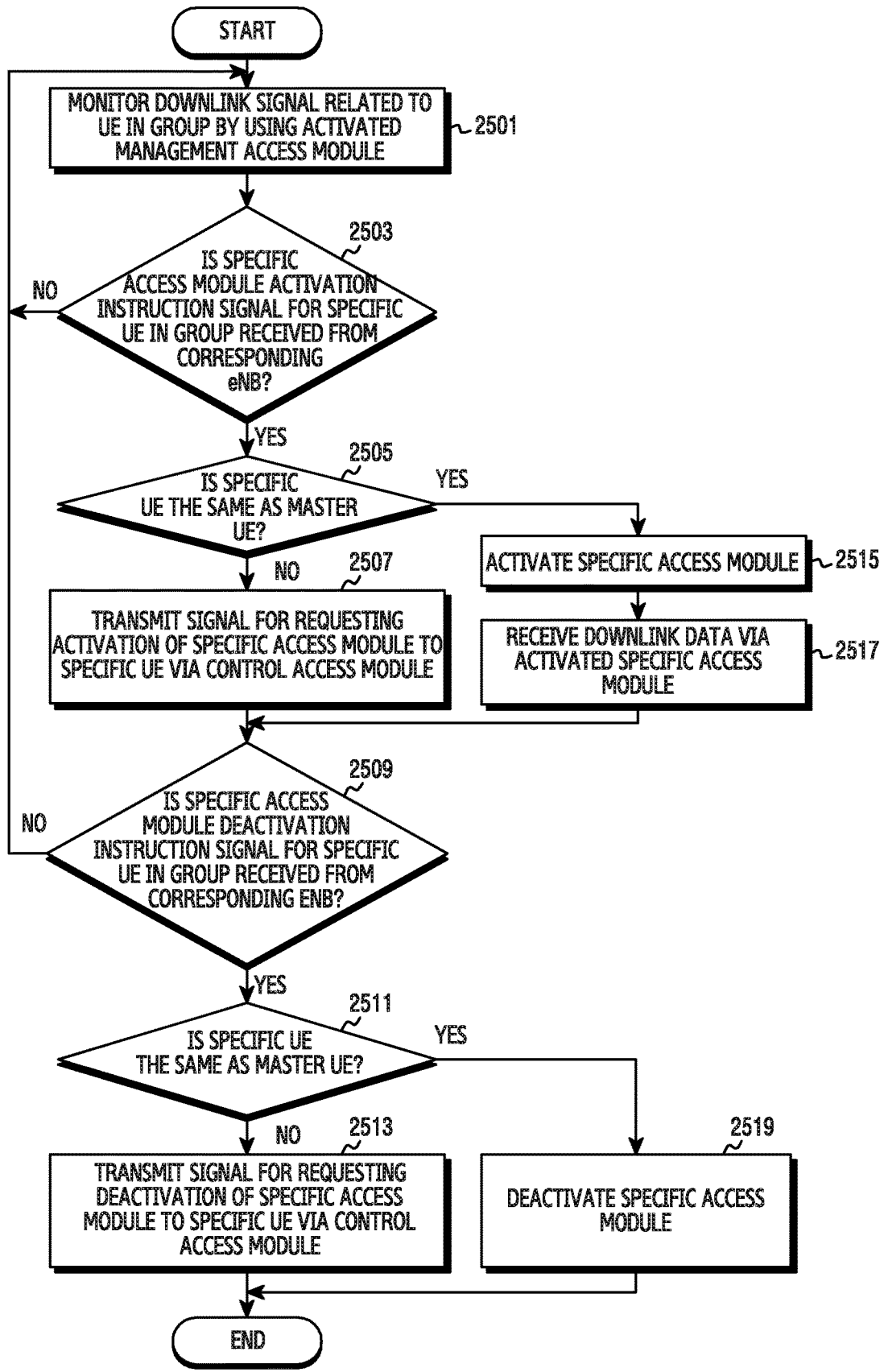
FIG. 25 illustrates an operation of a master UE according to an embodiment of the present disclosure.

FIG. 25 illustrates an operation of a master UE according to an embodiment of the present disclosure.

Herein, the master UE keeps a management access module corresponding to a management access technology in an activation state. According to the embodiment of the present disclosure, if the management access module operates based on a PSM, such as WLAN, the master UE may allow the management access module to operate based on the PSM. For example, in a case where the management access module is a module supporting the WLAN, if the management access module is kept in the activation state, it may mean to include a state in which an active status and a sleep status are periodically switched based on the PSM.

Referring to FIG. 25, in operation 2501, the master UE 2300 monitors a downlink signal related to the UEs 2300 to 2304 in the group by using the activated management access module. In this case, the master UE 2300 may deactivate a different access module other than the management access module. In addition, in order to detect whether downlink traffic is generated for the UEs 2300 to 2304 in the group, the master UE 2300 may transmit identification information for the UEs 2300 to 2304 in the group to an access eNB corresponding to the management access module before performing downlink signal monitoring. The master UE 2300 may receive a downlink signal for reporting the generation of the downlink traffic for a specific UE in the group from the access eNB via the management access module. Further, the master UE 2300 may detect a downlink traffic generation signal to be transmitted to the specific UE in the group from the access eNB via the management access module.

In operation 2503, the master UE 2300 detects whether a specific access module activation instruction signal for the specific UE in the group is received from a corresponding eNB. For example, the master UE 2300 detects whether a signal for indicating the generation of the downlink traffic for the master UE 2300 and/or the slave UEs 2301 to 2304 is received as a result of monitoring a signal transmitted from the access eNB corresponding to the management access technology via the management access module. In this case, the signal for indicating the generation of downlink traffic may include information regarding an access technology used in the generation of the downlink traffic, information regarding an access module to be activated, or information of a UE corresponding to downlink traffic. For example, the master UE 2300 may receive a signal for indicating generation of downlink traffic corresponding to a $2^{nd}$ access technology for the slave UE1 2301 or a signal for instructing activation of the $2^{nd}$ access module of the slave UE1 2301 from the $1^{st}$ access eNB via the management access module. For another example, the master UE 2300 may receive a signal for indicating generation of downlink traffic corresponding to a $1^{st}$ access technology for the slave UE3 2303 or a signal for instructing activation of the $1^{st}$ access module of the slave UE3 2303 from the $1^{st}$ access eNB via the management access module. If the specific access module activation instruction signal for the specific UE in the group is not received, returning to operation 2501, the UE 2300 repeats the subsequent operations.

Otherwise, if the specific access module activation instruction signal for the specific UE in the group is received, in operation 2505, the master UE 2300 examines whether the specific UE is the master UE. If the specific UE is the master UE, the master UE 2300 activates the specific access module in operation 2515, and thereafter receives downlink data via the activated specific access module in operation 2517. In this case, the master UE 2300 may receive the downlink data via the specific access module according to various embodiments disclosed in FIGS. 1 to 22D described above. Thereafter, the master UE 2300 proceeds to operation 2509.

If the specific UE is not the master UE, in operation 2507, the master UE 2300 transmits a signal for requesting activation of the specific access module to the specific UE via the control access module. If the control access module is different from the management access module, in operation 2509, the master UE 2300 may switch the control access module from a deactivation state to an activation state. For example, the master UE 2300 may transmit a signal for requesting activation of the $2^{nd}$ access module to the slave UE1 2301 via the control access module. The master UE 2300 may transmit the signal for requesting activation of the specific access module to the specific UE via the activated control access module, and thereafter may deactivate the control access module.

In operation 2509, the master UE 2300 detects whether a specific access module deactivation instruction signal for the specific UE in the group is received from a corresponding eNB. For example, the master UE 2300 detects whether a signal for indicating an absence of the downlink traffic for the master UE 2300 and/or the slave UEs 2301 to 2304 is received as a result of monitoring a signal transmitted from the access eNB corresponding to the management access technology via the management access module. In this case, the signal for indicating the absence of the downlink traffic may include information regarding a related access technology, information regarding an access module to be deactivated, or information of a related UE. For example, the master UE 2300 may receive a signal for indicating an absence of downlink traffic corresponding to a $2^{nd}$ access technology for the slave UE1 2301 or a signal for instructing deactivation of the $2^{nd}$ access module of the slave UE1 2301 from the $1^{st}$ access eNB via the management access module. For another example, the master UE 2300 may receive a signal for indicating an absence of downlink traffic corresponding to a $1^{st}$ access technology for the slave UE3 2303 or a signal for instructing deactivation of the $1^{st}$ access module of the slave UE3 2303 from the $1^{st}$ access eNB via the management access module. If the specific access module deactivation instruction signal for the specific UE in the group is not received, returning to operation 2501, the UE 2300 repeats the subsequent operations.

If the specific access module deactivation instruction signal for the specific UE in the group is received, in operation 2511, the master UE 2300 examines whether the specific UE is the master UE. If the specific UE is the master UE, the master UE 2300 deactivates the specific access module in operation 2519. According to the embodiment of the present disclosure, the master UE 2300 may deactivate the specific access module without having to receive the specific access module deactivation instruction signal. For example, the master UE 2300 may use a timer for measuring a pre-set time to detect that downlink data is not received during the pre-set time via the specific access module, and may deactivate the specific access module.

If the specific UE is not the master UE, in operation 2513, the master UE 2300 transmits a signal for requesting deactivation of the specific access module to the specific UE via the control access module. For example, the master UE 2300 may transmit a signal for requesting deactivation of the $2^{nd}$ access module to the slave UE1 2301 via the control access module. The master UE 2300 may transmit the signal for requesting deactivation of the specific access module to the specific UE via the activated control access module, and thereafter may deactivate the control access module.

Thereafter, the master UE 2300 ends the procedure according to the embodiment of the present disclosure.

Figure 26:
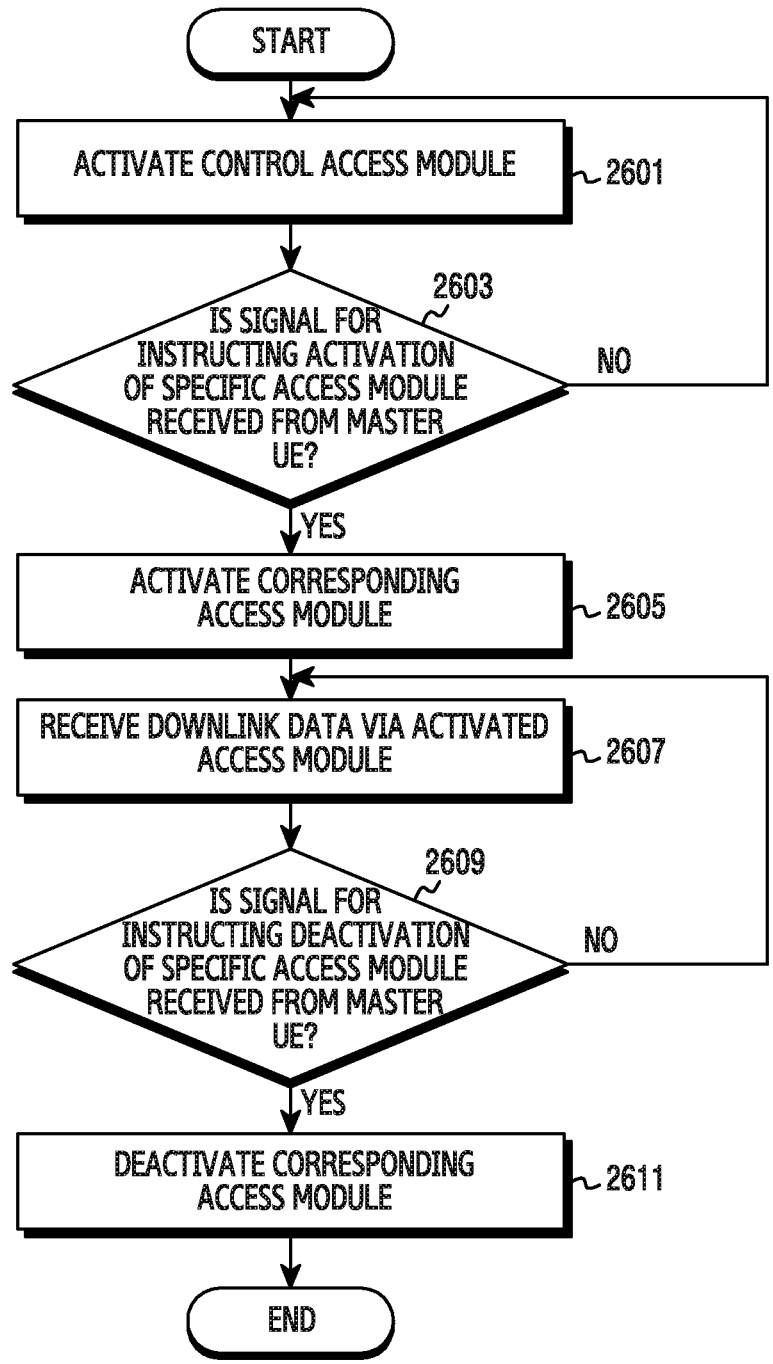
FIG. 26 illustrates an operation of a slave UE according to an embodiment of the present disclosure.

FIG. 26 illustrates an operation of a slave UE according to an embodiment of the present disclosure. Herein, the slave UE may be any one UE among the slave UE1 2301 to the slave UE4 2304 shown in FIG. 23.

Referring to FIG. 26, in operation 2601, the slave UE activates a control access module. For example, when forming a group with different UEs, the slave UE identifies that the slave UE is not the master UE but the slave UE, and activates the control access module. The slave UE may deactivate the remaining access modules other than the control access module while the control access module is kept in an activation state.

In operation 2603, the slave UE examines whether an activation instruction signal for a specific access module is received from the master UE. For example, the slave UE examines whether a signal for instructing activation of a $1^{st}$ access module or a $2^{nd}$ access module is received from the master UE 2300 via the control access module. If the activation instruction signal for the specific access module is not received from the master UE, returning to operation 2601, the slave UE repeats the subsequent operations.

Otherwise, if the activation instruction signal for the specific access module is received from the master UE, in operation 2605, the slave UE may activate a corresponding access module for which activation is instructed. For example, if the activation instruction signal for the 1$^{st}$ access module is received from the master UE 2300, the slave UE may switch the 1$^{st}$ access module from the deactivation state to the activation state.

In operation 2607, the slave UE receives a downlink data signal via the activated access module. For example, the slave UE may receive downlink data via the 1$^{st}$ access module activated by the activation instruction signal received from the maser UE 2300.

In operation 2609, the slave UE examines whether a deactivation instruction signal for the specific access module is received from the master UE via the control access module. For example, the slave UE examines whether the deactivation instruction signal of the 1$^{st}$ access module is received via the control access module in a state where the 1$^{st}$ access module is activated. If the deactivation instruction signal for the specific access module is not received from the master UE, returning to operation 2607, the slave UE repeats the subsequent operations. If the deactivation instruction signal for the specific access module is received from the master UE, in operation 2611, the slave UE deactivates a corresponding access module. For example, if the deactivation instruction signal for the 1$^{st}$ access module is received from the master UE 2300, the slave UE may switch the 1$^{st}$ access module from the activation state to the deactivation state. According to another embodiment of the present disclosure, the slave UE may deactivate the specific access module without having to receive a specific access module deactivation instruction signal from the master UE 2300. For example, the slave UE may use a timer for measuring a pre-set time to detect that downlink data is not received during the pre-set time via the specific access module, and may deactivate the specific access module.

Thereafter, the slave UE ends the procedure according to the embodiment of the present disclosure.

Figure 28:
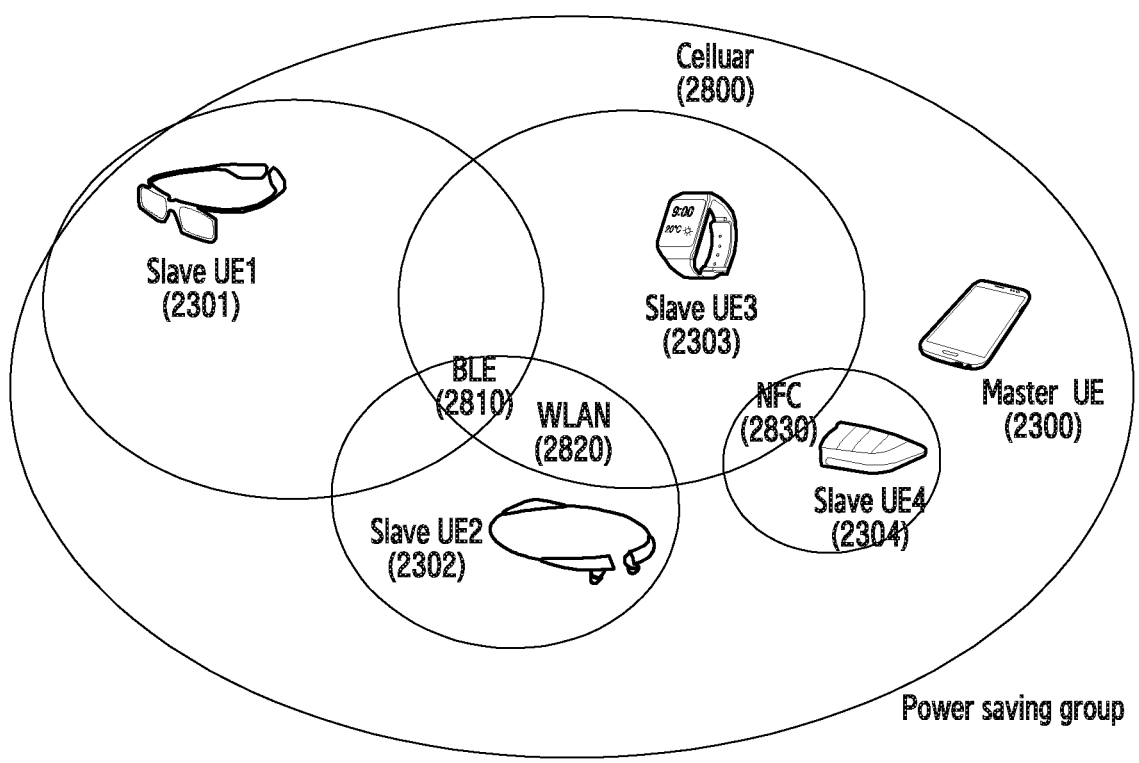
FIG. 28 illustrates a radio access technology supported by UEs in a group according to an embodiment of the present disclosure.

FIG. 28 illustrates a radio access technology supported by UEs in a group according to an embodiment of the present disclosure.

Referring to FIG. 28, a master UE 2300 may support a cellular 2800, a WLAN 2820, a BLE 2810, and a near field communication (NFC) 2830. A slave UE1 2301 may support the cellular 2800 and the BLE 2810. A slave UE2 2302 may support the cellular 2800, the WLAN 2820, and the BLE 2810. A slave UE3 2303 may support the cellular 2800, the WLAN 2820, the BLE 2810, and the NFC 2830. A slave UE4 2304 may support the cellular 2800 and the NFC 2830. In this situation, a management access module may be determined as a cellular module supported simultaneously by all of the UEs 2300 to 2304 in the group. Further, a control access module may be determined as the cellular module supported simultaneously by all of the UEs 2300 to 2304 in the group, or may be determined as a BLE module having low power consumption.

If the management access module is determined as the cellular module and the control access module is determined as the BLE module, the UEs 2300 to 2304 in the group may operate as follows.

First, while the cellular module which is the management access module is always kept in the activation state, the master UE 2300 may deactivate the remaining access modules, i.e., the WLAN module, the BLE module, and the NFC module. The master UE 2300 may detect whether cellular downlink traffic for the slave UEs 2301 to 2304 is generated by using the cellular module in the activation state, and also may detect whether WLAN downlink traffic for the slave UEs 2302 and 2303 is generated. The master UE 2300 may activate the BLE module which is the control access module upon detecting generation of cellular or WLAN downlink traffic for at least one of the slave UEs 2301 to 2304. The master UE 2300 may transmit a signal for controlling an activation state of the cellular or WLAN module for at least one of the slave UEs 2301 to 2304 via the BLE module.

However, since the slave UE4 2304 does not support the BLE, the master UE 2300 cannot transmit the signal for controlling the activation state of the cellular module to the slave UE4 2304 via the BLE. Therefore, the master UE 2300 may provide control such that the signal for controlling the activation state of the cellular module of the slave UE4 2304 is transmitted to the slave UE4 2304 via the slave UE3 2303. For example, since the NFC supported by the slave UE4 2304 is supported by the slave UE3 2303, upon detection of downlink traffic for the cellular module of the slave UE4 2304, the master UE 2300 may transmit a cellular module activation instruction signal of the slave UE4 to the slave UE3 2303 via the BLE module. The slave UE3 2303 may receive the cellular module activation instruction signal of the slave UE4 2304 from the master UE 2300 via the BLE module, and may transmit the cellular module activation instruction signal of the slave UE4 2304 to the slave UE4 2304 by activating the NFC module. The slave UE3 2303 may transmit the cellular module activation instruction signal to the slave UE4 2304 via the NFC module, and thereafter may deactivate the NFC module. Herein, the slave UE4 2304 does not include the BLE module which is the control access module. Therefore, the NFC module may be kept in the activation state instead of the BLE module, and the cellular module activation instruction signal may be received via the activated NFC module.

Although a case where the management access module is determined as the cellular module is described above, if the WLAN module of the slave UE2 2302 and the slave UE3 2303 uses a private AP, the management access module must be determined as the WLAN module. For example, a cellular eNB can control downlink traffic for an operator AP, but cannot control downlink traffic for the private AP. Therefore, if the WLAN module of the slave UE2 2302 and the slave UE3 2303 uses the operator AP, the master UE 2300 may determine any one of the cellular module and the AP module as the management access module. On the other hand, if the WLAN module of the slave UE2 2302 and the slave UE3 2303 uses the private AP, the master UE 2300 may determine the AP module as the management access module in order to monitor downlink traffic of the WLAN for the slave UE2 2302 and the slave UE3 2303. In addition, the master UE 2300 may determine both of the cellular module and the WLAN module as the management access module. In this case, the master UE 2300 may detect generation of cellular downlink traffic for the UEs 2300 to 2304 in the group via the cellular module, and may detect generation of WLAN downlink traffic for the UEs 2300, 2302, and 2303 supporting the WLAN in the group.

Figure 29:
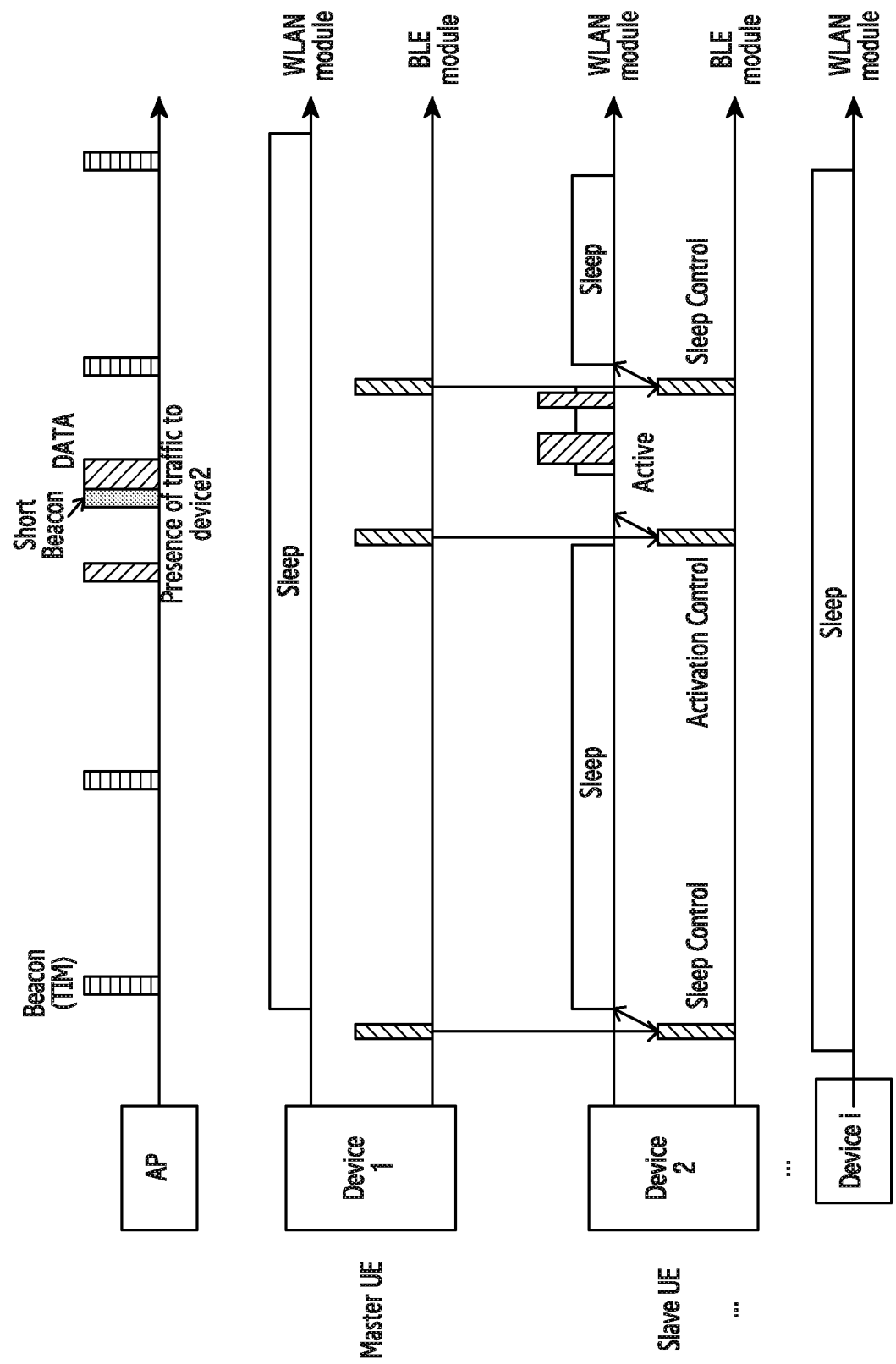
FIG. 29 illustrates an activation state of a WLAN module for a case where UEs in a group has access to an operator AP according to an embodiment of the present disclosure.

FIG. 29 illustrates an activation state of a WLAN module for a case where UEs in a group has access to an operator AP according to an embodiment of the present disclosure. It is assumed in FIG. 29 that a management access module of a master UE is a cellular module, and a control access module is a BLE module having low power consumption. Further, although not shown, the cellular module of the master UE is always kept in the activation state.

Referring to FIG. 29, each of a master UE (i.e., a device 1) and a slave UE (i.e., a device 2) may include an AP, a WLAN module, and a BLE module. The master UE may monitor whether downlink traffic for the slave UE is generated in the AP via the cellular module. If the downlink traffic generation for the slave UE is not detected in the AP as a result of monitoring, the master UE may transmit a signal for instructing deactivation of the WLAN module to the slave UE via the BLE module. In this case, the slave UE may switch the WLAN module from the activation state to a deactivation state, or may be kept in the deactivation state.

Otherwise, if the downlink traffic generation for the slave UE is detected in the AP as the result of monitoring, the master UE may transmit a signal for instructing activation of the WLAN module to the slave UE via the BLE module. In this case, the slave UE may switch the WLAN module from the deactivation state to the activation state. The slave UE may receive a beacon signal (or a short beacon signal) from the AP via the activated WLAN module, and thereafter may receive downlink data.

Thereafter, the master UE may detect that downlink traffic for the slave UE is no longer present in the AP via the cellular module, and may transmit a signal for instructing deactivation of the cellular module to the slave UE via the BLE module. In this case, the slave UE may switch the WLAN module from the activation state to the deactivation state.

Figure 30:
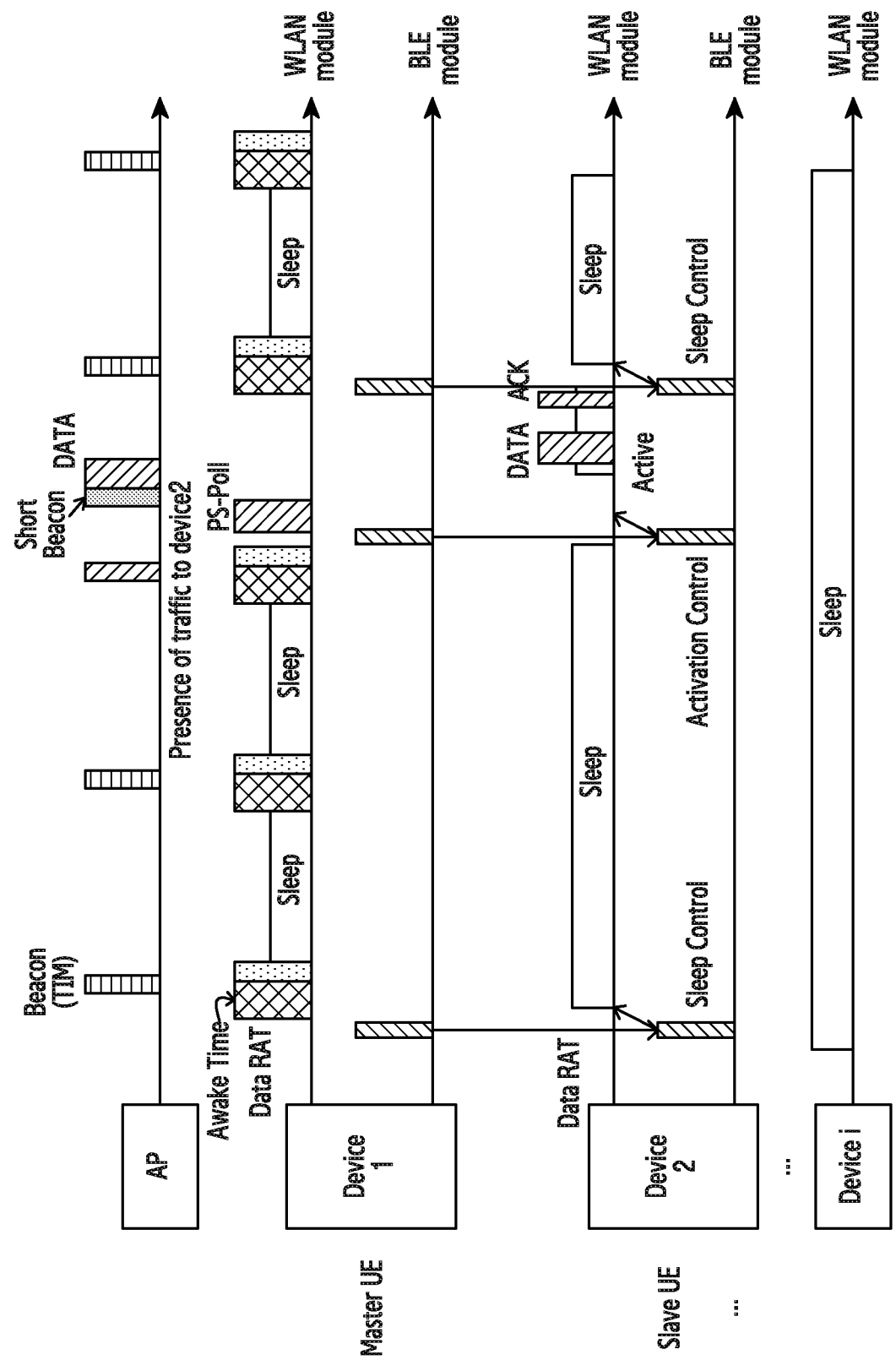
FIG. 30 illustrates an activate state of a WLAN module for a case where UEs in a group have access to a private AP according to an embodiment of the present disclosure.

FIG. 30 illustrates an activate state of a WLAN module for a case where UEs in a group have access to a private AP according to an embodiment of the present disclosure. It is assumed in FIG. 30 that a management access module of a master UE is a WLAN module, and a control access module is a BLE module having low power consumption.

Referring to FIG. 30, each of a master UE (a device 1) and a slave UE (a device 2) may include an AP, a WLAN module, and a BLE module. The master UE may monitor whether downlink traffic for the slave UE is generated by the AP via the WLAN module. In this case, instead of being kept persistently in an active status, the WLAN module operates in the active (or awake) status at a beacon transmission time based on a PSM, and if downlink traffic for the master UE and the slave UE is not detected through the beacon signal, may operate in a sleep status until a next beacon transmission time. The master UE may determine whether identification information of the master UE and/or the slave UE is present in the beacon signal transmitted from the AP, and may determine whether downlink traffic is generated for the UEs in the group.

If the downlink traffic generation for the slave UE is not detected in the AP as a result of monitoring, the master UE may transmit a signal for instructing deactivation of the WLAN module to the slave UE via the BLE module. In this case, the slave UE may switch the WLAN module from the activation state to a deactivation state, or may be kept in the deactivation state. Further, the master UE may allow the WLAN module to operate in the sleep status until a next beacon transmission time, and when the next beacon transmission time arrives, may switch the WLAN module to the awake status and thereafter may detect whether downlink traffic for the slave UE is generated in the AP.

If the downlink traffic generation for the slave UE is detected in the AP as the result of monitoring, the master UE may transmit a signal for instructing activation of the WLAN module to the slave UE via the BLE module. In this case, the slave UE may switch the WLAN module from the deactivation state to the activation state. The slave UE may receive a beacon signal (or a short beacon signal) from the AP via the activated WLAN module, and thereafter may receive downlink data.

Thereafter, the master UE may detect that downlink traffic for the slave UE is no longer present in the AP via the cellular module, and may transmit a signal for instructing deactivation of the WLAN module to the slave UE via the BLE module. In this case, the slave UE may switch the WLAN module from the activation state to the deactivation state.

Figure 31:
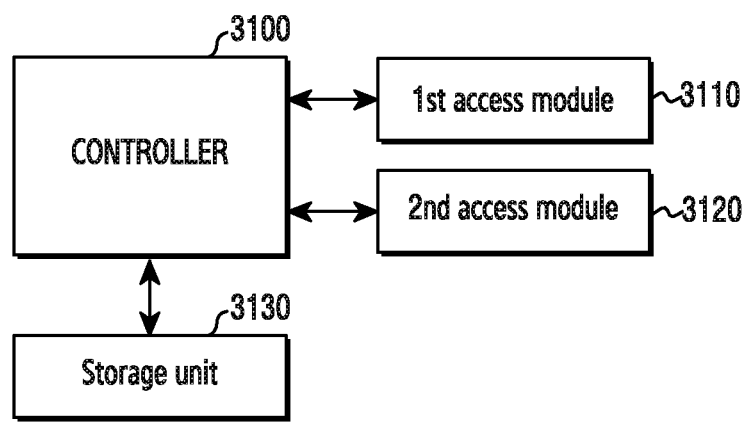
FIG. 31 is a block diagram of a UE for controlling an access module by forming a group with different UEs according to an embodiment of the present disclosure.

FIG. 31 is a block diagram of a UE for controlling an access module by forming a group with different UEs according to an embodiment of the present disclosure.

Referring to FIG. 31, the UE may include a controller 3100, a $1^{st}$ access module 3110, a $2^{nd}$ access module 3120, and a storage unit 3130. The controller 3100, $1^{st}$ access module 3110, $2^{nd}$ access module 3120, and storage unit 3130 included in the UE may respectively perform functions of the controller 1900, $1^{st}$ access module 1910, $2^{nd}$ access module 1920, and storage unit 1930 of FIG. 19, and may be configured to additionally perform functions described below.

The controller 3100 controls and processes an overall operation of the UE. According to the embodiment of the present disclosure, the controller 3100 controls and processes a function for forming a group with a plurality of different UEs and for determining a master UE in the formed group. Further, the controller 3100 may control and process a function for determining a management access technology for monitoring downlink traffic of the UEs in the group among RATs supported by a master UE. Furthermore, the controller 3100 may control and process a function for determining a control access module for transmitting/receiving a state control signal for an access module of the UEs in the group among the RATs supported by the master UE.

For example, based on information input by a user, association history information for different UEs and stored in the UE, information acquired by transmitting/receiving a signal to/from the different UEs, and the like, the controller 3100 may determine at least one different UE for forming a group, and may form a group with the determined at least one UE. The controller 3100 may determine the master UE based on at least one of a multi-radio access technology supported by each UE, capacity of an access module of each UE, a remaining power level of each UE, reception signal quality for a $1^{st}$ access eNB and/or a $2^{nd}$ access eNB, and a topology. Further, the controller 3100 may determine the management access module based on information pre-registered by a user or information acquired through signal transmission/reception to/from a different UE in the group. For example, the controller 3100 may determine the management access module based on at least one of a multi-radio access technology supported by the master UE 2300, capacity of each access module supporting a different multi-access technology, reception signal quality with respect to each access module for a $1^{st}$ access eNB and/or a $2^{nd}$ access eNB, a channel occupation probability for the $1^{st}$ access eNB and/or the $2^{nd}$ access eNB, a type of currently accessed eNB (e.g., an operator AP or a private AP), whether downlink traffic monitoring of different devices in a group for each access module is possible, a power consumption amount of each access module, and a topology. Further, the controller 3100 may select the control access module for controlling the activation state of the access module in the UEs in the group. The control access module may be identical to or different from the management access module. For example, the management access module may be a $1^{st}$ access module which transmits/receives a signal to/from a $1^{st}$ access eNB, and the control access module may be an access module (e.g., a BLE module) capable of transmitting/receiving a signal with low power to/from a neighboring UE. Further, the controller 3100 may receive related information from different UEs in the group, instead of directly determining the management access module and the control access module. For example, if a corresponding UE is not the master UE, the controller 3100 may receive information regarding the control access module from the master UE in the group.

If the corresponding UE is the master UE, the controller 3100 may control and process a function for transmitting radio access technology information corresponding to the determined management access module and/or radio access technology information corresponding to the control access module to the different UEs in the group.

Further, if the corresponding UE is the master UE, the controller 3100 may keep the management access module in the activation state, and may detect whether downlink traffic for the UEs in the group is generated via the management access module. Upon detection of downlink traffic generation of a specific access technology for a specific UE in the group, the controller 3100 may control and process a function for transmitting a signal for instructing activation of an access module corresponding to the specific access technology to the specific UE. In this case, the controller 3100 may transmit the signal for instructing activation of the access module corresponding to the specific access technology to the specific UE via the control access module. In addition, if the management access module is different from the control access module, the controller 3100 may keep the control access module in the activation state only during a time when a signal for controlling the activation state of the access module is transmitted to the different UEs in the group.

If the corresponding UE is not the master UE, the controller 3100 may activate only the determined control access module, and may deactivate the remaining access modules. The controller 3100 may activate or deactivate a specific access module according to a signal received from the master UE.

The $1^{st}$ access module 3110 may transmit/receive a signal to/from the $1^{st}$ access eNB via the $1^{st}$ access link under the control of the controller 3100. According to the embodiment of the present disclosure, if the $1^{st}$ access module 3110 is the management access module, the $1^{st}$ access module 3110 is always kept in the activation state under the control of the controller 3100. If the $1^{st}$ access module 3110 is the control access module and a corresponding UE is the master UE, the $1^{st}$ access module 3110 may be kept in the activation state only when an access module state control signal is transmitted to a different UE under the control of the controller 3100. If the $1^{st}$ access module 3110 is the control access module and the corresponding UE is the slave UE, the $1^{st}$ access module 3110 may always be kept in the activation state under the control of the controller 3100. Further, if the $1^{st}$ access module 3110 is not the management access module or the control access module, the $1^{st}$ access module 3110 may operate in the activation state only when there is downlink data to be received from the $1^{st}$ access eNB under the control of the controller 3110.

The $2^{nd}$ access module 3120 may transmit/receive a signal to/from the $2^{nd}$ access eNB via the $2^{nd}$ access link under the control of the controller 3100, or may transmit/receive a signal to/from different UEs. According to the embodiment of the present disclosure, if the $2^{nd}$ access module 3120 is the management access module, the $2^{nd}$ access module 1320 may always be kept in the activation state under the control of the controller 3100. If the $2^{nd}$ access module 1320 is the control access module and the corresponding UE is the master UE, the $1^{st}$ access module 3110 may be kept in the activation state only when an access module state control signal is transmitted to the different UE under the control of the controller 3100. Further, if the $2^{nd}$ access module 1320 is the control access module and the corresponding UE is the slave UE, the $1^{st}$ access module 3110 may always be kept in the activation state under the control of the controller 3100. If the $2^{nd}$ access module 3120 is not the management module or the control access module, the $2^{nd}$ access module 3120 may operate in the activation state only when there is downlink data to be received from the $2^{nd}$ access eNB under the control of the controller 3100.

The storage unit 3130 stores a variety of data and programs required for an operation of the UE under the control of the controller 3100. The storage unit 3130 may store identification information of different UEs in a group under the control of the controller 3100. The storage unit 3130 may store information required to determine the master UE, the management access module, and the control access module. For example, the storage unit 3130 may store information which is input by a user, association history information stored in the UE with respect to a different UE, information acquired by transmitting/receiving a signal to/from the different UE. The storage unit 3130 may store at least one of a multi-radio access technology supported by each UE in the group, capacity of an access module of each UE, a remaining power level of each UE, reception signal quality for a $1^{st}$ access eNB and/or a $2^{nd}$ access eNB, a channel occupation probability for the $1^{st}$ access eNB and/or the $2^{nd}$ access eNB, a type of currently accessed eNB (e.g., an operator AP or a private AP, a power consumption amount of each access module, and topology information.

While the present disclosure has been particularly shown and described with reference to embodiments thereof, it will be understood by those skilled in the art that various modifications and changes in form and details may be made therein without departing from the spirit of the disclosure.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a terminal supporting multi-radio access technologies (multi-RAT) in a wireless communication system, the method comprising:
   receiving, from a base station through a first RAT, a control signal to stop receiving packet data convergence protocol (PDCP) data to be received from an access node through a second RAT by deactivation of the second RAT, if the PDCP data to be received from the access node is not detected by the base station during a preset time period from a time point when the PDCP data to be received from the access node is transmitted from the base station to the access node for transmission to the terminal;
   transmitting, to the base station through the first RAT in response to the control signal to stop receiving the PDCP data to be received from the access node, a first sequence number of PDCP data which the terminal has last received from the access node; and
   receiving, from the base station through the first RAT, PDCP data with a second sequence number that is higher than the first sequence number.

2. The method of claim 1, further comprising:
   starting monitoring of PDCP data to be received from the access node when the second RAT is activated.

3. The method of claim 2, further comprising,
   receiving, if the monitoring of the PDCP data to be received from the access node is started, a beacon signal containing information required to receive the PDCP data to be received from the access node,
   wherein the beacon signal contains a first-type beacon signal transmitted with a fixed period or a second-type beacon signal transmitted at a time point between the fixed periods of the first-type beacon signal, and
   wherein the second-type beacon signal contains a part of information contained in the first-type beacon signal.

4. The method of claim 2, further comprising:
   receiving, if the monitoring of the PDCP data to be received from the access node is started, a beacon signal containing the information required to receive the PDCP data to be received from the access node;
   transmitting, if the beacon signal is not received, a signal containing information for indicating that a change of a base station is required for the second RAT to the base station through the first RAT;
   determining a target access node for the second RAT, based on a signal received through the second RAT;
   transmitting, to the base station, information regarding the target access node through the first RAT; and
   receiving the beacon signal containing the information required to receive PDCP data to be received from the target access node through the second RAT.

5. The method of claim 2, further comprising:
   transmitting a signal for indicating stopping monitoring the PDCP data to be received from the access node; and
   stopping the monitoring of the PDCP data to be received from the access node after transmitting the signal.

6. The method of claim 2, further comprising:
   stopping the monitoring of the PDCP data to be received from the access node; and
   transmitting, after the monitoring of the PDCP data to be received from the access node is stopped, a signal for indicating the stopping of the monitoring of the PDCP data to be received from the access node.

7. The method of claim 2, further comprising:
   receiving a message including a timer value;
   starting a timer with the timer value; and
   if the timer expires, stopping the monitoring of the PDCP data to be received from the access node.

8. The method of claim 1, further comprising:
   identifying the first sequence number of the PDCP data which the terminal has last received from the access node.

9. The method of claim 1, further comprising:
   acquiring a second sequence number for indicating the PDCP data to be last received from the access node from the control signal; and
   determining whether reception of the PDCP data to be received from the access node is complete based on the second sequence number.

10. An apparatus of a terminal supporting multi-radio access technologies (multi-RAT) in a wireless communication system, the apparatus comprising:
    a first transceiver configured to support a first RAT;
    a second transceiver configured to support a second RAT; and
    at least one processor configured to:
      receive, from a base station through the first RAT, a control signal to stop receiving packet data convergence protocol (PDCP) data to be received from an access node through the second RAT by deactivation of the second RAT, if the PDCP data to be received from the access node is not detected by the base station during a preset time period from a time point when the PDCP data to be received from the access node is transmitted from the base station to the access node for transmission to the terminal,
      transmit, to the base station through the first RAT in response to the control signal to stop receiving the PDCP data to be received from the access node, a first sequence number of PDCP data which the terminal has last received from the access node, and
      receive, from the base station through the first RAT, PDCP data with a second sequence number that is higher than the first sequence number.

11. The apparatus of claim 10, wherein the at least one processor is further configured to:
    start monitoring of the PDCP data to be received from the access node when the second RAT is activated.

12. The apparatus of claim 11,
wherein, if the monitoring of the PDCP data to be received from the access node is started, the at least one processor is further configured to receive a beacon signal containing information required to receive the PDCP data to be received from the access node,
wherein the beacon signal contains a first-type beacon signal transmitted with a fixed period or a second-type beacon signal transmitted at a time point between the fixed periods of the first-type beacon signal, and
wherein the second-type beacon signal contains a part of information contained in the first-type beacon signal.

13. The apparatus of claim 11, wherein the at least one processor is further configured to:
receive a beacon signal containing the information required to receive the PDCP data to be received from the access node, if the monitoring of the PDCP data to be received from the access node is started,
transmit, if the beacon signal is not received, a signal containing information for indicating that a change of a base station is required for the second RAT to the base station through the first RAT,
determine a target access node for the second RAT based on a signal received through the second RAT, if the beacon signal is not received,
transmit, to the base station, information regarding the target access node through the first RAT, and
receive the beacon signal containing the information required to receive PDCP data to be received from the target access node through the second RAT.

14. The apparatus of claim 11, wherein the at least one processor is further configured to:
transmit a signal for indicating stopping of the monitoring of the PDCP data to be received from the access node; and
stop the monitoring of the PDCP data to be received from the access node after transmitting the signal.

15. The apparatus of claim 11, wherein the at least one processor is further configured to:
stop the monitoring of the PDCP data to be received from the access node; and
transmit, after the monitoring the PDCP data to be received from the access node is stopped, a signal for indicating the stopping of the monitoring of the PDCP data to be received from the access node.

16. The apparatus of claim 11,
wherein the at least one processor is further configured to:
receive a message including a timer value,
start a timer with the timer value, and
if the timer expires, stop monitoring the PDCP data to be received from the access node.

17. The apparatus of claim 10, wherein the at least one processor is further configured to:
identify the first sequence number of the PDCP data which the terminal has last received from the access node.

18. The apparatus of claim 10, wherein the at least one processor is further configured to:
acquire a third sequence number for indicating the PDCP data to be last received from the access node from the control signal, and
determine whether reception of the PDCP data to be received from the access node is complete based on the third sequence number.

19. An apparatus of a base station supporting a first radio access technology (RAT), the apparatus comprising:
a transceiver; and
at least one processor configured to:
transmit, to a terminal through the first RAT, a control signal to stop receiving packet data convergence protocol (PDCP) data to be received from an access node through a second RAT by deactivation of the second RAT, if the PDCP data to be to be received from the access node is not detected for a preset time period from a time point when the PDCP data to be received from the access node is transmitted to the access node for transmission to the terminal,
receive, from the terminal through the first RAT in response to the control signal to stop receiving the PDCP data to be received from the access node, a first sequence number of the PDCP data which the terminal has last received from an access node, and
transmit, to the terminal through the first RAT, PDCP data with a second sequence number that is higher than the first sequence number.

20. The apparatus of claim 19, wherein the control signal comprises a third sequence number for indicating PDCP data to be last received from the access node.

* * * * *